United States Patent
Löhr et al.

(10) Patent No.: US 9,402,255 B2
(45) Date of Patent: Jul. 26, 2016

(54) TIMING ADVANCE CONFIGURATION FOR MULTIPLE UPLINK COMPONENT CARRIERS

(75) Inventors: Joachim Löhr, Wiesbaden (DE); Christian Wengerter, Kleinheubach (DE); Martin Feuersänger, Bremen (DE); Takashi Tamura, Kanagawa (JP); Hidetoshi Suzuki, Kanagawa (JP); Takahisa Aoyama, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 476 days.

(21) Appl. No.: 13/822,850

(22) PCT Filed: Aug. 15, 2011

(86) PCT No.: PCT/EP2011/004091
§ 371 (c)(1),
(2), (4) Date: May 22, 2013

(87) PCT Pub. No.: WO2012/041422
PCT Pub. Date: Apr. 5, 2012

(65) Prior Publication Data
US 2013/0250925 A1    Sep. 26, 2013

(30) Foreign Application Priority Data

Sep. 30, 2010 (JP) ................................. 2010-222764
Mar. 8, 2011 (EP) .................................... 11001914

(51) Int. Cl.
*H04W 72/04* (2009.01)
*H04W 56/00* (2009.01)

(52) U.S. Cl.
CPC ...... *H04W 72/0446* (2013.01); *H04W 56/0045* (2013.01)

(58) Field of Classification Search
CPC . H04W 72/0446; H04W 84/12; H04W 84/18; H04W 28/04; H04W 28/06
See application file for complete search history.

(56) References Cited

U.S. PATENT DOCUMENTS 5,926,469 A * 7/1999 Norstedt ............. H04W 76/045
370/329
5,940,763 A * 8/1999 Alperovich ........... H04W 28/08
370/337

(Continued)

FOREIGN PATENT DOCUMENTS

WO    WO 2014063541 A1 *  5/2014   ........ H04W 52/0206

OTHER PUBLICATIONS

3GPP TR 36.912 V2.1.1 (Sep. 2009), titled 3rd Generation Partnership Project; Technical Specification Group Radio Access Network; Evolved Universal Terrestrial Radio Access (E-UTRA); Medium Access Control (MAC) protocol specification (Release 9).*

(Continued)

*Primary Examiner* — Andrew Lai
*Assistant Examiner* — Hoyet H Andrews
(74) *Attorney, Agent, or Firm* — Pearne & Gordon LLP

(57) ABSTRACT

The invention relates methods for time aligning uplink transmissions by a mobile terminal in a mobile communication system, and to methods for performing a handover of a mobile terminal to a target aggregation access point. The invention is also providing apparatus and system for performing these methods, and computer readable media the instructions of which cause the apparatus and system to perform the methods described herein. In order to allow for aligning the timing of uplink transmissions on uplink component carriers, where different propagation delays are imposed on the transmissions on the uplink component carriers, the inventions suggests to time align the uplink component carriers based on a reference time alignment of a reference cell and a reception time difference or propagation delay difference between the downlink transmissions in the reference cell and the other radio cells, the uplink component carriers of which need to be time aligned.

19 Claims, 23 Drawing Sheets

(56) References Cited

U.S. PATENT DOCUMENTS

| | | | | |
|---|---|---|---|---|
| 6,321,083 | B1* | 11/2001 | Vaara | H04W 24/00 455/432.1 |
| 6,411,818 | B1* | 6/2002 | O'Reilly | H04W 52/283 455/422.1 |
| 6,826,406 | B1* | 11/2004 | Vialen | H04W 24/02 455/446 |
| 6,831,913 | B1* | 12/2004 | Vialen | H04W 88/08 370/349 |
| 2001/0046869 | A1* | 11/2001 | Cedervall | H04W 64/00 455/456.5 |
| 2003/0087647 | A1* | 5/2003 | Hurst | H04W 64/00 455/456.1 |
| 2004/0203623 | A1* | 10/2004 | Wu | H04L 1/88 455/412.1 |
| 2005/0075112 | A1* | 4/2005 | Ball | H04W 64/00 455/456.1 |
| 2007/0189205 | A1* | 8/2007 | Terry et al. | 370/328 |
| 2008/0274750 | A1* | 11/2008 | Carlson | G01S 5/12 455/456.1 |
| 2009/0239568 | A1* | 9/2009 | Bertrand | H04W 52/0225 455/522 |
| 2010/0227569 | A1* | 9/2010 | Bala et al. | 455/73 |
| 2010/0227627 | A1* | 9/2010 | Ishii | H04W 60/04 455/456.2 |
| 2011/0171949 | A1* | 7/2011 | Liao | H04W 56/0015 455/422.1 |
| 2011/0243102 | A1* | 10/2011 | Sebire | H04W 56/0045 370/336 |
| 2011/0261776 | A1* | 10/2011 | Ahn et al. | 370/329 |
| 2011/0268032 | A1* | 11/2011 | Kim et al. | 370/328 |
| 2011/0299489 | A1* | 12/2011 | Kim et al. | 370/329 |
| 2012/0113939 | A1* | 5/2012 | Kim | H04W 74/006 370/329 |
| 2012/0120821 | A1* | 5/2012 | Kazmi | H04W 56/0005 370/252 |
| 2012/0257570 | A1* | 10/2012 | Jang | H04L 1/1854 370/328 |
| 2012/0257601 | A1* | 10/2012 | Kim | H04L 5/001 370/336 |
| 2013/0195030 | A1* | 8/2013 | Wittberg | H04W 72/0446 370/329 |
| 2013/0315214 | A1* | 11/2013 | Bai | H04L 5/001 370/336 |
| 2014/0086224 | A1* | 3/2014 | Kwon | H04W 52/0219 370/336 |

OTHER PUBLICATIONS

3GPP R2-090258 (May 2009), titled "3GPP TSG-RAN WG2 Meeting #64bis; Jan. 12-16, Ljubljana, Slovenia; Change Request, 36.321 CR, version 8.4.0", (R2-090258 hereinafter) was published May 1, 2009, pp. 01-02.*

3GPP TSG-RAN WG2 Meeting #73bis R2-111953, titled "The Multiple Time Advances in Carrier Aggregation" (R2-111953 hereinafter) was published as Agenda Item 7.1, pp. 01-04 on Apr. 11-15, 2011.*

3GPP R2-112819 (May 9-13, 2011), titled "Time Alignment in case of multiple TA" was published May 2011. 3GPP R2-112819 (May 9-13, 2011).*

3GPP R2-112819 (May 9-13, 2011), titled "Time Alignment in case of multiple TA" was published May 2011.*

3GPP R2-095815 (Oct. 12-16, 2009), titled "Different Timing Advance Impact on Carrier Aggregation" was published Oct. 2009.*

3GPP TR 36.912 V2.1.1 (Sep. 2009), titled "3rd Generation Partnership Project; Technical Specification Group Radio Access Network; Evolved Universal Terrestrial Radio Access (E-UTRA); Medium Access Control (MAC) protocol specification (Release 9)", (TS 36.912 hereinafter) was published Sep. 2009, pp. 01-54.*

3GPP TS 25.402; 3rd Generation Partnership Project (3GPP); Technical Specification Group (TSG) RAN (hereinafter TS 25.402), titled Synchronization in UTRAN, Stage 2, (Release 9) Dec. 2009, pp. 01-51.*

European Search Report for Application No. 11001914.8-2411 dated Jul. 19, 2011.

International Search Report for PCT/EP2011/004091 dated Feb. 3, 2012.

Huawei et al "The Multiple Time Advances in Carrier Aggregation" 3GPP Draft; R2-111953; 3rd Generation Partnership Project (3GPP); Mobile Competence Centre; 650, Route Des Lucioles, F-06921 Sophia-Antipolis Cedex, France; vol. RAN WG2, No. Shanghai, CN; Apr. 5, 2011.

Huawei "Different Timing Advance Impact on Carrier Aggregation" 3GPP Draft; R2-095815; 3rd Generation Partnership Project (3GPP); Mobile Competence Centre; 650, Route Des Lucioles, F-06921 Sophia-Antipolis Cedex, France; No. Miyazaki; Oct. 12, 2009.

Huawei "CR on Time Alignment Timer" 3GPP Draft; R2-090258; 3rd Generation Partnership Project (3GPP); Mobile Competence Centre; 650, Route Des Luciole, F-06921 Sophia-Antipolis Cedex, France; No. Ljubljana; Jan. 5, 2009.

Erik Dahlmann et al "3GEvolution: HSPA and LTE for Mobile Broadband, passage" 3G Evolution; Academic Press in Elsevier, NL; pp. 490-495; Jun. 1, 2008.

ITRI "Time Alignment Timer for Different TA" 3GPP Draft; R2-100560; 3rd Generation Partnership Project (3GPP); Mobile Competence Centre; 650, Route Des Lucioles, F-06921 Sophia-Antipolis Cedex, France; vol. RAN WG2, No. Valencia, Spain; Jan. 12, 2010.

Ericsson "Configuration of the Time Alignment Timer" 3GPP Draft; R2-086411; 3rd Generation Partnership Project (3GPP); Mobile Competence Centre; 650, Route Des Lucioles, F-06921 Sophia-Antipolis Cedex, France; No. Prague, Czech Republic; Nov. 4, 2008.

NTT Docomo et al "Reference DL CC for TA" 3GPP Draft; R2-103221; 3rd Generation Partnership Project (3GPP); Mobile Competence Centre; 650, Route Des Lucioles, F-06921 Sophia-Antipolis Cedex, France; vol. RAN WG2, No. Montreal, Canada; May 4, 2010.

Ericsson et al "Text Proposal for CA BS TR: Time Alignment Between Carriers" 3GPP Draft; R4-102578; 3rd Generation Partnership Project (3GPP); Mobile Competence Centre; 650, Route Des Lucioles F-06921 Sophia-Antipolis Cedex, France; vol. RAN WG4, No. Bratislava; Jun. 23, 2010.

RAN WG4 "Reply LS on Multiple Timing Advance for Inter-Band CA" 3GPP Draft; R1-103296 (R4-101477); 3rd Generation Partnership Project (3GPP); Mobile Competence Centre; 650, Route Des Lucioles, F-06921 Sophia-Antipolis Cedex, France; vol. RAN-WG1, No. Montreal, Canada; May 7, 2010.

Huawei "Multiple Timing Advance Impact on RAN2" 3GPP Draft; R2-100110; 3rd Generation Partnership Project (3GPP); Mobile Competence Centre; 650, Route Des Lucioles, F-06921 Sophia-Antipolis Cedex, France; vol. RAN WG2, No. Valencia, Spain; Jan. 12, 2010.

* cited by examiner

| $C_7$ | $C_6$ | $C_5$ | $C_4$ | $C_3$ | $C_2$ | $C_1$ | R |
|---|---|---|---|---|---|---|---|
| R | R | \multicolumn{6}{l|}{DL Timing difference for SCell 1 ($\Delta_{SCell1-PCell}RX_{DL}$)} |
| R | R | \multicolumn{6}{l|}{DL Timing difference for SCell 2 ($\Delta_{SCell2-PCell}RX_{DL}$)} |
| ... | | | | | | | |
| R | R | \multicolumn{6}{l|}{DL Timing difference for SCell n ($\Delta_{SCelln-PCell}RX_{DL}$)} |

Fig. 29

| $C_7$ | $C_6$ | $C_5$ | $C_4$ | $C_3$ | $C_2$ | $C_1$ | R |
|---|---|---|---|---|---|---|---|
| R | R | \multicolumn{6}{l|}{DL Timing difference for PCell ($\Delta_{PCell-PCell}RX_{DL}-TX_{UL}$)} |
| R | R | \multicolumn{6}{l|}{DL Timing difference for SCell 2 ($\Delta_{SCell1-PCell}RX_{DL}-TX_{UL}$)} |
| ... | | | | | | | |
| R | R | \multicolumn{6}{l|}{DL Timing difference for SCell n ($\Delta_{SCelln-PCell}RX_{DL}-TX_{UL}$)} |

← optional

Fig. 30

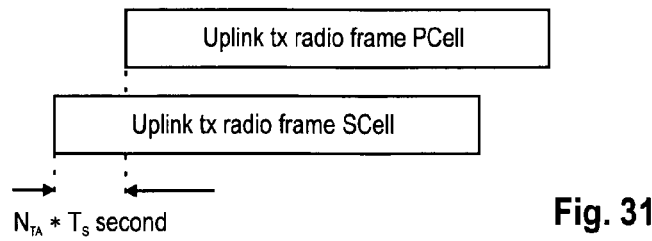

Fig. 31

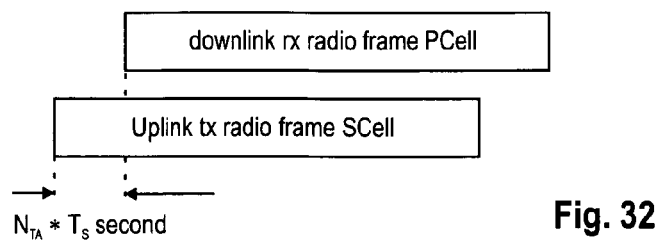

Fig. 32

| R | R | Timing Advance Command | Oct 1 |
|---|---|---|---|

Fig. 33

TIMING ADVANCE CONFIGURATION FOR MULTIPLE UPLINK COMPONENT CARRIERS

FIELD OF THE INVENTION

The invention relates methods for time aligning uplink transmissions by a mobile terminal in a mobile communication system. The invention is also providing apparatus and system for performing the methods described herein, as well as computer readable media the instructions of which cause the apparatus and system to perform the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UT-RAN) is to be finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques, and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

L1/2 Control Signalling

In order to inform the scheduled users about their allocation status, transport format and other data related information (e.g. HARQ) L1/L2 control signaling needs to be transmitted on the downlink along with the data. The control signaling needs to be multiplexed with the downlink data in a sub frame (assuming that the user allocation can change from sub frame to sub frame). Here, it should be noted that user allocation might also be performed on a TTI (Transmission Time Interval) basis, where the TTI length may be a multiple of the sub frames. The TTI length may be fixed in a service area for all users, may be different for different users, or may even by dynamic for each user. Generally, then the L1/2 control signaling needs only be transmitted once per TTI. The L1/L2 control signalling is transmitted on the Physical Downlink Control Channel (PDCCH). It should be noted that assignments for uplink data transmissions, UL grants, are also transmitted on the PDCCH.

Generally, the information sent on the L1/L2 control signaling may be separated into the following two categories:
Shared Control Information (SCI) carrying Cat 1 information. The SCI part of the L1/L2 control signaling contains information related to the resource allocation (indication). The SCI typically contains the following information:

- User identity, indicating the user which is allocated
- RB allocation information, indicating the resources (Resource Blocks, RBs) on which a user is allocated. Note, that the number of RBs on which a user is allocated can be dynamic.
- Optional: Duration of assignment, if an assignment over multiple sub frames (or TTIs) is possible Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI) carrying Cat 2/3 information

The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1. The DCI typically contains information on:

- Cat 2: Modulation scheme, transport block (payload) size (or coding rate), MIMO related information, etc.
- Cat 3: HARQ related information, e.g. hybrid ARQ process number, redundancy version, retransmission sequence number In the following the detailed L1/L2 control signalling information signalled for DL allocation respectively uplink assignments is described in the following:

Downlink Data Transmission:

Along with the downlink packet data transmission, L1/L2 control signaling is transmitted on a separate physical channel (PDCCH). This L1/L2 control signaling typically contains information on:

- The physical resource(s) on which the data is transmitted (e.g. subcarriers or subcarrier blocks in case of OFDM, codes in case of CDMA). This information allows the UE (receiver) to identify the resources on which the data is transmitted.
- The transport Format, which is used for the transmission. This can be the transport block size of the data (payload size, information bits size), the MCS (Modulation and Coding Scheme) level, the Spectral Efficiency, the code rate, etc. . . . . This information (usually together with the resource allocation) allows the UE (receiver) to identify the information bit size, the modulation scheme and the code rate in order to start the demodulation, the de rate matching and the decoding process. In some cases the modulation scheme maybe signaled explicitly.
- Hybrid ARQ (HARQ) Information:
  - Process number: Allows the UE to identify the hybrid ARQ process on which the data is mapped
  - Sequence number or new data indicator: Allows the UE to identify if the transmission is a new packet or a retransmitted packet
  - Redundancy and/or constellation version: Tells the UE, which hybrid ARQ redundancy version is used (required for de-rate matching) and/or which modulation constellation version is used (required for demodulation)
- UE Identity (UE ID): Tells for which UE the L1/L2 control signaling is intended for. In typical implementations this information is used to mask the CRC of the L1/L2 control signaling in order to prevent other UEs to read this information.

Uplink Data Transmission:

To enable an uplink packet data transmission, L1/L2 control signaling is transmitted on the downlink (PDCCH) to tell the UE about the transmission details. This L1/L2 control signaling typically contains information on:

- The physical resource(s) on which the UE should transmit the data (e.g. subcarriers or subcarrier blocks in case of OFDM, codes in case of CDMA).
- The transport Format, the UE should use for the transmission. This can be the transport block size of the data (payload size, information bits size), the MCS (Modulation and Coding Scheme) level, the Spectral Efficiency, the code rate, etc. This information (usually together with the resource allocation) allows the UE (transmitter) to pick the information bit size, the modulation scheme and the code rate in order to start the modulation, the rate matching and the encoding process. In some cases the modulation scheme maybe signaled explicitly.
- Hybrid ARQ information:
  - Process number: Tells the UE from which hybrid ARQ process it should pick the data
  - Sequence number or new data indicator: Tells the UE to transmit a new packet or to retransmit a packet
  - Redundancy and/or constellation version: Tells the UE, which hybrid ARQ redundancy version to use (required for rate matching) and/or which modulation constellation version to use (required for modulation)
- UE Identity (UE ID): Tells which UE should transmit data. In typical implementations this information is used to mask the CRC of the L1/L2 control signaling in order to prevent other UEs to read this information.

There are several different flavors how to exactly transmit the information pieces mentioned above. Moreover, the L1/L2 control information may also contain additional information or may omit some of the information. E.g.:

- HARQ process number may not be needed in case of a synchronous HARQ protocol
- A redundancy and/or constellation version may not be needed if Chase Combining is used (always the same redundancy and/or constellation version) or if the sequence of redundancy and/or constellation versions is pre defined.
- Power control information may be additionally included in the control signaling
- MIMO related control information, such as e.g. precoding, may be additionally included in the control signaling.
- In case of multi-codeword MIMO transmission transport format and/or HARQ information for multiple code words may be included For uplink resource assignments (PUSCH) signalled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively MCS field has for example a size of 5 bits, which corresponds to 32 entries. 3 TF/MCS table entries are reserved for indicating RVs 1, 2 or 3. The remaining MCS table entries are used to signal the MCS level (TBS) implicitly indicating RV0. The size of the CRC field of the PDCCH is 16 bits. Further detailed information on the control information for uplink resource allocation on PUSCH can be found in TS36.212 section 5.3.3 and TS36.213 section 8.6.

For downlink assignments (PDCCH) signalled on PDCCH in LTE the Redundancy Version (RV) is signalled separately in a two-bit field. Furthermore the modulation order information is jointly encoded with the transport format information. Similar to the uplink case there is 5 bit MCS field signalled on PDCCH. 3 of the entries are reserved to signal an explicit modulation order, providing no Transport format (Transport block) info. For the remaining 29 entries modulation order and Transport block size info are signalled. Further detailed information on the control information for uplink resource allocation on PUSCH can be found in TS36.212 section 5.3.3 and TS36.213 section 7.1.7

Component Carrier Structure in LTE (Release 8)

The downlink component carrier of a 3GPP LTE (Release 8) is subdivided in the time-frequency domain in so-called sub-frames. In 3GPP LTE (Release 8) each sub-frame is divided into two downlink slots as shown in FIG. 3, wherein the first downlink slot comprises the control channel region (PDCCH region) within the first OFDM symbols. Each sub-frame consists of a given number of OFDM symbols in the time domain (12 or 14 OFDM symbols in 3GPP LTE (Release 8)), wherein each of OFDM symbol spans over the entire bandwidth of the component carrier. The OFDM symbols thus each consists of a number of modulation symbols transmitted on respective $N_{RB}^{DL} \times N_{SC}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{ac}^{RB}$ consecutive subcarriers in the frequency domain as exemplified in FIG. 4. In 3GPP LTE (Release 8), a physical resource block thus consists of $N_{symb}^{DL} \times N_{SC}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the Rel. 8/9 numerology. It is possible to configure a user equipment to aggregate a different number of component carriers originating from the same eNodeB and of possibly different bandwidths in the uplink and the downlink:

- The number of downlink component carriers that can be configured depends on the downlink aggregation capability of the user equipment;
- The number of uplink component carriers that can be configured depends on the uplink aggregation capability of the user equipment;
- It is not possible to configure a user equipment with more uplink component carriers than downlink component carriers;
- In typical TDD deployments, the number of component carriers and the bandwidth of each component carrier in uplink and downlink is the same.

Component carriers originating from the same eNodeB need not to provide the same coverage.

The spacing between centre frequencies of contiguously aggregated component carriers shall be a multiple of 300 kHz. This is in order to be compatible with the 100 kHz frequency raster of Rel. 8/9 and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO—Single User Multiple Input Multiple Output—for uplink) at most one transport block per component carrier. A transport block and its potential HARQ retransmissions need to be mapped on the same component carrier. The Layer 2 structure with activated carrier aggregation is shown in FIG. 5 and FIG. 6 for the downlink and uplink respectively.

When carrier aggregation is configured, the user equipment only has one RRC connection with the network. At RRC connection establishment/re-establishment, one serving cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected mode. In the downlink, the carrier corresponding to the PCell is the Downlink Primary Component Carrier (DL PCC), while in the uplink it is the Uplink Primary Component Carrier (UL PCC).

Depending on the user equipment's capabilities, Secondary Cells (SCells) can be configured to form a set of serving cells, together with the PCell. Therefore, the configured set of serving cells for a user equipment always consists of one PCell and one or more SCells. The characteristics of the downlink and uplink PCell and SCells are

- The uplink PCell is used for transmission of Layer 1 uplink control information (PUCCH)
- Unlike SCells, the downlink PCell cannot be de-activated
- Re-establishment is triggered when the downlink PCell experiences Rayleigh fading (RLF), not when downlink SCells experience RLF
- For each SCell the usage of uplink resources by the UE in addition to the downlink ones is configurable (the number of DL SCCs configured is therefore always larger or equal to the number of UL SCells and no SCell can be configured for usage of uplink resources only)
- From a UE viewpoint, each uplink resource only belongs to one serving cell
- PCell can only be changed with handover procedure (i.e. with security key change and RACH procedure)
- The number of serving cells that can be configured depends on the aggregation capability of the UE
- Non-access stratum information is taken from the downlink PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, user equipments need not acquire broadcast system information directly from the SCells.

When carrier aggregation is configured, a user equipment may be scheduled over multiple component carriers simultaneously, but at most one random access procedure should be ongoing at any time. Cross-carrier scheduling allows the Physical Downlink Control Channel (PDCCH) of a component carrier to schedule resources on another component carrier. For this purpose a component carrier identification field (CIF) is introduced in the respective Downlink Control Information (DCI) formats. A linking between uplink and downlink component carriers allows identifying the uplink component carrier for which the grant applies when there is no-cross-carrier scheduling. The linkage of downlink component carriers to uplink component carriers does not necessarily need to be one to one. In other words, more than one downlink component carrier can link to the same uplink component carrier. At the same time, a downlink component carrier can only link to one uplink component carrier.

Activation/Deactivation of SCells

To enable reasonable UE battery consumption when CA is configured, an activation/deactivation mechanism of SCells is supported (i.e. activation/deactivation does not apply to PCell). When an SCell is deactivated, the UE does not need to receive the corresponding PDCCH or PDSCH, cannot transmit in the corresponding uplink, nor is it required to perform CQI measurements. Conversely, when an SCell is active, the UE shall receive PDSCH and PDCCH (if the UE is configured to monitor PDCCH from this SCell), and is expected to be able to perform CQI measurements.

The activation/deactivation mechanism is based on the combination of a MAC control element and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. The corresponding activation/deactivation MAC CE is shown in FIG. 20. It should be noted, that even though there is a maximum of 4 Scells a UE can aggregate, the MAC CE contains 7 entries, each of them corresponding to an SCell configured with SCellIndex i.

One deactivation timer is maintained per SCell but one common value is configured per UE by RRC. At reconfiguration without mobility control information:

- SCells added to the set of serving cells are initially "deactivated";
- SCells which remain in the set of serving cells (either unchanged or reconfigured) do not change their activation status ("activated" or "deactivated").

At reconfiguration with mobility control information (i.e. handover):

- SCells are "deactivated".

Uplink Access Scheme for LTE

For Uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size BWgrant during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource BWgrant over a longer time period than one TTI to a user by concatenation of sub-frames.

Uplink Scheduling Scheme for LTE

The uplink scheme allows for both scheduled access, i.e. controlled by eNB, and contention-based access.

In case of scheduled access the UE is allocated a certain frequency resource for a certain time (i.e. a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e. when UE is performing initial access to a cell or for requesting uplink resources.

For the scheduled access Node B scheduler assigns a user a unique frequency/time resource for uplink data transmission. More specifically the scheduler determines which UE(s) that is (are) allowed to transmit,
which physical channel resources (frequency),
Transport format (Modulation Coding Scheme (MCS)) to be used by the mobile terminal for transmission The allocation information is signalled to the UE via a scheduling grant, sent on the L1/L2 control channel. For simplicity reasons this channel is called uplink grant channel in the following. A scheduling grant message contains at least information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e. there are no "per UE per RB" grants). Therefore the UE needs to distribute the allocated resources among the radio bearers according to some rules, which will be explained in detail in the next section. Unlike in HSUPA there is no UE based transport format selection. The eNB decides the transport format based on some information, e.g. reported scheduling information and QoS info, and UE has to follow the selected transport format. In HSUPA Node B assigns the maximum uplink resource and UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.

Starvation of low priority services should be avoided
Clear QoS differentiation for radio bearers/services should be supported by the scheduling scheme
The UL reporting should allow fine granular buffer reports (e.g. per radio bearer or per radio bearer group) in order to allow the eNB scheduler to identify for which Radio Bearer/service data is to be sent.
It should be possible to make clear QoS differentiation between services of different users
It should be possible to provide a minimum bit rate per radio bearer As can be seen from above list one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signalled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Uplink Power Control

Uplink transmission power control in a mobile communication system serves an important purpose: it balances the need for sufficient transmitted energy per bit to achieve the required Quality-of-Service (QoS), against the needs to minimize interference to other users of the system and to maximize the battery life of the mobile terminal. In achieving this purpose, the role of the Power Control (PC) becomes decisive to provide the required SINR while controlling at the same time the interference caused to neighbouring cells. The idea of classic PC schemes in uplink is that all users are received with the same SINR, which is known as full compensation. As an alternative, 3GPP has adopted for LTE the use of Fractional Power Control (FPC). This new functionality makes users with a higher path-loss operate at a lower SINR requirement so that they will more likely generate less interference to neighbouring cells.

Detailed power control formulae are specified in LTE for the Physical Uplink Shared Channel (PUSCH), Physical Uplink Control Channel (PUCCH) and the Sounding Reference Signals (SRSs) (section 5.1 in TS36.213). The formula for each of these uplink signals follows the same basic principles; in all cases they can be considered as a summation of two main terms: a basic open-loop operating point derived from static or semi-static parameters signalled by the eNodeB, and a dynamic offset updated from subframe to subframe.

The basic open-loop operating point for the transmit power per resource block depends on a number of factors including the inter-cell interference and cell load. It can be further broken down into two components, a semi-static base level P0, further comprised of a common power level for all UEs in the cell (measured in dBm) and a UE-specific offset, and an open-loop path-loss compensation component. The dynamic offset part of the power per resource block can also be further broken down into two components, a component dependent on the MCS and explicit Transmitter Power Control (TPC) commands.

The MCS-dependent component (referred to in the LTE specifications as $\Delta_{TF}$, where TF stands for 'Transport Format') allows the transmitted power per RB to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signalling—i.e. the mode cannot be changed dynamically. With the accumulative TPC commands, each TPC command signals a power step relative to the previous level.

The formula below shows the UE transmit power, expressed in dBm, for PUSCH:

$$P = \min\lfloor P_{MAX}, 10 \cdot \log_{10} M + P_{0\_PUSCH} + \alpha \cdot PL + \Delta_{MCS} + f(\Delta_i) \rfloor dBm]$$

PMAX is the maximum UE power which depends on the UE class.
M is the number of allocated physical resource blocks (PRBs).
PL is the UE path loss derived at the UE based on RSRP measurement and signalled RS eNode-B transmission power.

$\Delta_{MCS}$ is an MCS-dependent power offset set by the eNB.

$P_{0\_PUSCH}$ is a UE-specific parameter (partially broadcasted and partially signalled using RRC).

α is cell-specific parameter (broadcasted on BCH).

$\Delta_i$ are closed loop PC commands signalled from the eNode-B to the UE function f( ) indicates whether closed loop commands are relative accumulative or absolute. f( ) is signalled to the UE via higher layers.

Uplink Power Control for Carrier Aggregation

One main point of UL Power control for LTE-Advance is that a component carrier specific UL power control is supported, i.e. there will be one independent power control loop for each UL component carrier configured for the UE. Furthermore power headroom is reported per component carrier.

In Rel-10 within the scope of carrier aggregation there are two maximum power limits, a maximum total UE transmit power and a CC-specific maximum transmit power. RAN1 agreed at the RAN1#60bis meeting that a power headroom report, which is reported per CC, accounts for the maximum power reduction (MPR). In other words the power reduction applied by the UE is taken into account in the CC-specific maximum transmission power $P_{CMAX,c}$ (c denotes the component carrier).

Different to Rel-8/9, for LTE-A the UE has also to cope with simultaneous PUSCH-PUCCH transmission, multi-cluster scheduling and simultaneous transmission on multiple CCs, which requires larger MPR values and also causes a larger variation of the applied MPR values compared to Rel-8/9.

It should be noted that the eNB does not have knowledge of the power reduction applied by the UE on each CC, since the actual power reduction depends on the type of allocation, the standardized MPR value and also on the UE implementation. Therefore eNB doesn't know the CC-specific maximum transmission power relative to which the UE calculates the PHR.

In Rel-8/9 for example UE's maximum transmit power Pcmax can be within some certain range as described above.

$$P_{CMAX\_L} \leq P_{CMAX} \leq P_{CMAX\_H}$$

Due to the fact that the power reduction applied by the UE to the maximum transmit power of a CC is not known by eNB it was agreed to introduce in Rel-10 a new power headroom MAC control element, which is also referred to as extended power headroom MAC control element. The main difference to the Rel-8/9 PHR MAC CE format, is that it includes a Rel-8/9 power headroom value for each activated UL CC and is hence of variable size. Furthermore it not only reports the power headroom value for a CC but also the corresponding Pcmax,c (maximum transmit power of CC with the index c) value. In order to account for simultaneous PUSCH-PUCCH transmissions, UE reports for PCell the Rel-8/9 power headroom value which is related to PUSCH only transmissions (referred to type 1 power headroom) and if the UE is configured for simultaneous PUSCH-PUCCH transmission, a further Power headroom value, which considers PUCCH and PUSCH transmissions, also referred to as type 2 power headroom (see FIG. 21). Further details of the extended power headroom MAC Control element can be found in section 6.1.3.6a of TS36.321.

If the total transmit power of the UE, i.e. sum of transmission power on all CCs, would exceed the maximum UE transmit power $\hat{P}_{CMAX}(i)$, the UE needs to scale down uplink transmission power on PUSCH/PUCCH. There are certain rules for the prioritization of the uplink channels during power scaling defined. Basically control information transmitted on the PUCCH has the highest priority, i.e. PUSCH transmissions are scaled down first before PUCCH transmission power is reduced. This can be also expressed by the following condition which needs to be fulfilled:

$$\sum_c w(i) \cdot \hat{P}_{PUSCH,c}(i) \leq \left( \hat{P}_{CMAX}(i) - \hat{P}_{PUCCH}(i) \right)$$

where $\hat{P}_{PUCCH}(i)$ is the linear value of $P_{PUCCH}(i)$ (PUCCH transmission power in subframe i), $\hat{P}_{PUSCH,c}(i)$ is the linear value of $P_{PUSCH,c}(i)$ (PUSCH transmission power on carrier c in subframe i), $\hat{P}_{CMAX}(i)$ is the linear value of the UE total configured maximum output power $P_{CMAX}$ in subframe i and w(i) is a scaling factor of $\hat{P}_{PUSCH,c}(i)$ for serving cell c where $0 \leq w(i) \leq 1$. In case there is no PUCCH transmission in subframe i, $\hat{P}_{PUCCH}(i)=0$.

For the case that the UE has PUSCH transmission with Uplink control information (UCI) on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe/such that the condition $$\sum_{c \neq j} w(i) \cdot \hat{P}_{PUSCH,c}(i) \leq \left( \hat{P}_{CMAX}(i) - \hat{P}_{PUSCH,j}(i) \right)$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling is applied to $\hat{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$. Note that w(i) values are the same across serving cells when w(i)>0 but for certain serving cells w(i) may be zero.

If the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i) = \min\left( \hat{P}_{PUSCH,j}(i), \left( \hat{P}_{CMAX}(i) - \hat{P}_{PUCCH}(i) \right) \right) \text{ and}$$

$$\sum_{c \neq j} w(i) \cdot \hat{P}_{PUSCH,c}(i) \leq \left( \hat{P}_{CMAX}(i) - \hat{P}_{PUCCH}(i) - \hat{P}_{PUSCH,j}(i) \right)$$

Timing Advance

For the uplink transmission scheme of 3GPP LTE single-carrier frequency division multiple access (SC-FDMA) was chosen to achieve an orthogonal multiple-access in time and frequency between the different user equipments transmitting in the uplink.

Uplink orthogonality is maintained by ensuring that the transmissions from different user equipments in a cell are time-aligned at the receiver of the eNodeB. This avoids intra-cell interference occurring, both between user equipments assigned to transmit in consecutive sub-frames and between user equipments transmitting on adjacent subcarriers. Time alignment of the uplink transmissions is achieved by applying a timing advance at the user equipment's transmitter, relative to the received downlink timing as exemplified in FIG. 9. The main role of this is to counteract differing propagation delays between different user equipments.

Initial Timing Advance Procedure

When user equipment is synchronized to the downlink transmissions received from eNodeB, the initial timing advance is set by means of the random access procedure as described below. The user equipment transmits a random access preamble based on which the eNodeB can estimate the uplink timing. The eNodeB responds with an 11-bit initial timing advance command contained within the Random Access Response (RAR) message. This allows the timing advance to be configured by the eNodeB with a granularity of 0.52 µs from 0 up to a maximum of 0.67 ms.

Additional information on the control of the uplink timing and timing advance on 3GPP LTE (Release 8/9) can be found in chapter 20.2 of Stefania Sesia, Issam Toufik and Matthew Baker, "LTE The UMTS Long Term Evolution: From Theory to Practice", John Wiley & Sons, Ltd. 2009, which is incorporated herein by reference.

Updates of the Timing Advance

Once the timing advance has been first set for each user equipment, the timing advance is updated from time to time to counteract changes in the arrival time of the uplink signals at the eNodeB. In deriving the timing advance update commands, the eNodeB may measure any uplink signal which is useful. The details of the uplink timing measurements at the eNodeB are not specified, but left to the implementation of the eNodeB.

The timing advance update commands are generated at the Medium Access Control (MAC) layer in the eNodeB and transmitted to the user equipment as MAC control elements which may be multiplexed together with data on the Physical Downlink Shared Channel (PDSCH). Like the initial timing advance command in the response to the Random Access Channel (RACH) preamble, the update commands have a granularity of 0.52 µs. The range of the update commands is ±16 µs, allowing a step change in uplink timing equivalent to the length of the extended cyclic prefix. They would typically not be sent more frequently than about every 2 seconds. In practice, fast updates are unlikely to be necessary, as even for a user equipment moving at 500 km/h the change in round-trip path length is not more than 278 m/s, corresponding to a change in round-trip time of 0.93 µs/s.

The eNodeB balances the overhead of sending regular timing update commands to all the UEs in the cell against a UE's ability to transmit quickly when data arrives in its transmit buffer. The eNodeB therefore configures a timer for each user equipment, which the user equipment restarts each time a timing advance update is received. In case the user equipment does not receive another timing advance update before the timer expires, it must then consider that it has lost uplink synchronization (see also section 5.2 of 3GPP TS 36.321, "Evolved Universal Terrestrial Radio Access (E-UTRA); Medium Access Control (MAC) protocol specification", version 8.9.0, available at http://www.3gpp.org and incorporated herein by reference).

In such a case, in order to avoid the risk of generating interference to uplink transmissions from other user equipments, the UE is not permitted to make another uplink transmission of any sort and needs to revert to the initial timing alignment procedure in order to restore the uplink timing.

Upon reception of a timing advance command, the user equipment shall adjust its uplink transmission timing for PUCCH/PUSCH/SRS of the primary cell. The timing advance command indicates the change of the uplink timing relative to the current uplink timing as multiples of $16\,T_s$.

Random Access Procedure

A mobile terminal in LTE can only be scheduled for uplink transmission, if its uplink transmission is time synchronized. Therefore the Random Access (RACH) procedure plays an important role as an interface between non-synchronized mobile terminals (UEs) and the orthogonal transmission of the uplink radio access.

Essentially the Random Access in LTE is used to achieve uplink time synchronization for a user equipment which either has not yet acquired, or has lost, its uplink synchronization. Once a user equipment has achieved uplink synchronization, the eNodeB can schedule uplink transmission resources for it. The following scenarios are therefore relevant for random access:

A user equipment in RRC_CONNECTED state, but not uplink-synchronized, wishing to send new uplink data or control information A user equipment in RRC_CONNECTED state, but not uplink-synchronized, required to receive downlink data, and therefore to transmit corresponding HARQ feedback, i.e. ACK/NACK, in the uplink. This scenario is also referred to as Downlink data arrival A user equipment in RRC_CONNECTED state, handing over from its current serving cell to a new target cell; in order to achieve uplink time-synchronization in the target cell, Random Access procedure is performed A transition from RRC_IDLE state to RRC_CONNECTED, for example for initial access or tracking area updates Recovering from radio link failure, i.e. RRC connection re-establishment There is one more additional case, where user equipment performs random access procedure, even though user equipment is time-synchronized. In this scenario the user equipment uses the random access procedure in order to send a scheduling request, i.e. uplink buffer status report, to its eNodeB, in case it does not have any other uplink resource allocated in which to send the scheduling request, i.e. dedicated scheduling request (D-SR) channel is not configured.

LTE offers two types of random access procedures allowing access to be either contention based, i.e. implying an inherent risk of collision, or contention-free (non-contention based). It should be noted that contention-based random access can be applied for all six scenarios listed above, whereas a non-contention based random access procedure can only be applied for the downlink data arrival and handover scenario.

In the following the contention based random access procedure is being described in more detail with respect to FIG. 7. A detailed description of the random access procedure can be also found in 3GPP 36.321, section 5.1.

FIG. 7 shows the contention based RACH procedure of LTE. This procedure consists of four "steps". First, the user equipment transmits 701a random access preamble on the Physical Random Access Channel (PRACH) to the eNodeB. The preamble is selected by user equipment from the set of available random access preambles reserved by eNodeB for contention based access. In LTE, there are 64 preambles per cell which can be used for contention-free as well as contention based random access. The set of contention based preambles can be further subdivided into two groups, so that the choice of preamble can carry one bit of information to indicate information relating to the amount of transmission resources needed for the first scheduled transmission, which is referred to as msg3 in TS36.321 (see step 703). The system information broadcasted in the cell contain the information which signatures (preambles) are in each of the two subgroups as well as the meaning of each subgroup. The user equipment randomly selects one preamble from the subgroup corresponding to the size of transmission resource needed for message 3 transmission.

After eNodeB has detected a RACH preamble, it sends 702 a Random Access Response (RAR) message on the PDSCH (Physical Downlink Shared Channel) addressed on the PDCCH with the (Random Access) RA-RNTI identifying the time-frequency slot in which the preamble was detected. If multiple user equipments transmitted the same RACH preamble in the same PRACH resource, which is also referred to as collision, they would receive the same random access response.

The RAR message conveys the detected RACH preamble, a timing alignment command (TA command) for synchronization of subsequent uplink transmissions, an initial uplink resource assignment (grant) for the transmission of the first scheduled transmission (see step 703) and an assignment of a Temporary Cell Radio Network Temporary Identifier (T-CRNTI). This T-CRNTI is used by eNodeB in order to address the mobile(s) whose RACH preamble were detected until RACH procedure is finished, since the "real" identity of the mobile is at this point not yet known by eNodeB.

Furthermore the RAR message can also contain a so-called back-off indicator, which the eNodeB can set to instruct the user equipment to back off for a period of time before retrying a random access attempt. The user equipment monitors the PDCCH for reception of random access response within a given time window, which is configured by the eNodeB. In case user equipment doesn't receive a random access response within the configured time window, it retransmits the preamble at the next PRACH opportunity considering a potentially back off period.

In response to the RAR message received from the eNodeB, the user equipment transmits 703 the first scheduled uplink transmission on the resources assigned by the grant within the random access response. This scheduled uplink transmission conveys the actual random access procedure message like for example RRC connection request, tracking area update or buffer status report. Furthermore it includes either the C-RNTI for user equipments in RRC_CONNECTED mode or the unique 48-bit user equipment identity if the user equipments are in RRC_IDLE mode. In case of a preamble collision having occurred in step 701, i.e. multiple user equipments have sent the same preamble on the same PRACH resource, the colliding user equipments will receive the same T-CRNTI within the random access response and will also collide in the same uplink resources when transmitting 703 their scheduled transmission. This may result in interference that no transmission from a colliding user equipment can be decoded at the eNodeB, and the user equipments will restart the random access procedure after having reached maximum number of retransmission for their scheduled transmission. In case the scheduled transmission from one user equipment is successfully decoded by eNodeB, the contention remains unsolved for the other user equipments.

For resolution of this type of contention, the eNodeB sends 704 a contention resolution message addressed to the C-RNTI or Temporary C-RNTI, and, in the latter case, echoes the 48-bit user equipment identity contained the scheduled transmission of step 703. It supports HARQ. In case of collision followed by a successful decoding of the message sent in step 703, the HARQ feedback (ACK) is only transmitted by the user equipment which detects its own identity, either C-RNTI or unique user equipment ID. Other UEs understand that there was a collision at step 1 and can quickly exit the current RACH procedure and start another one.

FIG. 8 is illustrating the contention-free random access procedure of 3GPP LTE Rel. 8/9. In comparison to the contention based random access procedure, the contention-free random access procedure is simplified. The eNodeB provides 801 the user equipment with the preamble to use for random access so that there is no risk of collisions, i.e. multiple user equipment transmitting the same preamble. Accordingly, the user equipment is sending 802 the preamble which was signaled by eNodeB in the uplink on a PRACH resource. Since the case that multiple UEs are sending the same preamble is avoided for a contention-free random access, no contention resolution is necessary, which in turn implies that step 704 of the contention based procedure shown in FIG. 7 can be omitted. Essentially a contention-free random access procedure is finished after having successfully received the random access response.

When carrier aggregation is configured, the first three steps of the contention-based random access procedure occur on the PCell, while contention resolution (step 704) can be cross-scheduled by the PCell.

The initial preamble transmission power setting is based on an open-loop estimation with full compensation of the path loss. This is designed to ensure that the received power of the preambles is independent of the path-loss.

The eNB may also configure an additional power offset, depending for example on the desired received SINR, the measured uplink interference and noise level in the time-frequency slots allocated to RACH preambles, and possibly on the preamble format. Furthermore, the eNB may configure preamble power ramping so that the transmission for each retransmitted preamble, i.e. in case the PRACH transmission attempt was not successfully, is increased by a fixed step.

The PRACH power is determined by UE through evaluation of $$P\text{PRACH} = \min\{P_{CMAX,c}(i), \text{PREAMBLE\_RECEIVED\_TARGET\_POWER} + PL_C\}[\text{dBm}],$$

where $P_{CMAX,c}(i)$ is the configured maximum UE transmit power for subframe i of the primary cell and $PL_C$ is the downlink pathloss estimate calculated in the UE for the primary cell.

PREAMBLE_RECEIVED_TARGET_POWER is set to:

preambleInitialReceivedTargetPower+DELTA_PREAMBLE+(PREAMBLE_TRANSMISSION_COUNTER−1)*powerRampingStep.

Timing Advance and Component Carrier Aggregation in the Uplink

In currents specifications of the 3GPP standards the user equipment only maintains one timing advance value and applies this to uplink transmissions on all aggregated component carriers. At the moment, aggregation of cells within the same frequency band is supported, so called intra-frequency carrier aggregation. In particular, uplink timing synchronization is performed for PCell, e.g. by RACH procedure on PCell, and then the user equipment uses the same uplink timing for uplink transmissions on aggregated SCells. A single timing advance for all aggregated uplink component carriers is regarded as sufficient, since current specifications up to 3GPP LTE-A Rel. 10 support only carrier aggregation of carriers from the same frequency band.

However, in the future, e.g. future Release 11, it will be possible to aggregate uplink component carriers from different frequency bands, in which case they can experience different interference and coverage characteristics. Assuming uplink component carriers on widely separated frequency bands, uplink transmissions using the uplink component carriers may be subject to different transmission channel effects. In other words, since transmission channels have to be assumed frequency selective, uplink component carriers on widely separated frequency bands may be differently affected by scattering, multipath propagation and channel fading. Accordingly, the aggregation of uplink component carriers from different frequency bands has to compensate for different propagation delays on the frequency bands.

Furthermore the deployment of technologies like Remote Radio Heads (RRH) as shown for example in FIG. 13 or Frequency Selective Repeaters (FSR) as shown for example in FIG. 14 will also cause different interference and propagation scenarios for the aggregated component carriers. For instance, FIG. 14 illustrates how the FSR relays signals of only frequency f2 relating to the component carrier 2 (CoCa2); signals of frequency f1 are not boosted by the FSR. Consequently, when assuming that the signal strength of the signal from the FSR is greater than the one of the eNodeB (not shown), the component carrier 2 will be received by the user equipment via the frequency-selective repeater, whereas the UE receives the component carrier 1 (CoCa1) directly from the eNodeB. This leads to different propagation delays between the two component carriers.

Therefore, there is a need of introducing more than one timing advance within one user equipment, i.e. separate timing advance may be required for certain component carriers (Serving Cells).

One obvious solution is to perform a RACH procedure also on each of the SCells to achieve uplink synchronization, in a similar way to the PCell. Performing a RACH procedure on a SCell however would result in various disadvantages.

The power control/power allocation procedure is complicated when considering simultaneous transmission of the PRACH and the PUSCH/PUCCH in one subframe, i.e. TTI. This might be the case where the uplink of the user equipment is out of synchronization on one component carrier, e.g. SCell, while still being uplink synchronized on another uplink component carrier, e.g. PCell. In order to regain uplink synchronization for the SCell, the user equipment performs a RACH access, e.g. ordered by PDCCH. Consequently, the user equipment transmits a RACH preamble, i.e. performs a PRACH transmission, and in the same TTI the user equipment also transmits PUSCH and/or PUCCH.

Currently, the power control loops for PUSCH/PUCCH and PRACH are totally independent, i.e. PRACH power is not considered when determining PUSCH/PUCCH power, and vice versa. In order to deal with simultaneous PRACH and PUSCH/PUCCH transmissions, changes to the uplink power control algorithm are required. For instance, it would be necessary to consider the PRACH transmission when power scaling needs to be used due to power limitation, since up to now only PUCCH, PUSCH with multiplexed uplink control information (UCI) and PUSCH without UCI are considered for the power limitation case. PUCCH is given the highest priority over PUSCH, and the PUSCH with multiplexed UCI is considered to have a higher priority over PUSCH without UCI.

PUCCH>PUSCH w UCI>PUSCH w/o UCI

The prioritization rules for the power limitation case which are listed in the chapter relating to the Uplink Power Control would have to be extended by PRACH transmissions. However, there is no easy straightforward solution in said respect, since on the one hand uplink control information transmitted on PUCCH or PUSCH have a high priority in order to allow for proper system operation, whereas on the other hand PRACH should be also prioritized in order to ensure a high detection probability at the eNB in order to minimize the delay incurred by the RACH procedure.

In addition to the power control aspects, there is also a further disadvantage regarding the power amplifier that would have to deal with the simultaneous PRACH and PUSCH/PUCCH transmissions. There are certain differences in the uplink timing between the PRACH and the PUSCH/PUCCH, e.g. the timing advance for PRACH is of course 0; Guard Time, GT, which is in the range of 96.88 μs to 715.63 μs. This is depicted in FIG. 22 showing PUSCH transmissions on component carrier 0, and a corresponding PRACH transmission on component carrier 1.

Due to the Guard Time, there are power fluctuations within one subframe, which are undesirable. These power transients will add extra complexity to the implementation of the user equipment; in other words, the maximum power reduction needs to also change during one subframe in order to fulfill the EMC requirements.

SUMMARY OF THE INVENTION

The present invention strives to avoid the various disadvantages mentioned above.

One object of the invention is to propose a mechanism for aligning the timing of uplink transmissions on uplink component carriers, where different propagation delays are imposed on the transmissions on the uplink component carriers. Another object of the invention is to suggest a mechanism for allowing a mobile terminal to perform time alignment of uplink component carriers, without performing a random access procedure.

The object is solved by the subject matter of the independent claims. Advantageous embodiments are subject to the dependent claims. A further object is to propose handover mechanisms that allow reducing the handover delay due to time alignment of multiple uplink component carriers.

According to a first aspect of the invention, the mobile terminal time aligns a non-time aligned uplink cell (termed in the following target cell) relative to a reference uplink cell which is already time-aligned and controlled by a same or a different aggregation access point as the target cell and transmits timing information, on which the procedure of time aligning of the non-time aligned uplink target cell is based, to the aggregation access point. It is assumed that at least one existing cell is already time-aligned and serves as reference cell for the time-aligning procedure of the invention. Advantageously, the timing information transmitted to the aggregation access point can be used by the aggregation access point for controlling the time-aligning process in the uplink target cell.

In more detail, instead of performing a random access channel, RACH, procedure, the mobile terminal time aligns uplink transmissions on the non-time aligned uplink target cell by measuring particular timing difference information. The particular timing difference information enables the mobile terminal to extrapolate a time alignment for time aligning uplink transmissions of the mobile terminal on the uplink target cell.

The mobile terminal then calculates information on the necessary uplink timing alignment to be used by the mobile terminal for time-aligning the target cell in relation to the reference cell which is already time-aligned. For calculation of the timing advance, the mobile terminal uses at least the measurements and the timing advance of the reference cell.

Subsequently, the mobile terminal uses the calculated information to adjust the timing of its uplink transmissions on the uplink of the target cell relative to the timing advance value of the reference cell (value which is known by the mobile terminal).

The particular timing difference information can also be used by the aggregation access point to extrapolate a time alignment for uplink transmissions of the mobile terminal on the uplink target cell. In particular, the timing advance of uplink transmission by the mobile terminal on the reference cell, which is used as a reference for time aligning the uplink target cell, is already known by the aggregation access point. Thus, the aggregation access point can also calculate information on the necessary uplink timing alignment to be used by the mobile terminal for time-aligning the target cell in relation to the reference cell.

Reporting the particular timing difference information by the mobile terminal to the aggregation access point enables the aggregation access point to track the time alignment to be used by the mobile terminal for the uplink target cell. Likewise, reporting by the mobile terminal to the aggregation access point the calculated information on the necessary uplink timing alignment to be used for time-aligning the target cell also achieves that the aggregation access point knows of the time alignment to be used by the mobile terminal for the uplink target cell.

The knowledge of the time alignment to be used by the mobile terminal for the uplink target cell can advantageously be used by the aggregation access point for various effects as will become apparent from the description of the detailed embodiments.

One exemplary embodiment is related to a method for time aligning uplink transmissions by a mobile terminal in a mobile communication system. The mobile terminal is in communication with an aggregation access point and being configured with a time-aligned uplink reference cell and with a non-time-aligned uplink target cell.

In this method, the mobile terminal measures transmission and/or reception time difference information relating to transmissions on the target cell and/or reference cell, determines a first target timing advance based on at least the measured transmission and/or reception time difference information and on a reference timing advance used for uplink transmissions on the time-aligned reference cell, time-aligns the uplink target cell by adjusting a timing for uplink transmissions on the uplink target cell based on the determined first target timing advance, and transmits the measurement results and/or the first target timing advance from the mobile terminal to the aggregation access point.

According to an advantageous embodiment of the invention which can be used in addition or alternatively to the above, the mobile terminal, repeats the steps of (i) measuring the transmission and/or reception time difference information, (ii) determining the first target timing advance, (iii) time-aligning the uplink target cell, and (iv) transmitting the measurement results and/or the first target timing advance based on a timer included in the mobile terminal, unless otherwise instructed by the aggregation access point.

According to an advantageous embodiment of the invention which can be used in addition or alternatively to the above, the aggregation access point instructs the mobile terminal otherwise based on a pre-configuration of the aggregation access point and/or on an evaluation step performed by the aggregation access point, by transmitting to the mobile terminal at least one of: a random access channel, RACH, order message for the uplink target cell, for ordering the mobile terminal to perform a random access procedure; a second target timing advance, determined by the aggregation access point based on at least the received measurement results and/or the received first target timing advance and on a reference timing advance used for uplink transmissions on the time-aligned reference cell; and a timing advance update command for the uplink target cell, including a target timing advance update value being determined based on at least the received measurement results and/or the received first target timing advance and on a timing of uplink transmissions on the uplink target cell being time-aligned based on the first target timing advance.

According to an advantageous embodiment of the invention which can be used in addition or alternatively to the above, in case the aggregation access point transmits a RACH order message, the mobile terminal, upon reception thereof, performs a random access procedure on the uplink target cell for determining a third target timing advance value for uplink transmission on the uplink target cell, and time-aligns the uplink target cell by adjusting a timing for uplink transmissions on the uplink target cell based on the determined third target timing advance received within the random access procedure.

According to an advantageous embodiment of the invention which can be used in addition or alternatively to the above, in case the aggregation access point determines a second target timing advance, and transmits the second target timing advance to the mobile terminal, the mobile terminal, upon reception thereof, performs the step of time-aligning the uplink target cell by adjusting a timing for uplink transmissions on the uplink target cell based on the second target timing advance received from the aggregation access point.

According to an advantageous embodiment of the invention which can be used in addition or alternatively to the above, in case the aggregation access point transmits a timing advance update command for the uplink target cell, the mobile terminal, upon reception thereof, determines a fourth target timing advance based on the included target timing advance update value and on the timing advance used for uplink transmissions on the uplink target cell, and time-aligns the uplink target cell by adjusting a timing for uplink transmissions on the uplink target cell based on the determined fourth target timing advance.

According to an advantageous embodiment of the invention which can be used in addition or alternatively to the above, the mobile terminal performs the step of measuring the transmission and/or reception time difference information and the step of determining the first target timing advance in case the mobile terminal receives from the aggregation access point, information, preferably as a RRC message configuring the target cell, indicating that uplink transmissions on the uplink target cell require a different time alignment than that used for the reference cell. Alternatively, the step of measuring the transmission and/or reception time difference information and the step of determining the first target timing advance are also performed, in case the mobile terminal receives from the aggregation access point, information indicating a timing advance group for the target cell which is different from the timing advance group of the reference cell.

According to an advantageous embodiment of the invention which can be used in addition or alternatively to the above, the aggregation access point performs an evaluation step for determining a misalignment of uplink transmissions on the uplink target cell by comparing a reception time of uplink transmissions on the uplink target cell with a predefined reference time for uplink transmission on the uplink target cell, or by comparing a reception time of uplink transmissions on the uplink target cell with a transmission time of downlink transmissions on the corresponding downlink target cell, or by comparing the received measurement result and/or first target timing advance to a predefined threshold value.

In case the determined misalignment is greater than a predefined misalignment threshold, the aggregation access point transmits to the mobile terminal at least one of: the RACH order message, the second target timing advance, and the timing advance update command.

According to an advantageous embodiment of the invention which can be used in addition or alternatively to the above, the aggregation access point is pre-configured to transmit, upon reception of the measurement result and/or the first target timing advance and/or expiration of a timer, to the mobile terminal at least one of: the RACH order message, the second target timing advance, and the timing advance update command.

According to an advantageous embodiment of the invention which can be used in addition or alternatively to the above, the reference cell is initially time-aligned by performing a random access procedure between the mobile terminal and the aggregation access point on the reference cell.

According to an advantageous embodiment of the invention which can be used in addition or alternatively to the above, the mobile terminal measures by determining a downlink reception time difference ($\Delta_{Scell-PCell}Rx_{DL}$) between the target and reference cell, by measuring the time between the beginning of a first downlink subframe on the target cell ($T_{DL\_RX\_SCell}$) and the beginning of the corresponding downlink subframe on the reference cell ($T_{DL\_RX\_PCell}$), wherein downlink subframes on the reference and target cell refer to the same subframe number. The measurement results may optionally be transmitted to the aggregation access point, comprising the downlink reception time difference between the target and reference cell.

According to an advantageous embodiment of the invention which can be used in addition or alternatively to the above, the mobile terminal performs the measurement by determining by the mobile terminal a reception transmission time difference between the target and reference cell ($\Delta_{Scell-PCell}Rx_{DL}-Tx_{UL}$) by measuring the time difference between the time when the mobile terminal transmits an uplink radio frame on the reference cell ($T_{UL\_TX\_PCell}$) and the time when the mobile terminal receives a downlink radio frame on the target cell ($T_{DL\_RX\_SCell}$), wherein the uplink radio frame and the downlink radio frame relate to the same radio frame. The measurement results may optionally be transmitted to the aggregation access point, comprising the reception transmission time difference between the target and reference cell.

According to an advantageous embodiment of the invention which can be used in addition or alternatively to the above, the mobile terminal determines the first target timing advance by determining a downlink reception time difference between the target cell and the reference cell ($\Delta_{Scell-PCell}Rx_{DL}$) subtracting the reception transmission time difference from the timing advance of the reference cell.

According to an advantageous embodiment of the invention which can be used in addition or alternatively to the above, the mobile terminal determines the first target timing advance based on the downlink reception time difference.

According to an advantageous embodiment of the invention which can be used in addition or alternatively to the above, the aggregation access point determines a second target timing advance, based on a downlink transmission time difference ($\Delta_{Scell-PCell}Tx_{DL}$) between the target cell and the reference cell. The downlink transmission time difference between the target cell and the reference cell is the time difference between the beginning of a downlink subframe on the reference cell ($T_{DL\_TX\_PCell}$) and the beginning of the corresponding downlink subframe on the target cell ($T_{DL\_TX\_SCell}$), wherein the downlink subframes refer to the same subframe number.

According to an advantageous embodiment of the invention which can be used in addition or alternatively to the above, the mobile terminal time-aligns the target cell by setting the transmission of uplink radio frames on the uplink target cell relative to the beginning of downlink radio frames received via the downlink target cell, using the first, second, third or fourth target timing advance determined considering that the setting of the transmission of the uplink radio frames on the uplink target cell will be relative to the beginning of downlink radio frames received via the downlink target cell, respectively.

Or, the mobile terminal time-aligns the target cell by setting the transmission of uplink radio frames on the uplink target cell relative to the beginning of downlink radio frames received via the downlink reference cell, using the first, second, third or fourth target timing advance determined considering that the setting of the transmission of the uplink radio frames on the uplink target cell will be relative to the beginning of downlink radio frames received via the downlink reference cell.

Or, the mobile terminal time-aligns the target cell by setting the transmission of uplink radio frames on the uplink target cell relative to the beginning of uplink radio frames transmitted via the uplink reference cell, using the first, second, third or fourth target timing advance determined considering that the setting of the transmission of the uplink radio frames on the uplink target cell will be relative to the beginning of uplink radio frames transmitted via the uplink reference cell.

According to an advantageous embodiment of the invention which can be used in addition or alternatively to the above, the mobile terminal transmits the measurement results to the aggregation access point on the physical uplink shared channel, PUSCH, of the reference cell.

According to an advantageous embodiment of the invention which can be used in addition or alternatively to the above, the mobile terminal transmits the measurement results as part of the radio resource control layer, RRC, or of the medium access control layer, MAC, and in case it is part of the MAC layer, the measurement results are preferably transmitted within a MAC control element.

According to an advantageous embodiment of the invention which can be used in addition or alternatively to the above, the step of measuring the time difference information by the mobile terminal and of transmitting the measurement results to the aggregation access point is:
  performed periodically, and/or
  triggered by predetermined events, such as:
    i. configuration and/or activation of the target cell
    ii. the measurement results exceed a predetermined threshold
    iii. expiry of a timing advance timer
    iv. receiving a measurement reporting request from the aggregation access point.

According to an advantageous embodiment of the invention which can be used in addition or alternatively to the above, the measurement reporting request from the aggregation access point is:
  a deactivation/activation command for deactivating/activating a configured cell, including a flag indicating the request for measurement reporting, the flag preferably being set in one of the reserved bits of the deactivation/activation command, or a radio resource control connection reconfiguration message, including a flag indicating the request for measurement reporting, or a random access channel, RACH, order message, or a random access channel, RACH, order message, with a predetermined codepoint or a predetermined combination of codepoints indicating the request for measurement reporting.

According to an advantageous embodiment of the invention which can be used in addition or alternatively to the above, in case the aggregation access point determines a second target timing advance, the aggregation access point transmits the second target timing advance within a medium access control, MAC, control element, and preferably the second target timing advance is transmitted using the downlink shared channel.

According to an advantageous embodiment of the invention which can be used in addition or alternatively to the above, in case the aggregation access point determines a second target timing advance, the second target timing advance is an absolute value not to be used in relation to the reference timing advance value of the reference cell, by the step of time-aligning the uplink target cell being only based on the absolute value of the second target timing advance. Or the second target timing advance is a relative value to be used relative to the reference timing advance value of the reference cell, by the step of time-aligning the uplink target cell being also based on the reference timing advance.

According to an advantageous embodiment of the invention which can be used in addition or alternatively to the above, the reference cell is a primary cell or one of a plurality of secondary cells, and the target cell is one of a plurality of secondary cells.

According to an advantageous embodiment of the invention which can be used in addition or alternatively to the above, the mobile terminal performs the step of time-aligning for each target cell of a timing advance group where the target cell is one out of a plurality of target cells forming a group, and based on the same second target timing advance received from the aggregation access point, based on the same first target timing advance determined by the mobile terminal or based on the same fourth target timing advance determined by the mobile terminal in case of reception of timing advance update command for uplink transmissions on the uplink target cell.

According to an advantageous embodiment of the invention which can be used in addition or alternatively to the above, the mobile terminal is configured with a plurality of non-time-aligned target cells, and the mobile terminal performs the time-alignment according to one of the various exemplary embodiments described herein for each of the target cells.

According to an advantageous embodiment of the invention which can be used in addition or alternatively to the above, the mobile terminal transmits measurement results for each of the target cells to the aggregation access point within one message, preferably for all secondary cells that are configured or all secondary cells that are configured and activated.

The present invention further provides a mobile terminal for timing-aligning uplink transmissions in a mobile communication system. The mobile terminal is in communication with an aggregation access point and is configured with a time-aligned uplink reference cell and with a non-time-aligned uplink target cell. A processor of the mobile terminal measures transmission and/or reception time difference information relating to transmissions on the target cell and/or reference cell. The processor determines a first target timing advance based on at least the measured transmission and/or reception time difference information and on a reference timing advance used for uplink transmissions on the time-aligned reference cell. The processor an a transmitter of the mobile terminal time-align the uplink target cell by adjusting a timing for uplink transmissions on the uplink target cell based on the determined first target timing advance. The transmitter transmits the measurement results and/or the first target timing advance from the mobile terminal to the aggregation access point.

According to an advantageous embodiment of the invention which can be used in addition or alternatively to the above, wherein based on the timer, the processor and transmitter of the mobile terminal repeat measuring the transmission and/or reception time difference information, determining the first target timing advance, time-aligning the uplink target cell, and transmitting the measurement results and/or the first target timing advance, unless the receiver of the mobile terminal receives an instruction from the aggregation access point instructing the mobile terminal otherwise.

According to an advantageous embodiment of the invention which can be used in addition or alternatively to the above, a receiver of the mobile terminal receives from the aggregation access point a RACH order message. The processor, transmitter and receiver perform, upon reception of the RACH order message, a random access procedure on the uplink target cell for determining a third target timing advance value for uplink transmission on the uplink target cell. The processor and transmitter time-align the uplink target cell by adjusting a timing for uplink transmissions on the uplink target cell based on the determined third target timing advance received within the random access procedure.

According to an advantageous embodiment of the invention which can be used in addition or alternatively to the above, a receiver of the mobile terminal receives from the aggregation access point a second target timing advance. The processor and transmitter time-align, upon reception of the second target timing advance, the uplink target cell by adjusting a timing for uplink transmissions on the uplink target cell based on the second target timing advance received from the aggregation access point.

According to an advantageous embodiment of the invention which can be used in addition or alternatively to the above, a receiver of the mobile terminal receives a timing advance update command for the uplink target cell. The processor, upon reception of the timing advance update command, determines a fourth target timing advance based on the included target timing advance update value and on the timing advance used for uplink transmissions on the uplink target cell. Then, the processor and transmitter time-align the uplink target cell by adjusting a timing for uplink transmissions on the uplink target cell based on the determined fourth target timing advance.

According to an advantageous embodiment of the invention which can be used in addition or alternatively to the above, the processor and transmitter measure the transmission and/or reception time difference information and the processor is adapted to determining the first target timing advance in case a receiver of the mobile terminal receives, from the aggregation access point, information, preferably as a RRC message configuring the target cell, indicating that uplink transmissions on the uplink target cell require a different time alignment than that used for the reference cell, or receives, from the aggregation access point, information indicating a timing advance group for the target cell which is different from the timing advance group of the reference cell.

According to an advantageous embodiment of the invention which can be used in addition or alternatively to the above, wherein the reference cell is initially time-aligned by the processor, transmitter and receiver performing a random access procedure between the mobile terminal and the aggregation access point on the reference cell.

According to an advantageous embodiment of the invention which can be used in addition or alternatively to the above, the processor determines a downlink reception time difference ($\Delta_{SCell-PCell}Rx_{DL}$) between the target and reference cell, by measuring the time between the beginning of a first downlink subframe on the target cell (TDL_RX_SCell) and the beginning of the corresponding downlink subframe on the reference cell (TDL_RX_PCell), wherein downlink subframes on the reference and target cell refer to the same subframe number, and optionally the transmitter is adapted to transmit downlink reception time difference between the target and reference cell as the measurement results to the aggregation access point.

According to an advantageous embodiment of the invention which can be used in addition or alternatively to the above, the processor determines a reception transmission time difference between the target and reference cell ($\Delta_{SCell-PCell}Rx_{DL}-Tx_{UL}$), by measuring the time difference between the time when the mobile terminal transmits an uplink radio frame on the reference cell (TUL_TX_PCell) and the time when the mobile terminal receives a downlink radio frame on the target cell (TDL_RX_SCell), wherein the uplink radio frame and the downlink radio frame relate to the same radio frame, and optionally the transmitter is adapted to transmit the reception transmission time difference between the target and reference cell as the measurement results to the aggregation access point.

According to an advantageous embodiment of the invention which can be used in addition or alternatively to the above, the processor determines a downlink reception time difference between the target cell and the reference cell ($\Delta_{SCell-PCell}Rx_{DL}$) by subtracting the reception transmission time difference from the timing advance of the reference cell.

According to an advantageous embodiment of the invention which can be used in addition or alternatively to the above, the processor determines the first target timing advance based on the downlink reception time difference.

According to an advantageous embodiment of the invention which can be used in addition or alternatively to the above, the processor and transmitter time-align the target cell setting the transmission of uplink radio frames on the uplink target cell relative to the beginning of downlink radio frames received via the downlink target cell, using the first, second, third or fourth target timing advance determined considering that the setting of the transmission of the uplink radio frames on the uplink target cell will be relative to the beginning of downlink radio frames received via the downlink target cell, respectively.

Or the processor and transmitter time-align the target cell setting the transmission of uplink radio frames on the uplink target cell relative to the beginning of downlink radio frames received via the downlink reference cell, using the first, second, third or fourth target timing advance determined considering that the setting of the transmission of the uplink radio frames on the uplink target cell will be relative to the beginning of downlink radio frames received via the downlink reference cell.

Or the processor and transmitter time-align the target cell setting the transmission of uplink radio frames on the uplink target cell relative to the beginning of uplink radio frames transmitted via the uplink reference cell, using the first, second, third or fourth target timing advance determined considering that the setting of the transmission of the uplink radio frames on the uplink target cell will be relative to the beginning of uplink radio frames transmitted via the uplink reference cell.

According to an advantageous embodiment of the invention which can be used in addition or alternatively to the above, the transmitter transmits the measurement results to the aggregation access point on the physical uplink shared channel, PUSCH, of the reference cell.

According to an advantageous embodiment of the invention which can be used in addition or alternatively to the above, the transmitter transmits measurement results as part of the radio resource control layer, RRC, or of the medium access control layer, MAC, and in case it is part of the MAC layer, the measurement results are preferably transmitted within a MAC control element.

According to an advantageous embodiment of the invention which can be used in addition or alternatively to the above, the processor and the transmitter measure the time difference information, to determine a first target timing advance and transmit the measurement results and/or the first target timing advance to the aggregation access point:
  periodically, and/or
  by predetermined events, such as:
    i. configuration and/or activation of the target cell
    ii. the measurement results exceed a predetermined threshold
    iii. expiry of a timing advance timer
    iv. receiving a measurement reporting request from the aggregation access point.

According to an advantageous embodiment of the invention which can be used in addition or alternatively to the above, the receiver receives
  a deactivation/activation command as the measurement reporting request from the aggregation access point for deactivating/activating a configured cell, including a flag indicating the request for measurement reporting, the flag preferably being set in one of the reserved bits of the deactivation/activation command, or
  a radio resource control connection reconfiguration message as the measurement reporting request from the aggregation access point, including a flag indicating the request for measurement reporting, or
  a random access channel, RACH, order message as the measurement reporting request from the aggregation access point, or
  a random access channel, RACH, order message as the measurement reporting request from the aggregation access point, with a predetermined codepoint or a predetermined combination of codepoints indicating the request for measurement reporting.

According to an advantageous embodiment of the invention which can be used in addition or alternatively to the above, the reference cell is a primary cell or one of a plurality of secondary cells, and the target cell is one of a plurality of secondary cells.

According to an advantageous embodiment of the invention which can be used in addition or alternatively to the above, the processor and transmitter time-align each target cell of a timing advance group based on the same second target timing advance received from the aggregation access point, based on the same first target timing advance determined by the mobile terminal or based on the same fourth target timing advance determined by the mobile terminal in case of reception of timing advance update command for uplink transmissions on the uplink target cell.

According to an advantageous embodiment of the invention which can be used in addition or alternatively to the above, in case the mobile terminal is configured with a plurality of non-time-aligned target cells, the mobile terminal performs the time-alignment according to one of the various exemplary embodiments described herein for each of the target cells.

According to an advantageous embodiment of the invention which can be used in addition or alternatively to the above, the transmitter transmits the measurement results for each of the target cells is transmitted to the aggregation access point within one message, preferably for all secondary cells that are configured or all secondary cells that are configured and activated.

The present invention further provides an aggregation access point for controlling time aligning a mobile terminal in a mobile communication system, the mobile terminal being in communication with the aggregation access point and being configured with a time-aligned uplink reference cell and with a non-time-aligned uplink target cell. A memory of the aggregation access point stores a pre-configuration. A receiver of the aggregation access point receives measurement results and/or a first target timing advance. A processor of the aggregation access point determines based on at least the received measurement results and/or the received first target timing advance and on a reference timing advance used for uplink transmissions on the time-aligned reference cell, and/or adapted to determine based on at least the received measurement results and/or the received first target timing advance and on a timing of uplink transmissions on the uplink target cell being time-aligned based on the first target timing advance. A transmitter may transmit an instruction to the mobile terminal to instruct the mobile terminal otherwise, based on the pre-configuration of the aggregation access point and/or on the processor performing an evaluation step by transmitting at least one of:
  a random access channel, RACH, order message for the uplink target cell, for ordering the mobile terminal to perform a random access procedure;
  a second target timing advance, determined by the processor based on at least the received measurement results and/or the received first target timing advance and on a reference timing advance used for uplink transmissions on the time-aligned reference cell; and
  a timing advance update command for the uplink target cell, including a target timing advance update value being determined based on at least the received measurement results and/or the received first target timing advance and on a timing of uplink transmissions on the uplink target cell being time-aligned based on the first target timing advance.

According to an advantageous embodiment of the invention which can be used in addition or alternatively to the above, the processor performs an evaluation step for determining a misalignment of uplink transmissions on the uplink target cell, by comparing a reception time of uplink transmissions on the uplink target cell with a predefined reference time for uplink transmission on the uplink target cell, or by comparing a reception time of uplink transmissions on the uplink target cell with a transmission time of downlink transmissions on the corresponding downlink target cell, or by comparing the received measurement result and/or first target timing advance to a predefined threshold value.

In case the determined misalignment is greater than a predefined misalignment threshold, the transmitter transmits to the mobile terminal at least one of: the RACH order message, the second target timing advance, and the timing advance update command.

According to an advantageous embodiment of the invention which can be used in addition or alternatively to the above, the aggregation access point is pre-configured base on the memory so that the transmitter transmits, upon reception of the measurement result and/or the first target timing advance and/or expiration of a timer, to the mobile terminal at least one of: the RACH order message, the second target timing advance, and the timing advance update command.

According to an advantageous embodiment of the invention which can be used in addition or alternatively to the above, the processor is adapted to the second target timing advance further based on a downlink transmission time difference ($\Delta_{Scell\text{-}PCell}\text{Tx}_{DL}$) between the target cell and the reference cell, wherein the downlink transmission time difference between the target cell and the reference cell is the time difference between the beginning of a downlink subframe on the reference cell ($T_{DL\_TX\_PCell}$) and the beginning of the corresponding downlink subframe on the target cell ($T_{DL\_TX\_SCell}$), wherein the downlink subframes refer to the same subframe number.

According to an advantageous embodiment of the invention which can be used in addition or alternatively to the above, the transmitter transmits the second target timing advance within a medium access control, MAC, control element, and preferably, the downlink shared channel wherein the step of transmitting the second target timing advance uses.

According to an advantageous embodiment of the invention which can be used in addition or alternatively to the above, the processor determines a second target timing advance, the second target timing advance being an absolute value not to be used in relation to the reference timing advance value of the reference cell, or wherein the second target timing advance is a relative value to be used relative to the reference timing advance value of the reference cell.

The present invention further provides a computer readable medium storing instructions that, when executed by a processor of a mobile terminal, cause the mobile terminal to time align uplink transmissions in a mobile communication system as follows. Transmission and/or reception time difference information relating to transmissions on the target cell and/or reference cell are measured. A first target timing advance based on at least the measured transmission and/or reception time difference information and on a reference timing advance used for uplink transmissions on the time-aligned reference cell is determined. The uplink target cell is time-aligned by adjusting a timing for uplink transmissions on the uplink target cell based on the determined first target timing advance. The measurement results and/or the first target timing advance from the mobile terminal are transmitted to the aggregation access point.

The computer readable medium stores instructions that, when executed by a processor of a mobile terminal, cause the mobile terminal to perform the steps of the above-described methods.

According to another aspect of the invention, the mobile terminal time aligns a non-time aligned uplink component carrier of a radio cell relative to a reference cell in which a (reference) uplink component carrier is already time aligned. The determination of the timing advance for time alignment of the non-time aligned uplink component carrier of the radio cell is thereby determined based on the timing advance for the (uplink component carrier of the) reference cell and the time difference of the reception times (also referred to as "reception time difference" in the following) for corresponding downlink transmissions via the downlink component carriers of the reference cell and the radio cell comprising the non-time aligned uplink component carrier.

As will become apparent, the time alignment of the non-aligned uplink component carrier can be performed relative to the reception timing of the downlink component carrier of the reference cell or relative to the reception timing of the downlink component carrier of the radio cell comprising the uplink component carrier.

One exemplary embodiment of the invention is related to a method for time aligning uplink transmissions by a mobile terminal in a mobile communication system. The mobile terminal is configured with a first radio cell comprising a downlink component carrier and a time aligned uplink component carrier, and a second radio cell comprising a downlink component carrier and a non-time aligned uplink component carrier.

In this method, the mobile terminal determines a reception time difference (or propagation delay difference) for downlink transmissions from an aggregation access point to the mobile terminal via the downlink component carrier of the first radio cell and via the downlink component carrier of the second radio cell, respectively, and time aligns the uplink component carrier of the second radio cell by adjusting a timing advance for uplink transmissions on the uplink component carrier of the second radio cell based on the timing advance for uplink transmissions on the time aligned uplink component carrier of the first radio cell and the determined reception time difference (or propagation delay difference), so that uplink transmissions transmitted from the mobile terminal to the aggregation access point via the uplink component carrier of the first radio cell and the uplink component carrier of the second radio cell arrives at the aggregation access point simultaneously.

In one exemplary implementation of this embodiment, the downlink component carrier and the uplink component carrier of one of the radio cells may be for example established between the aggregation access point and the mobile terminal, while the downlink component carrier and the uplink component carrier of the other radio cell may be established between another access point and the mobile terminal.

The other access point could for example maintain a bi-directional interface to the aggregation access point via which transmissions from and to the mobile terminal are forwarded to the aggregation access point, respectively, to the mobile terminal.

In this exemplary implementation, the determined reception time difference (or propagation delay difference) determined by the mobile terminal may for example account for a propagation delay of transmissions between the aggregation access point and the other access point, a processing delay of the other access point for processing the transmissions to be forwarded and a propagation delay of transmissions between the other access point and the mobile terminal.

In one exemplary implementation, the aggregation access point may be an eNodeB. In another implementation, the other access point could be for example a Frequency Selective Repeater (FSR) or a Remote Radio Head (RRH) controlled by the aggregation access point.

According to a further embodiment of the invention, the uplink data is transmitted by the mobile terminal via the time aligned first component carrier and the time aligned second component carrier to the aggregation access point, which combines the uplink transmissions of the mobile terminal received via the time aligned first component carrier and the time aligned second component carrier.

The combination of the uplink transmissions by the aggregation access point may occur in one of different layers. For example, the combination of the uplink data of the mobile terminal could be performed by the RLC entity of the aggregation access point. This may be for example the case in a scenario where the aggregation access point is an eNodeB and the other access point is a RRH.

Alternatively, the combination of the uplink data of the mobile terminal is performed by the physical layer entity of the aggregation access point. This may be for example the case in a scenario where the aggregation access point is an eNodeB and the other access point is a FSR.

There a different possibilities how the uplink component carrier of the first radio cell becomes time aligned. In one exemplary embodiment of the invention, the uplink component carrier of the first radio cell is time aligned by the mobile terminal and an access point by performing a random access procedure (also denoted: RACH procedure) configuring the timing advance for the uplink component carrier of the first radio cell. Advantageously, the uplink component carrier of the second radio cell is time aligned without performing a random access procedure with an access point. In one exemplary embodiment, the access point performing the RACH procedure with the mobile terminal is the aggregation access point.

In one exemplary implementation the mobile terminal receives a command from the aggregation access point to time align the uplink component carrier of the second radio cell based on the reception time difference (or propagation delay difference). For example, the command may be included within a RRC Radioresource Configuration Message.

The command may be for example signaled by means of a flag indicating whether the mobile terminal is to use a random access procedure for time aligning the uplink component carrier of the second radio cell or whether to time align the uplink component carrier of the second radio cell based on the reception time difference (or propagation delay difference) relative to a downlink component carrier of a reference radio cell (i.e. using the terminology above, the downlink component carrier of the first cell).

In a further embodiment of the invention, the mobile terminal determines a reception time difference (or propagation delay difference) for a downlink transmissions comprises calculating the reception time difference (or propagation delay difference) by subtracting the time of the beginning of a sub-frame received via the downlink component carrier of the second cell from a time of the beginning of the next sub-frame received via the downlink component carrier of the first cell. The beginning of the next sub-frame means the beginning of the next sub-frame that is received via the downlink component carrier of the first cell after the point in time of the beginning of the sub-frame received via the downlink component carrier of the second cell.

In another embodiment of the invention, for time alignment of the uplink component carriers of a mobile node, the mobile node could for example maintain a respective timing advance value for each uplink component carrier. In an alternative embodiment of the invention, a scenario is considered, where it is possible that plural component carriers have the same propagation delay, then these component carriers can be grouped and be associated with a respective timing advance value. Hence, in this case the mobile node may for example maintain a respective timing advance value for each group of one or more uplink component carriers, wherein uplink transmissions on the one or more uplink component carriers of a group experience the same propagation delay.

In a further exemplary implementation, the timing advance values for the uplink component carriers are determined to ensure that an uplink transmission via the uplink component carriers arrives at the aggregation access point simultaneously.

In one exemplary embodiment, the timing advance value for an uplink component carrier of a given radio cell may be considered to indicate a time shift for the transmission of uplink sub-frames on the uplink component carrier of the given radio cell relative to the beginning of sub-frames received via the downlink component carrier of the given radio cell (e.g. the second radio cell mentioned above). In an alternative embodiment of the invention, the timing advance value for an uplink component carrier of a given radio cell may be considered to indicate a time shift for the transmission of uplink sub-frames on the uplink component carrier of the given radio cell relative to the beginning of sub-frames received via the downlink component carrier of the reference cell (e.g. the first radio cell mentioned above).

In one exemplary embodiment of the invention, time aligning the uplink component carrier of the second radio cell comprises calculating a timing advance value for the uplink component carrier of the second cell, $TA_{AP2}$, based on the on the timing advance value for the time aligned uplink component carrier of the first radio cell, $TA_{AP1}$, and the determined reception time difference (or propagation delay difference), $\Delta T_{prop}$, as follows:

$$TA_{AP2} = TA_{AP1} + 2 \cdot \Delta T_{prop}$$

In this exemplary embodiment, the timing advance value $TA_{AP2}$ is defining the timing advance relative to the reception timing of the downlink component carrier of the second radio cell (or to be more precise the relative to the reception timing of the beginning of sub-frames transmitted via the downlink component carrier of the second radio cell).

In another exemplary embodiment of the invention, time aligning the uplink component carrier of the second radio cell comprises calculating a timing advance value for the uplink component carrier of the second cell, $TA_{AP2}$, based on the on the timing advance value for the time aligned uplink component carrier of the first radio cell, $TA_{AP1}$, and the determined reception time difference (or propagation delay difference), $\Delta T_{prop}$, as follows:

$$TA_{AP2} = TA_{AP1} + \Delta T_{prop}$$

In this exemplary embodiment, the timing advance value $TA_{AP2}$ is defining the timing advance relative to the reception timing of the downlink component carrier of the first radio cell (or to be more precise the relative to the reception timing of the beginning of sub-frames transmitted via the downlink component carrier of the first radio cell).

Another third aspect of the invention is to suggest a procedure for time alignment of uplink component carriers for use in a handover procedure of a mobile terminal. The time alignment procedure as discussed above may be also used for time aligning uplink component carriers in radio cells controlled by the target (aggregation) access point to which the mobile terminal is handed over. According to this aspect, the timing advance for one of the uplink component carriers in a radio cell (i.e. the reference cell) of the target (aggregation) access point may be either provided to the mobile terminal (synchronized handover) or may be determined by the mobile terminal (non-synchronized handover), e.g. by means of performing a random access procedure. The other uplink component carrier(s) of the other radio cell(s) to be used by the mobile terminal may then be time aligned relative to the reference cell as described previously herein.

In line with this third aspect and in accordance with a further embodiment of the invention, a method for performing a handover of a mobile terminal to a target aggregation access point (e.g. a eNodeB) is provided. The mobile terminal is to be configured, under control of the target aggregation access point, with a first radio cell comprising a downlink component carrier and an uplink component carrier, and a second radio cell comprising a downlink component carrier and an uplink component carrier.

The mobile terminal performs a random access procedure with the target aggregation access point to thereby time align the uplink component carrier of the first radio cell. The mobile terminal can then determine a reception time difference (or propagation delay difference) for downlink transmissions from the target aggregation access point to the mobile terminal via the downlink component carrier of the first radio cell and via the downlink component carrier of the second radio cell, and may time align the uplink component carrier of the second radio cell by adjusting a timing advance for uplink transmissions on the uplink component carrier of the second radio cell based on the timing advance for uplink transmissions on the time aligned uplink component carrier of the first radio cell and the determined reception time difference (or propagation delay difference), so that an uplink transmission transmitted from the mobile terminal to the aggregation access point via the uplink component carrier of the first radio cell and via the uplink component carrier of the second radio cell arrives at the aggregation access point simultaneously.

Also in line with this third aspect and in accordance with another embodiment of the invention, a method for performing a handover of a mobile terminal from a source access point to a target aggregation access point is provided. The mobile terminal is again assumed to be configured, under control of the target aggregation access point, with a first radio cell comprising a downlink component carrier and an uplink component carrier, and a second radio cell comprising a downlink component carrier and an uplink component carrier.

In this method, the mobile terminal receives through a radio cell controlled by the source access point, a timing advance value that indicated the time alignment to be applied by the mobile terminal to uplink transmissions on the uplink component carrier of the first radio cell. The mobile terminal may further determine a reception time difference (or propagation delay difference) for downlink transmissions from the target aggregation access point to the mobile terminal via the downlink component carrier of the first radio cell and via the downlink component carrier of the second radio cell, and may then time align the uplink component carrier of the second radio cell by adjusting a timing advance for uplink transmissions on the uplink component carrier of the second radio cell based on the timing advance for uplink transmissions on the time aligned uplink component carrier of the first radio cell and the determined reception time difference (or propagation delay difference), so that an uplink transmission transmitted from the mobile terminal to the aggregation access point via the uplink component carrier of the first radio cell and via the uplink component carrier of the second radio cell arrives at the aggregation access point simultaneously.

The source access point and the target aggregation access point may be for example eNodeBs.

In another embodiment, the two handover methods above may further comprise the steps of the method for time aligning uplink transmissions by a mobile terminal in a mobile communication system according to one of the various exemplary embodiments described herein.

Another embodiment of the invention relates to a mobile terminal for time aligning uplink transmissions in a mobile communication system. The mobile terminal is configured with a first radio cell comprising a downlink component carrier and a time aligned uplink component carrier, and a second radio cell comprising a downlink component carrier and a non-time aligned uplink component carrier. In this embodiment, the mobile terminal comprises a receiver unit adapted to receive downlink transmissions, and a processing unit adapted to determine a reception time difference (or propagation delay difference) for a downlink transmission from an aggregation access point to the mobile terminal via the downlink component carrier of the first radio cell and via the downlink component carrier of the second radio cell, respectively. The processing unit time aligns the uplink component carrier of the second radio cell by adjusting a timing advance for uplink transmissions on the uplink component carrier of the second radio cell based on the timing advance for uplink transmissions on the time aligned uplink component carrier of the first radio cell and the determined reception time difference (or propagation delay difference). Further, the mobile terminal comprises a transmitter unit adapted to transmit an uplink transmission to the aggregation access point via the time aligned uplink component carrier of the first radio cell and the time aligned uplink component carrier of the second radio cell so that uplink transmission via the time aligned uplink component carrier of the first radio cell and the time aligned uplink component carrier of the second radio cell arrives at the aggregation access point simultaneously.

The mobile terminal according to a more detailed embodiment of the invention is adapted to perform a handover to the aggregation point. The receiver unit of the mobile terminal is adapted to receive, through a radio cell controlled by a source access point, a timing advance value that indicated the time alignment to be applied by the mobile terminal to uplink transmissions on the uplink component carrier of the first radio cell.

In alternative implementation, the mobile terminal is adapted to perform a handover from a source access point to the aggregation point, and to perform a random access procedure with the aggregation access point to thereby time align the uplink component carrier of the first radio cell.

Another embodiment of the invention is providing a computer readable medium storing instructions that, when executed by a processor of a mobile terminal, cause the mobile terminal to time align uplink transmissions in a mobile communication system, by determining by the mobile terminal a reception time difference (or propagation delay difference) for downlink transmissions from an aggregation access point to the mobile terminal via a downlink component carrier of a first radio cell and via a downlink component carrier of a second radio cell, respectively, wherein the mobile terminal is configured with the first radio cell comprising the downlink component carrier and a time aligned uplink component carrier, and the second radio cell comprising the downlink component carrier and a non-time aligned uplink component carrier, and time aligning the uplink component carrier of the second radio cell by adjusting a timing advance for uplink transmissions on the uplink component carrier of the second radio cell based on the timing advance for uplink transmissions on the time aligned uplink component carrier of the first radio cell and the determined reception time difference (or propagation delay difference), so that uplink transmissions transmitted from the mobile terminal to the aggregation access point via the uplink component carrier of the first radio cell and the uplink component carrier of the second radio cell arrives at the aggregation access point simultaneously.

The computer readable medium according to further embodiment of the invention is storing instructions that, when executed by a processor of a mobile terminal, cause the mobile terminal to perform the steps of the method for time aligning uplink transmissions by a mobile terminal in a mobile communication system according to one of the various exemplary embodiments described herein.

BRIEF DESCRIPTION OF THE FIGURES

In the following the invention is described in more detail in reference to the attached figures and drawings. Similar or corresponding details in the figures are marked with the same reference numerals.

FIG. 29 shows a format of a MAC control element for transmitting the measurement results from the mobile terminal to the eNodeB, the measurement results being the downlink reception time differences between the PCell and all the SCells, FIG. 30 shows a format of a MAC control element for transmitting the measurement results from the mobile terminal to the eNodeB, the measurement results being the reception transmission time differences between the PCell and all the SCells, FIG. 31 illustrates the uplink time alignment process performed at the mobile terminal, in case the timing advance command received from the eNodeB is calculated relative to the beginning of an uplink radio frame of the PCell, according to one embodiment of the invention, FIG. 32 illustrates the uplink time alignment process performed at the mobile terminal, in case the timing advance command received from the eNodeB is calculated relative to the beginning of a downlink radio frame of the PCell, according to one embodiment of the invention, and FIG. 33 shows the format of a timing advance command according to one embodiment of the invention.

DETAILED DESCRIPTION OF THE INVENTION

Figure 1:
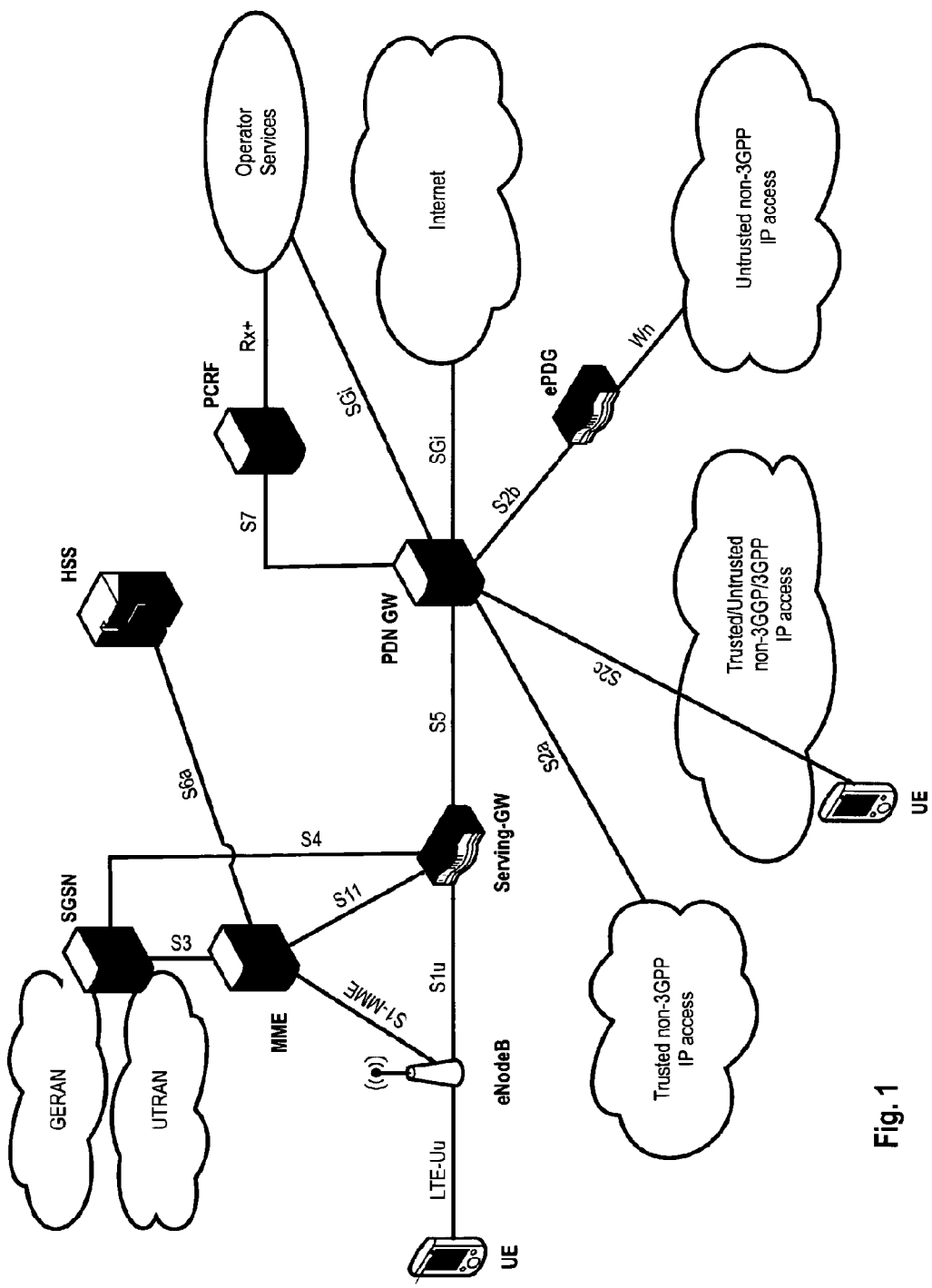
FIG. 1 shows an exemplary architecture of a 3GPP LTE system.
Figure 2:
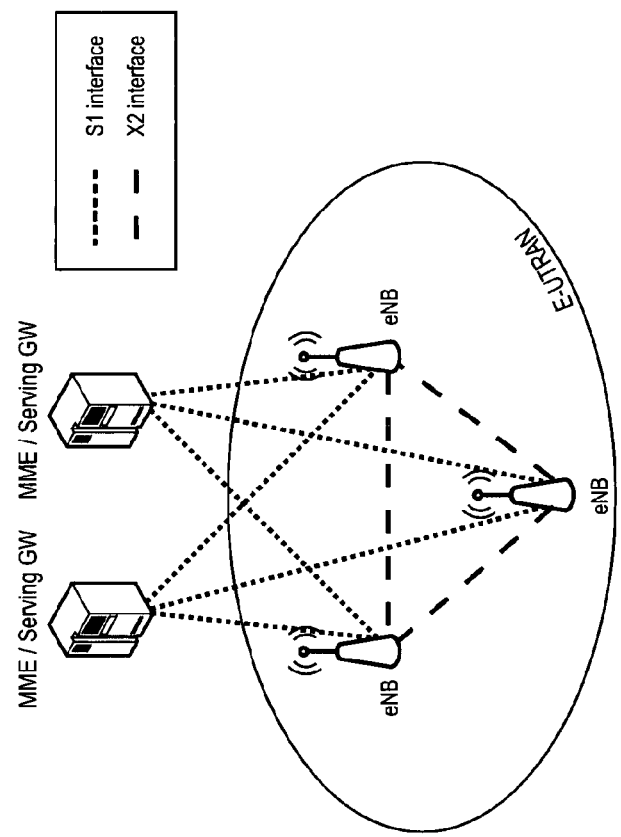
FIG. 2 shows an exemplary overview of the overall E-UTRAN architecture of 3GPP LTE.

The following paragraphs will describe various embodiments of the invention. For exemplary purposes only, most of the embodiments are outlined in relation to an orthogonal single-carrier uplink radio access scheme according to 3GPP LTE (Release 8/9) and LTE-A (Release 10) mobile communication systems discussed in the Technical Background section above. It should be noted that the invention may be advantageously used for example in a mobile communication system such as 3GPP LTE (Release 8/9) and LTE-A (Release 10) communication systems as described in the Technical Background section above, but the invention is not limited to its use in this particular exemplary communication network. The invention may be broadly used in communication systems where time alignment of uplink transmissions on multiple carriers (having different propagation delays) is desired.

The explanations given in the Technical Background section above are intended to better understand the mostly 3GPP LTE (Release 8/9) and LTE-A (Release 10) specific exemplary embodiments described herein and should not be understood as limiting the invention to the described specific implementations of processes and functions in the mobile communication network.

One aspect of the invention is to time align a non-time aligned uplink component carrier of a radio cell relative to a reference cell in which a (reference) uplink component carrier is already time aligned. The timing advance for time alignment of the non-time aligned uplink component carrier of the radio cell is determined based on the timing advance for the uplink component carrier of the reference cell and the time difference of the reception times (or propagation delay difference) for corresponding downlink transmissions via the downlink component carriers of the reference cell and the radio cell comprising the non-time aligned uplink component carrier. The time alignment mechanism may be used for time aligning transmissions on uplink component carriers that are newly configured or activated by a mobile terminal or that may require reestablishment of the time alignment (e.g. after loosing same). As will be outlined below, the new configuration of uplink component carriers may for example result from a handover of the mobile terminal to a target access point or an operation of configuring or activating an additional uplink component carrier at the mobile terminal.

Corresponding downlink transmissions may for example denote transmissions that are sent simultaneously by an access point via the downlink component carrier of the reference cell and via the radio cell comprising the non-time aligned uplink component carrier (e.g. transmissions of a given sub-frame sent via the two downlink component carriers). In this case the reception time difference is also the time difference of the propagation delay of the transmission sent via the downlink component carrier of the reference cell and propagation delay of the transmission sent via the downlink component carrier of the radio cell comprising the non-time aligned uplink component carrier (also referred to as "propagation delay difference" in the following). Hence, in this case the determination of the timing advance for time alignment of the non-time aligned uplink component carrier of the radio cell is determined based on the timing advance for the (uplink component carrier of the) reference cell and the propagation delay difference of downlink transmissions via the downlink component carriers of the reference cell and the radio cell comprising the non-time aligned uplink component carrier.

For the purpose of time alignment, it is—strictly speaking—not necessary that the reference cell is configured an uplink component carrier. It would be sufficient that the mobile terminal is provided with a reference timing advance value to be used, and further there is downlink component carrier received through the reference cell, based on which the reception time difference (or propagation delay difference) can be determined for time aligning the other radio cells. However, for most practical implementations it may be advantageous is the reference cell is configured with a downlink component carrier and a (time aligned) uplink component carrier.

Furthermore, in one embodiment of the invention, the reference cell relative to which the timing of the non-time aligned uplink component carrier(s) is a radio cell comprising a time-aligned uplink component carrier between the user equipment and the aggregation access point. However, the reference cell may also be a radio cell comprising a time-aligned uplink component carrier between the user equipment and another access point than the aggregation access point. The term aggregation access point (for example a base station or eNodeB) is used to denote location in the access network, i.e. a node, at which the uplink transmissions of the user equipment on the different uplink component carriers are aggregated. Aggregation refers to

- a simultaneous reception of the radio signals corresponding to transmissions (e.g. respective sub-frames) on the different uplink component carriers from the user equipment, i.e. on the physical layer, for joint physical layer processing (e.g. joint demodulation (e.g. including utilization of one IFFT (Inverse Fast Fourier Transform) for the processing of the received sub-frame in an OFDM system) and/or joint decoding of coded transport block(s), etc.) by the aggregation access point;

and/or

- a processing of protocol data units received in the transmissions (e.g. respective sub-frames) on the different uplink component carriers from the user equipment in a protocol entity of the aggregation access point.

The conjoint processing of protocol data units received in the transmissions on the different uplink component carriers from the user equipment may be in one exemplary implementation the conjoint processing of PDUs obtained from the transmissions on the different uplink component carriers in the MAC layer or RLC layer of the aggregation access point, e.g. for the purpose of PDU reordering.

In other words, in one exemplary embodiment of the invention, the aggregation access point denotes the network node which is to receive the radio signals corresponding to transmissions (e.g. respective sub-frames) on the different uplink component carriers, i.e. on the physical layer, from the user equipment for joint processing (e.g. demodulation and/or decoding) by the aggregation access point. In another exemplary embodiment of the invention, the aggregation access point denotes the network node which should processes protocol data units received in the transmissions (e.g. respective sub-frames) via the different uplink component carriers from the user equipment. In one exemplary implementation, the aggregation access point is a base station or eNodeB.

In line with this first aspect of the invention and according to an exemplary embodiment of the invention a method for time aligning uplink transmissions by a mobile terminal in a mobile communication system is provided. The mobile terminal is configured with a first radio cell comprising a downlink component carrier and a time aligned uplink component carrier, and a second radio cell comprising a downlink component carrier and a non-time aligned uplink component carrier. The mobile terminal determines a reception time difference (or propagation delay difference) for downlink transmissions from an aggregation access point to the mobile terminal via the downlink component carrier of the first radio cell and via the downlink component carrier of the second radio cell, respectively, and time aligns the uplink component carrier of the second radio cell by adjusting a timing advance for uplink transmissions on the uplink component carrier of the second radio cell based on the timing advance for uplink transmissions on the time aligned uplink component carrier of the first radio cell and the determined reception time difference (or propagation delay difference), so that uplink transmissions transmitted from the mobile terminal to the aggregation access point via the uplink component carrier of the first radio cell and the uplink component carrier of the second radio cell arrives at the aggregation access point simultaneously. Hence, no RACH procedure is needed for time alignment of the uplink component carrier in the second radio cell.

In this document, simultaneously or at the same point in time means at the same point in time plus/minus some deviation, which is in the µs range. For example, minor differences between uplink and downlink propagation delays in a given radio cell as well as the granularity of timing advance values imply that there is no perfect time alignment of the uplink transmissions on uplink component carriers. In any case simultaneous arrival of uplink transmissions is ensured to the extent that the uplink transmissions by a mobile terminal via distinct uplink component carriers (having different propagation delays) can be processed together by the receiving aggregation access point. For example, different transmissions of one given sub-frame on the uplink component carriers are time aligned such that they are received in a manner allowing the aggregation access point to process all transmissions of the sub-frame together (joint processing).

Furthermore, it should also be noted that time alignment of uplink component carriers that are configured for a mobile terminal is of course also applicable, where the mobile terminal has to time align more than one uplink component carrier. Basically, an arbitrary number of uplink component carriers can be time aligned by the procedures described herein, as long as there is one reference time advance for an uplink component carrier.

Moreover, it should be noted that a single radio cell may comprise one or more uplink component carrier and one or more downlink component carriers. In one radio cell it may be the case that the propagation delay of all uplink and downlink component carriers can be assumed identical. Accordingly, the uplink component carriers of a radio cell can be considered to form a group of uplink component carriers that experience the same propagation delay and that may be associated to a single timing advance value. Of course, if the propagation delays of the uplink component carriers differ from each other within a radio cell (e.g. due to using a FSR), then a timing advance value for each experienced propagation delay should be provided.

Another second aspect of the invention is to suggest a procedure for time alignment of uplink component carriers for use in a handover procedure of a mobile terminal. Procedures are provided for synchronous and non-synchronous handover. The time alignment procedure as discussed above may be also used for time aligning uplink component carriers in radio cells controlled by the target (aggregation) access point to which the mobile terminal is handed over. According to this aspect, the timing advance for one of the uplink component carriers in a radio cell (i.e. the reference cell) of the target (aggregation) access point may be either provided to the mobile terminal (synchronized handover) or may be determined by the mobile terminal (non-synchronized handover), e.g. by means of performing a random access procedure. The other uplink component carrier(s) of the other radio cell(s) to be used by the mobile terminal may then be time aligned relative to the reference cell as described previously herein.

In case a mobile terminal, also denoted user equipment in the 3GPP terminology, is aggregating component carriers that stem from sources in different bands and physical locations, due to different propagation conditions these component carriers all might have different propagations delay.

Under the premises that an aggregation access point (e.g. eNodeB) is processing the uplink transmissions via all configured component carriers of a given mobile terminal, the uplink transmissions from the mobile terminal should arrive simultaneously (at the point in time) at the aggregation access point even though the propagation delays on the component carriers are different. Hence the aggregation access point could configure the mobile terminal with a different timing advance for each uplink component carrier depending on it's specific propagation delay. The propagation delay is likely to be the same for component carriers that lie in the same frequency band and that are terminated at the same location (i.e. by one access point). Hence it may be suitable to group certain component carries into timing advance groups where all the member component carriers of a given group transmit with the same timing advance specific to this group in the uplink.

When considering for example a state-of-the-art 3GPP communications system setting several timing advances for one user equipment would imply that several RACH procedures, one RACH procedure for each timing advance group, would need to be performed. Thus the eNodeB can determine the propagation delay for each component carrier group in the uplink based the RACH preamble 701, 802 and would then set the appropriate timing advance for each component carrier group needed using the Random Access Response message 702, 802 (see FIG. 7 and FIG. 8). This would imply a significant delay caused by executing several RACH procedures assuming that a user equipment can only perform a single RACH procedure at a time.

Figure 10:
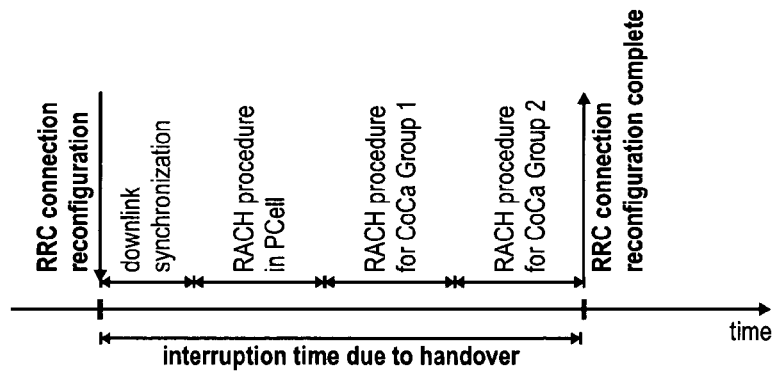

Likewise, upon a handover, a user equipment would have to acquire a timing advance value for the component carriers in the target cell through RACH procedures, which would mean that there is an increased interruption time between the "RRC connection reconfiguration" message and the "RRC connection reconfiguration completed" message, where UE cannot receive or transmit data. FIG. 10 exemplifies the steps within a conventional non-synchronized handover of a user equipment from a source eNodeB to a target eNodeB. After the user equipment receiving a RRC connection reconfiguration message from the source eNodeB the user equipment acquires downlink synchronization in the target primary cell (PCell) first and performs a random access procedure (RACH procedure) resulting in a time alignment of the uplink component carrier(s) of the primary cell. Furthermore, in case the user equipment is configured with additional component carriers by the target eNodeB (in this example, component carriers of two component carrier groups (CoCa Group 1 and 2)) that experience different propagation delays then the user equipment would need to perform additional RACH procedures (in this example, a RACH procedure of CoCa Group 1 and another RACH procedure of CoCa Group 2) that contribute to the handover delay. Upon having time aligned all configured uplink carriers, the user equipment finishes the non-synchronized handover by sending a RRC connection reconfiguration complete message.

Figure 11:
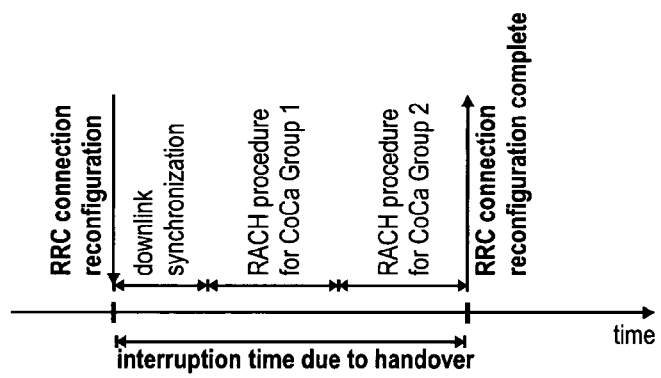

As highlighted in FIG. 11, in case of a synchronous handover the user equipment would be provided with the timing advance value for the primary cell of the target eNodeB which would allow avoiding the RACH procedure for the primary cell (PCell). However, still the RACH procedures for uplink component carriers of all other timing advance groups (CoCa Group 1 and 2) would need to be performed to appropriately establish the timing advances for the respective uplink component carriers.

Assuming for exemplary purposes that there is an aggregation access point in the network and that there are at least two component carriers that stem from at least two different physical locations (e.g. due to involvement of a remote radio head, RRH), respectively, that are experiencing different propagation delays (e.g. because the signal path is through a frequency selective repeater) and further assuming that the mobile terminal has at least one uplink component carrier which is time aligned (i.e. the uplink component carrier of the reference cell), the mobile terminal can derive the necessary timing advance for the non-aligned component carrier(s) from one reference timing advance, i.e. the timing advance of the already time aligned uplink component carrier in the reference cell. Furthermore, it should be noted that this is true as long as the uplink propagation delay is the same as the downlink propagation delay for the uplink component carrier and the downlink component carrier of a given radio cell.

The timing advance for a given non-time aligned uplink component carrier of a radio cell is determined based on the timing advance (for the uplink component carrier) in the reference cell and a reception time difference or propagation delay difference of transmissions receiving through a downlink component carrier of the reference cell and through a downlink component carrier of the radio cell comprising the non-time aligned uplink component carrier.

In the following the procedure for determining the timing advance for non-timer aligned uplink component carrier according to exemplary embodiments of the invention will be described with reference to a 3GPP based system for exemplary purposes only. In the following examples, the aggregation access point is corresponding to an eNodeB, while a further access point is formed by a Remote Radio Head (RRH) or a Frequency Selective Repeater (FSR).

Figure 3:
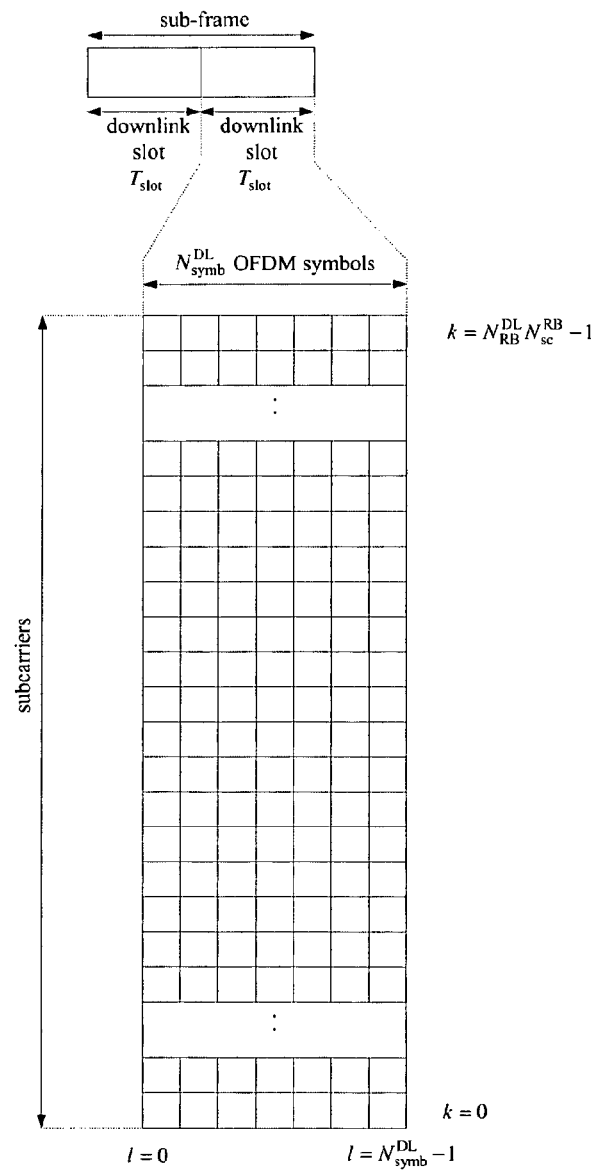
FIG. 3 shows an exemplary sub-frame boundaries on a downlink component carrier as defined for 3GPP LTE (Release 8/9)
Figure 4:
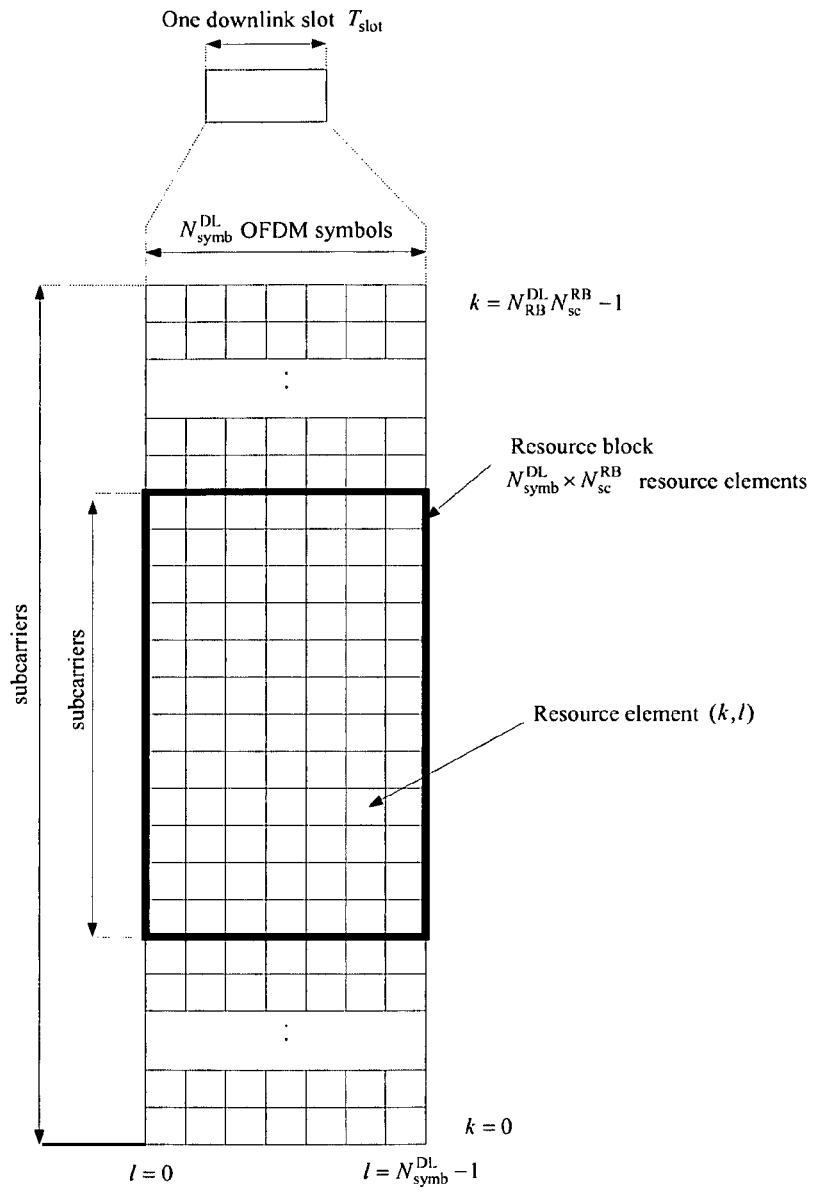
FIG. 4 shows an exemplary downlink resource grid of a downlink slot as defined for 3GPP LTE (Release 8/9)
Figure 5:
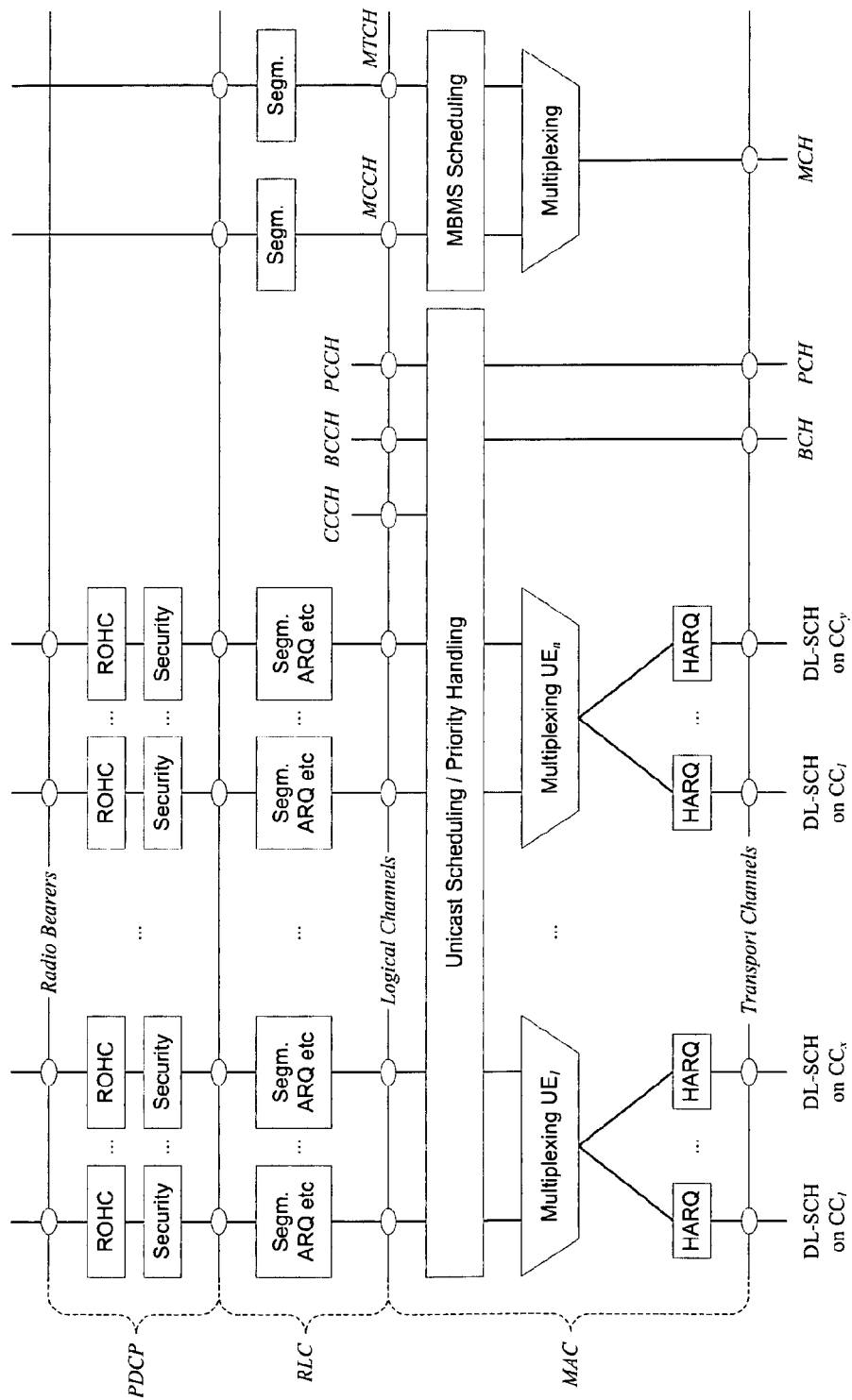
FIGS. 5 & 6 show the 3GPP LTE-A (Release 10) Layer 2 structure with activated carrier aggregation for the downlink and uplink, respectively.
Figure 6:
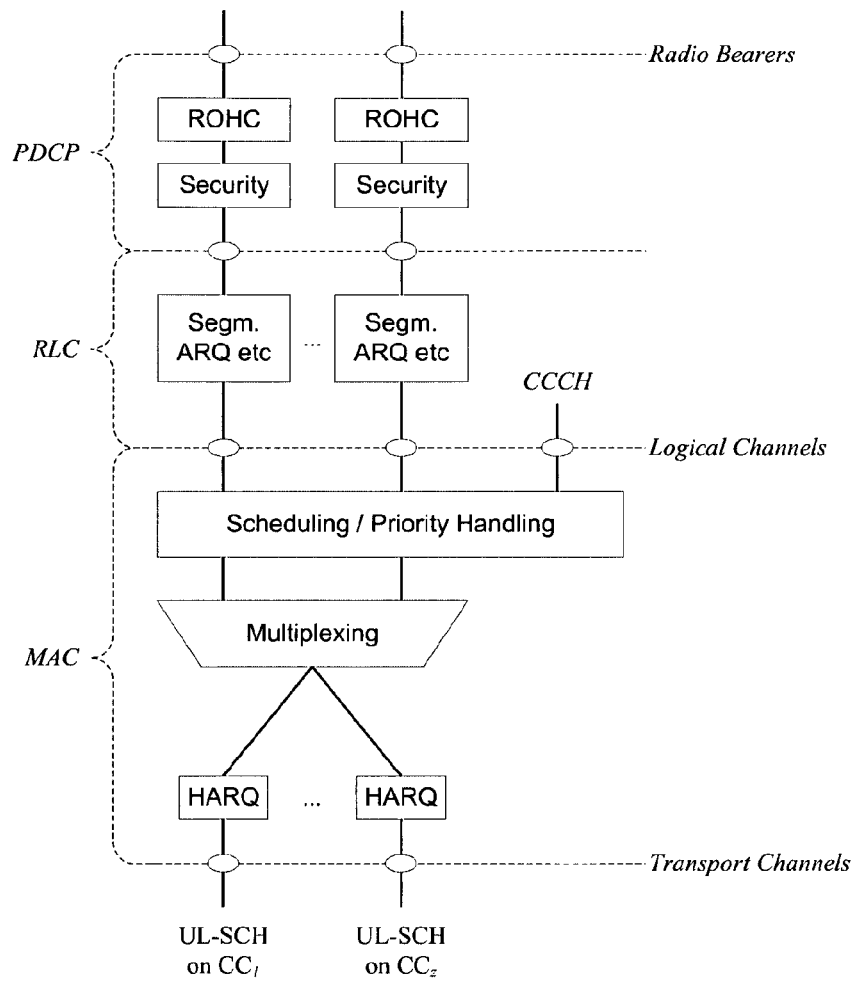

For exemplary purposes the uplink and downlink component carriers are assumed to have a slotted structure, i.e. transmissions in the uplink and downlink are transmitted in sub-frames. In the downlink, a sub-frame structure as exemplarily shown in FIG. 3 and FIG. 4 can be used, but the invention is not limited thereto. Similarly, in the uplink, a sub-frame structure as exemplified in FIG. 3 and FIG. 4 can be used, but the invention in not limited thereto. The number of subcarriers (i.e. the bandwidth) for an uplink component carrier may be different from the number of subcarriers (i.e. the bandwidth) of a downlink component carrier. The uplink component carriers may have different bandwidths. Likewise the downlink component carriers may have different bandwidths.

Furthermore, in the uplink, a single sub-frame is assumed to span the entire bandwidth (i.e. all subcarriers (or sub-bands)) of all uplink component carriers aggregated by an access point (e.g. eNodeB). From the perspective of a user equipment, a single sub-frame is spanning the entire bandwidth (i.e. all subcarriers (or sub-bands)) of all component carriers configured by the mobile terminal in the uplink or downlink, respectively. Hence, the data sent within in one sub-frame is transmitted as an individual transmission of modulated symbols (e.g. OFDM symbols) on each component carrier configured in the uplink or downlink, respectively. Therefore, order to process a given single sub-frame that is transmitted in the downlink or uplink the mobile terminal (e.g. the user equipment) or the access point (e.g. the base station or eNodeB) needs to receive all transmissions of the sub-frame on the respective downlink component carriers configured by the mobile terminal, respectively, all uplink component carriers received by the (aggregation) access point (e.g. eNodeB).

Figure 18:
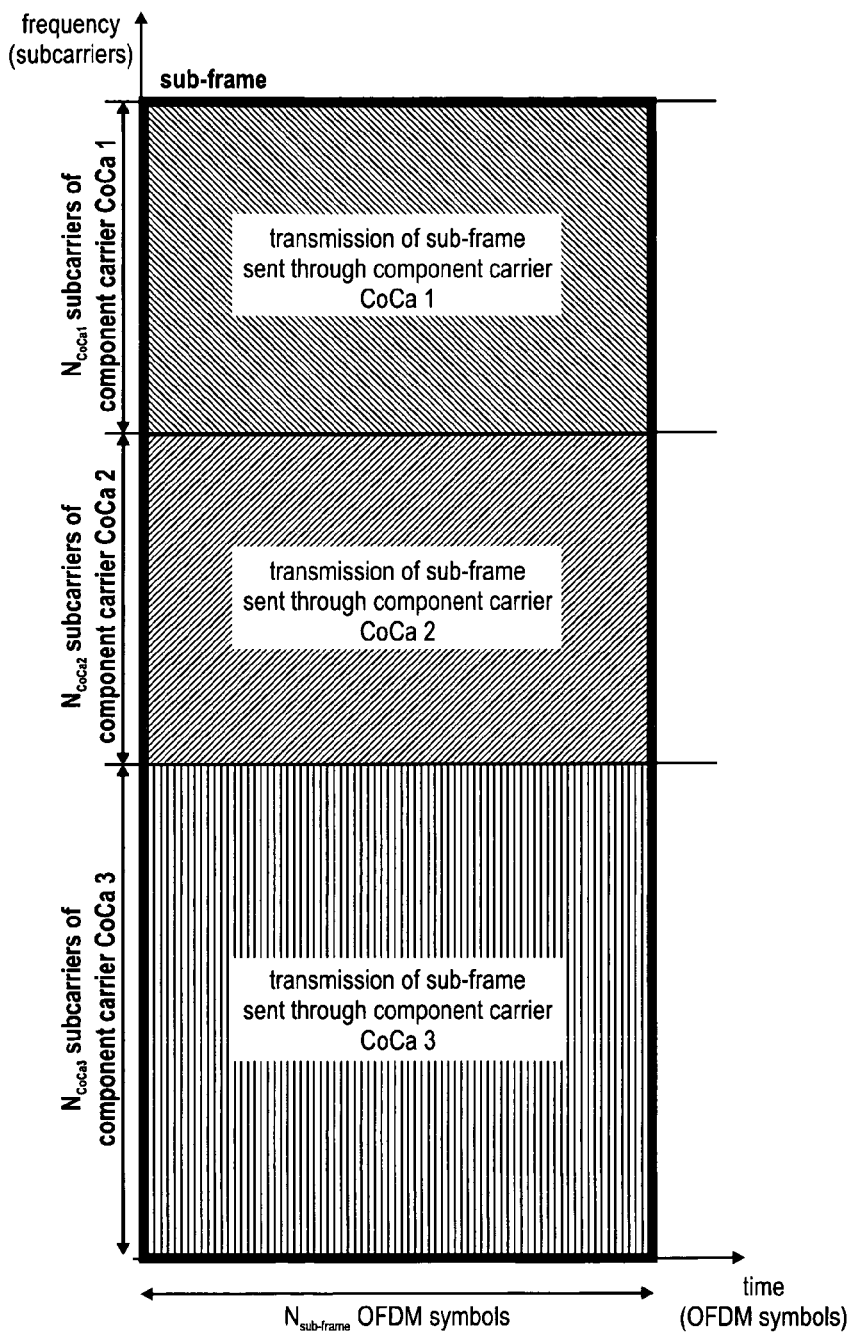
FIG. 18 shows an exemplifies the structure of a sub-frame according to one exemplary embodiment of the invention, and the transmissions thereof via three component carriers, FIG. 19 exemplifies the time alignment of three uplink transmissions for a single sub-frame using different timing advance values, so as to time align their reception at an aggregation access point.

FIG. 18 exemplarily shows a sub-frame that is to be transmitted via three component carriers in the uplink. Assuming for example an OFDM-based communications system, a sub-frame can be defined as a set of $N_{sub\text{-}frame}$ consecutive OFDM symbols (for example 12 or 14 OFDM symbols) in the time domain and a set of subcarriers corresponding to the—here three—difference component carriers in the frequency domain. For exemplary purposes, three component carriers CoCa 1, CoCa 2 and CoCa 3 are shown that comprise each $N_{CoCa1}$, $N_{CoCa2}$, and $N_{CoCa3}$ subcarriers respectively. The subcarriers of the component carriers may also be grouped into individual sub-bands. Further, strictly speaking, the sub-frame does not necessarily span a continuous region of sub-carriers in the frequency domain; the different subcarriers of the component carriers may also be spaced in the frequency domain. Similarly, the number of the subcarriers of the individual component carriers (i.e. their bandwidth) may or may not be the same for the different component carriers. E.g. component carriers CoCa 1 and CoCa 2 could be component carriers providing each a bandwidth of 5 MHz, while component carrier CoCa 3 has a bandwidth of 10 MHz.

The modulation symbols of a respective OFDM symbol that are located on the subcarriers of a given component carrier are considered a transmission of the sub-frame. Hence, in the example shown in FIG. 18, a single sub-frame is transmitted by means of three transmissions on the three component carriers CoCa 1, CoCa 2 and CoCa 3.

In this connection, time alignment of the transmissions on an uplink component carrier means that the mobile terminal shifts (in time) the sub-frame structure of the respective uplink component carrier relative to the boundaries of the sub-frames received in the downlink (e.g. the sub-frame boundaries of the downlink component carrier of the reference cell or the radio cell to which the uplink component carrier to be time-aligned belongs). The timing advance (value) indicates the shift in time to be applied relative to the beginning/timing of the sub-frames in the reference sub-frame structure received in the downlink by the mobile terminal. In case of appropriately configuring the timing advance for the uplink component carriers (of different radio cells with different propagation delays and/or of different mobile terminals) the access point can ensure that the uplink sub-frame boundaries are aligned for all uplink component carriers.

Figure 19:
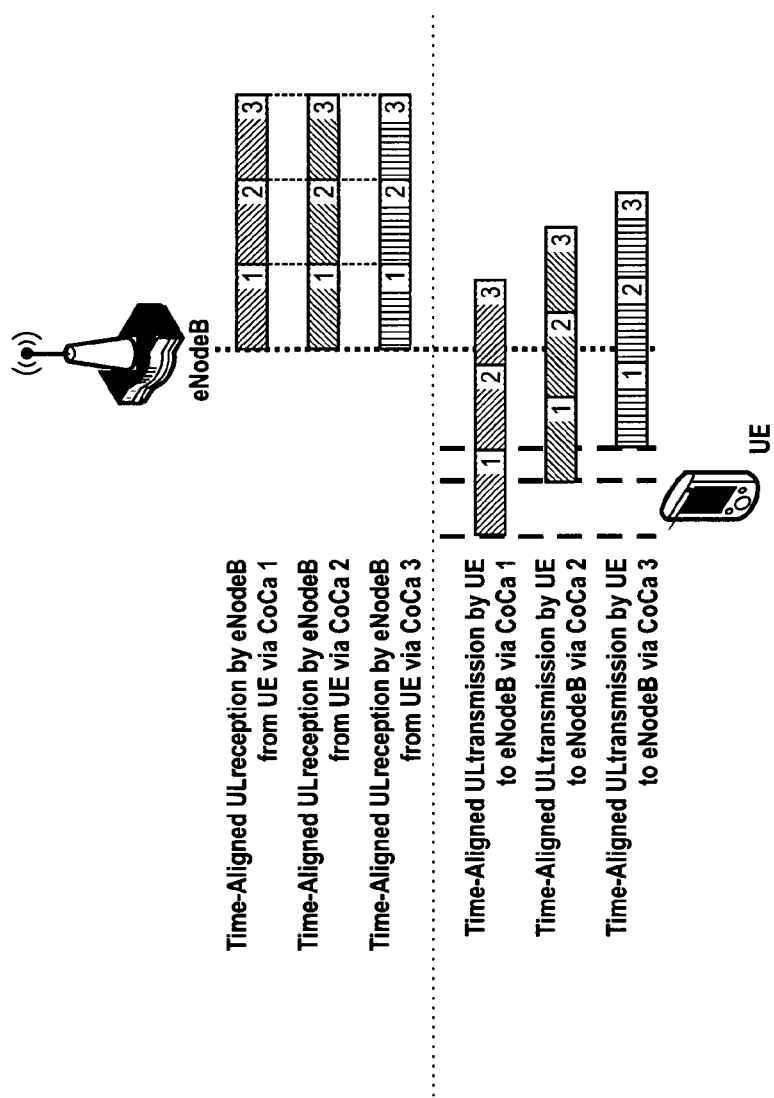
Figure 20:
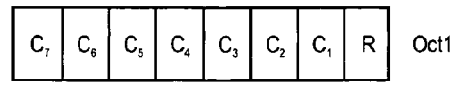
FIG. 20 shows the format of an activation/deactivation MAC control element, being a command for activating or deactivating one or more SCells.
Figure 21:
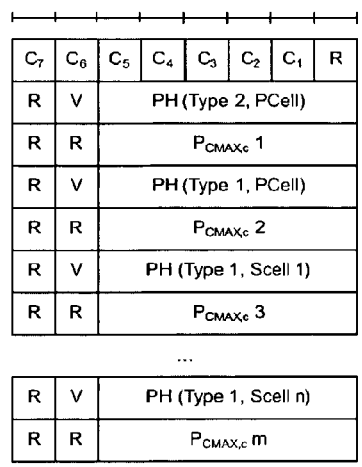
FIG. 21 shows the format of an Extended Power Headroom MAC control element, when Type 2 PHR is reported.
Figure 22:
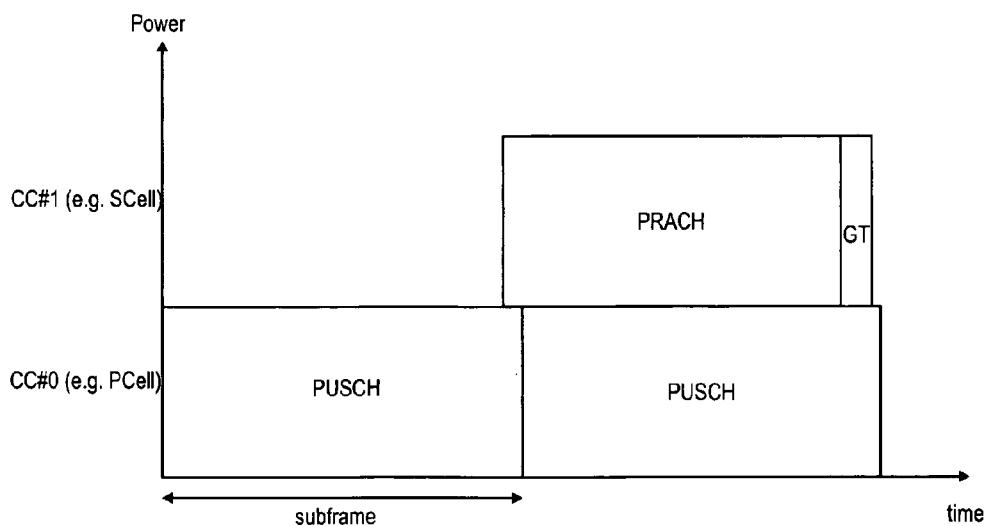
FIG. 22 illustrates the disadvantage of using a PRACH transmission on a component carrier to be uplink-time-aligned, and in particular, the differences in the uplink timing between PRACH on one component carrier and PUSCH/PUCCH on the another component carrier.

FIG. 19 exemplarily shows the transmission of three consecutive sub-frames (numbered 1, 2 and 3) via three uplink component carriers (as shown in FIG. 18). Due to the user equipment UE using individual timing advance values for the three component carriers CoCa 1, CoCa 2 and CoCa 3, which are assumed to have different propagation delays for exemplary purposes, the individual transmissions of the respective single sub-frames become time aligned with respect to their reception at the eNodeB. This facilitates, for example, that the physical layer entity of the eNodeB can a single IFFT operation when processing the individual sub-frames.

In one exemplary embodiment of the invention, the timing advance value $TA_{AP2}$ of a (non-time aligned) uplink component carrier of a radio cell is calculated at the mobile terminal based on the known timing advance value $TA_{AP1}$ of the (time-aligned) uplink component carrier of the reference cell, and further based reception time difference (or propagation delay difference) $\Delta T_{prop}$, as follows:

$$TA_{AP2} = TA_{AP1} + 2 \cdot \Delta T_{prop} \quad \text{(Equation 1)}$$

Figure 7:
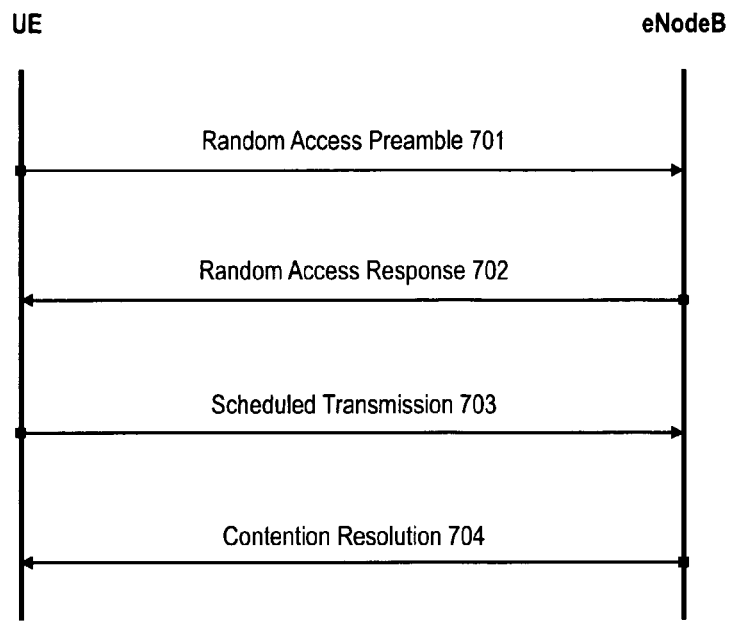
FIG. 7 shows a RACH procedures as defined for 3GPP LTE (Release 8/9) in which contentions may occur.
Figure 8:
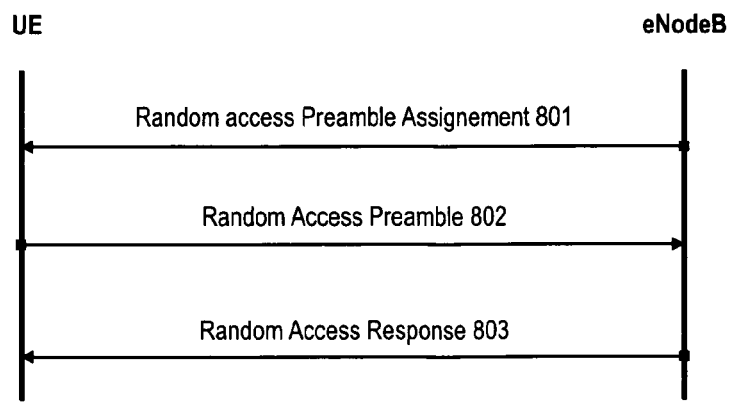
FIG. 8 shows a contention-free RACH procedure as defined for 3GPP LTE (Release 8/9), FIG. 9 exemplifies the time alignment of an uplink component carrier relative to a downlink component carrier by means of a timing advance as defined for 3GPP LTE (Release 8/9), FIGS. 10 & 11 exemplify the interruption time during a non-synchronized and synchronized handover, respectively, due to time alignment of multiple uplink component carriers, FIG. 12 exemplifies the reduction of the interruption time caused by a synchronous handover, when employing the time alignment calculation of uplink component carriers according to one of the various embodiments described herein.
Figure 9:
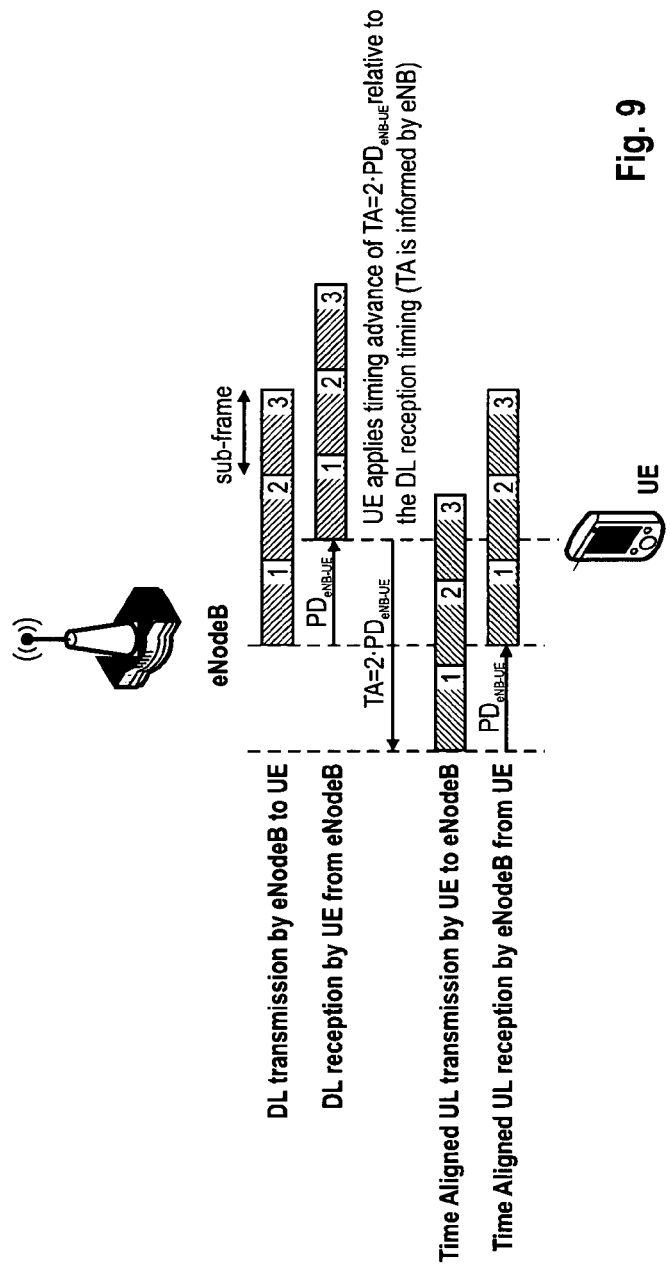

The timing advance value $TA_{AP1}$ of the (time-aligned) uplink component carrier of the reference cell may have been for example obtained by the mobile terminal by performing a RACH procedure as outlined with respect to FIGS. 7 to 9 before, or the timing advance value $TA_{AP1}$ may have also been calculated earlier by the user equipment as described herein with reference to another reference cell.

Furthermore, in one exemplary implementation the time alignment of the reference cell and hence the value of $TA_{AP1}$ may be (constantly) updated by the access point of the reference cell. Hence, in case the timing advance of the reference cell is updated the mobile terminal may also update the timing advance values calculated relative thereto. The update of the timing advance for the uplink component carrier(s) based on the updated timing advance of the uplink component carrier in the reference cell may also include a new measurement of the reception time difference (or propagation delay difference) $\Delta T_{prop}$ since the this time difference may also be subject to changes, e.g. due to movement of the mobile terminal.

Alternatively, the update of the time alignment of the reference cell may not cause an update of the timing advance value(s) for the uplink component carrier(s) of the other radio cell(s). Instead, the aggregation access point (e.g. the eNodeB) could send update commands for the timing advance values of the respective uplink component carriers or the respective uplink component carrier groups. The update commands may for example indicate a correction of the presently set timing advance values. The update commands may be sent for example by MAC control signalling, e.g. within MAC control elements that are multiplexed to the downlink transmissions.

It is assumed in Equation 1 that the timing advance value $TA_{AP2}$ is defining the timing advance relative to the reception timing of the downlink component carrier (or to be more precise relative to the reception timing of the beginning of sub-frames transmitted via the downlink component carrier) of the radio cell the uplink component carrier of which is to be time aligned.

The reception time difference (or propagation delay difference) $\Delta T_{prop}$ can be assumed to be defined as:

$$\Delta T_{prop} = T_{DL\text{-}TCell} - T_{DL\text{-}RCell} \quad \text{(Equation 2)}$$

where $T_{DL\text{-}TCell}$ denotes the point in time at which the beginning of a sub-frame is detected by the mobile terminal within a transmission via the target cell (TCell), i.e. the radio cell the uplink component carrier of which is to be time aligned, and $T_{DL\text{-}RCell}$ denotes the point in time at which the beginning of the same sub-frame is detected by the mobile terminal within a transmission via the reference cell (RCell).

In case the timing advance value $TA_{AP2}$ is defining the timing advance relative to the reception timing of the downlink component carrier of the reference cell, the timing advance value $TA_{AP2}$ is calculated as follows:

$$TA_{AP2} = TA_{AP1} + \Delta T_{prop} \quad \text{(Equation 3)}$$

However, defining the timing advance value $TA_{AP2}$ as in Equation 3 may have the disadvantage that in case the reference cell is "dropped", i.e. the component carrier(s) of the reference cell are deactivated or no longer configured (e.g. due to handover), the mobile terminal may need to recalculate all timing advance values. This is true in case the loss of the (time alignment in the) reference cell is also implying a loss of the time alignment of all other radio cells that are time aligned relative thereto. However, it may also be the case that after initial time alignment relative to the reference cells, the time alignment of the individual radio cells (i.e. uplink component carriers) is individually or group-wise updated by the aggregation access point, so that a loss of the reference cell does not necessarily require a new time alignment of the other radio cells configured by the mobile terminal.

In the following the determination of the timing advance for non-time aligned uplink component carriers (non-time aligned radio cells) will be outlined in further detail and reference to some exemplary scenarios. In the exemplary scenario shown in FIG. 13, it is assumed that a user equipments aggregates two radio cells, one radio cell originating from a first location, e.g. an eNodeB, and the other radio cell originating from a different location, e.g. a Remote Radio Head (RRH). A RRH denotes a radio equipment that is connected to and remote to an access point, such as a base station (e.g. a eNodeB in 3GPP based systems) which is controlling the RRH. The interface between the access point and the RRH may be for example use the Common Public Radio Interface (CPRI) standard see www.cpri.info. The RRH and its controlling access point may be for example interconnected via a fiber optic cable.

Transmissions via the uplink component carriers of the two radio cells are processed in the same aggregation node, i.e. the eNodeB in this example, and the propagation delay of the downlink component carrier and the uplink component carrier of each radio cell is the same. The radio cell comprising the uplink component carrier UL CoCa 1 and the downlink component carrier DL CoCa 1 between the mobile terminal UE and the eNodeB is denoted the primary radio cell (e.g. the PCell of the user equipment), while the radio cell comprising the uplink component carrier UL CoCa 2 and the downlink component carrier DL CoCa 2 between the mobile terminal UE and the RRH is denoted secondary radio cell (e.g. a SCell of the user equipment). All transmissions sent from the user equipment via the secondary cell are received by the transceiver of the RRH and a forwarded to the eNodeB via the interface between RRH and eNodeB. Similarly, when transmitting data via the RRH, the eNodeB transmits the data to the RRH e.g. using CPRI protocols and the RRH forwards the data to the user equipment via the downlink component carrier of the secondary cell.

The primary radio cell may be considered to be the PCell of the user equipment in this example and is the reference cell for time alignment. However, also any other radio cell that the user equipment aggregates and which is currently timing aligned can serve as a reference cell. For example, the time alignment of the uplink component carrier UL CoCa1 in the primary radio cell may have been set by the eNodeB through a RACH procedure performed in the primary radio cell.

Figure 15:
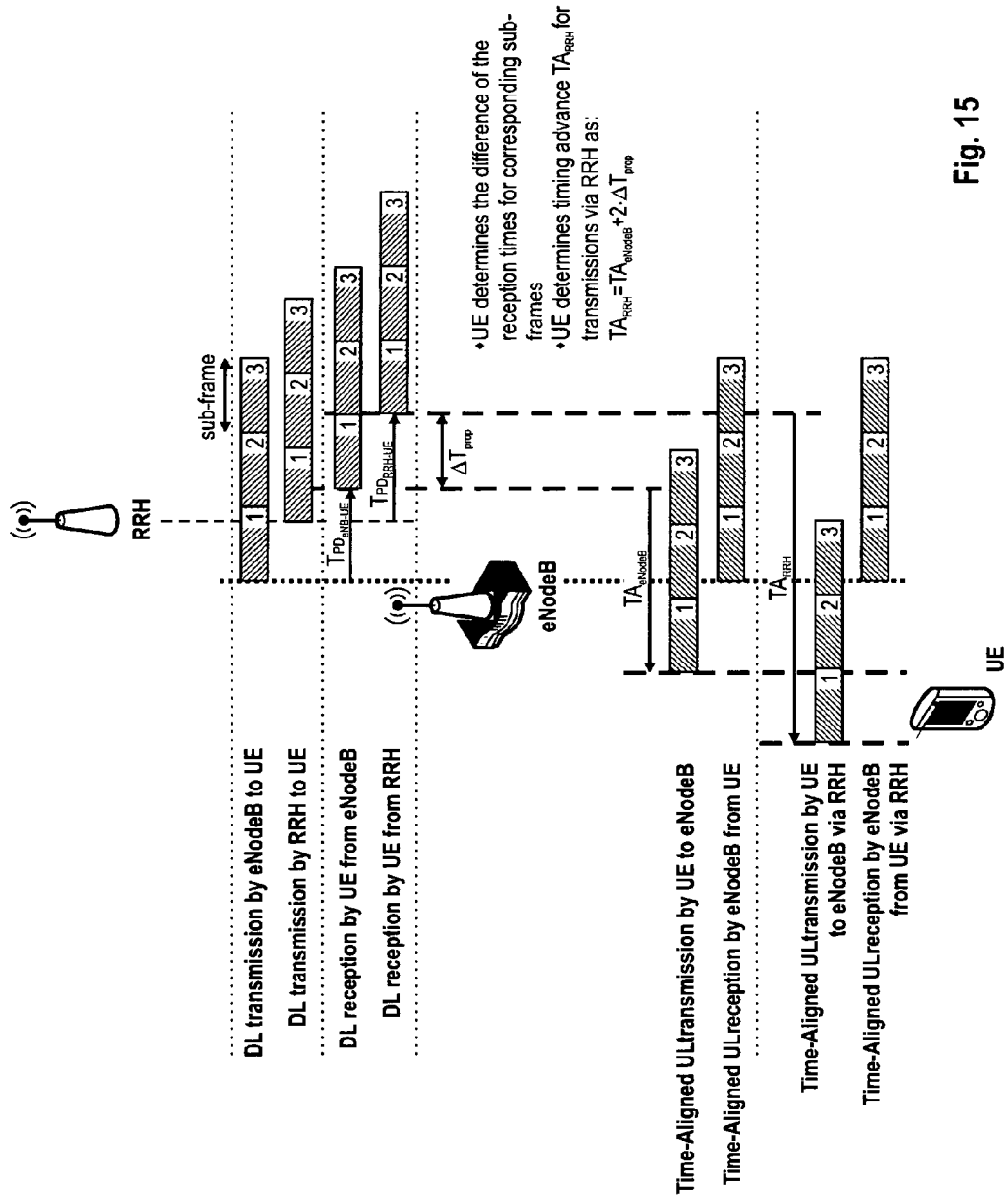
FIGS. 15 to 17 show a exemplary procedures according to different exemplary embodiments of the invention allowing the user equipment to determine the correct time alignment for non-time aligned uplink component carriers in other radio cells than the reference cell.

FIG. 15 is showing a procedure according to an exemplary embodiment of the invention allowing the user equipment to determine the correct time alignment for non-time aligned uplink component carriers in other radio cells than the reference cell. For exemplary purposes, it is assumed that the eNodeB is the aggregation access point and that the RRH servers as an additional access point, as outlined with respect to FIG. 13 above. The eNodeB transmits sub-frames in the downlink to the user equipment via the primary and secondary radio cell, respectively. For exemplary purposes, it is assumed that the eNodeB transmits all transmissions of a single sub-frame (corresponding transmissions) simultaneously. Corresponding transmissions of a given sub-frame are indicated by the same number in FIG. 15. Since the transmissions of a given sub-frame take different propagation paths, the respective transmissions of the given sub-frame are received at different points in time at the user equipment, as highlighted in the upper part of FIG. 15.

The time shift between the transmission of a sub-frame by the eNodeB and the RRH is for example due to the transmission of the sub-frame via the RRH being forwarded by the eNodeB via the interface to the RRH (propagation delay $T_{PD_{eNB\text{-}RRH}}$) and from the RRH to the user equipment (propagation delay $T_{PD_{RRH\text{-}UE}}$). Furthermore, there may be also a non-neglectable processing delay $T_{PROC_{RRH}}$ of the sub-frames at the RRH, which may need to be taken into account. The propagation delay of the transmission of a sub-frame from the eNodeB to the user equipment via the primary cell is denoted $T_{PD_{eNB\text{-}UE}}$.

The user equipment measures the time difference $\Delta T_{prop}$ between the reception of corresponding transmissions of a sub-frame. In more detail, the user equipment determines a difference between the reception times of a transmission of a sub-frame #i via a downlink component carrier of the radio cell in which the uplink component carrier is to be time aligned, and a transmission of the sub-frame #i via a downlink component carrier of the reference radio cell. In the example shown in FIG. 15, where the primary radio cell of the eNodeB is the reference cell for time alignment, the user equipment determines at what point in time the beginning of a sub-frame transmitted via a downlink component carrier of the reference cell is received, and at what point in time the beginning of the of the very same sub-frame via downlink component carrier of the radio cell of the RRH is received, and calculates the time difference $\Delta T_{prop}$ of these two reception times.

Figure 13:
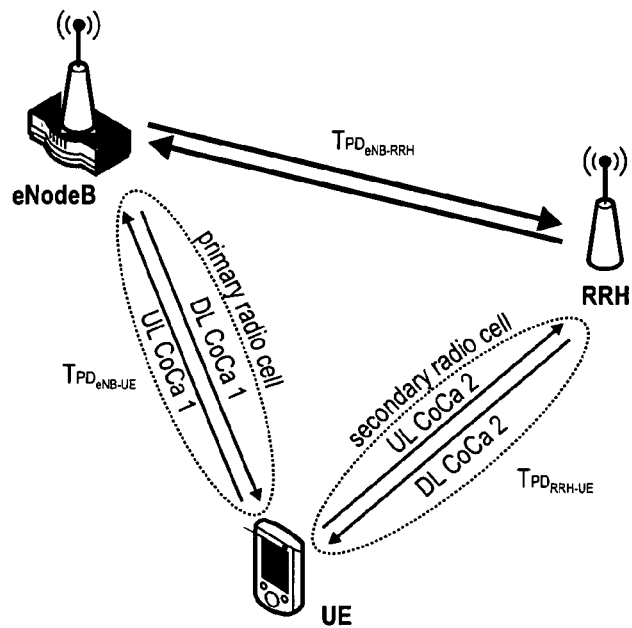
FIG. 13 shows an exemplary scenario in which a user equipments aggregates two radio cells, one radio cell originating from an eNodeB, and the other radio cell originating from a Remote Radio Head (RRH)

Time difference $\Delta T_{prop}$ between the reception of corresponding transmissions of a sub-frame assuming a scenario as shown in FIG. 13 is defined as $$\Delta T_{prop} = (T_{PD_{eNB\text{-}RRH}} + T_{PROC_{RRH}} + T_{PD_{RRH\text{-}UE}}) - T_{PD_{eNB\text{-}UE}} \quad \text{(Equation 4)}$$

where the term $T_{PROC_{RRH}}$ may be omitted. Since the eNodeB sends all transmissions of the sub-frame simultaneously, $\Delta T_{prop}$ actually denotes the propagation delay difference of the transmission of the sub-frames via the reference cell (primary radio cell) and the secondary radio cell as shown in FIG. 13.

In order to ensure that corresponding transmissions of a sub-frame arrive simultaneously at the eNodeB when sending them through different uplink component carries experiencing different propagation delays, the user equipment needs to compensate the measured propagation delay difference and advance the transmissions further (relative to the uplink transmission on the uplink component carrier of the reference cell). Hence, in the exemplary scenario of FIG. 13, the transmissions of sub-frames on uplink component carrier UL CoCa 2 via the RRH is to be advanced by the reference timing advance $TA_{eNodeB}$ (which is known to the user equipment) and two times the time difference $\Delta T_{prop}$ measured by the user equipment. Thus the correct timing advance to be applied for the uplink transmissions of the sub-frames sent via the RRH can be calculated as $$TA_{RRH} = TA_{eNodeB} + 2 \cdot \Delta T_{prop} \quad \text{(Equation 5)}$$

As mentioned earlier, the timing advance value $TA_{eNodeB}$ of the reference cell/reference uplink component carrier UL CoCa 1 may have been learned by the user equipment from a RACH procedure with the eNodeB or may have been determined in the manner described above based on the known timing advance from another/previous reference cell.

The eNodeB controlling the reference cell in the scenario of FIG. 13 may constantly adjust the time alignment of the uplink component carrier UL CoCa 1 by sending continuous updates of the timing advance value $TA_{eNodeB}$. The updates of the timing advance may be for example sent via MAC signalling, e.g. using MAC control elements multiplexed into a downlink transmission sent to the user equipment.

In one further exemplary embodiment of the invention, the time alignment of an uplink component carrier could be controlled by means of a timer. A separate timer may be maintained by the mobile terminal for each timing advance value (each associated to either an individual uplink component carrier or a uplink component carrier group). The mobile terminal resets and starts the timer each time it receives an update command for a given timing advance value (respectively, plink component carrier or a uplink component carrier group). Whenever the timer expires, i.e. timing alignment is considered to be lost, time alignment can be reestablished by the mobile terminal using the mechanisms described herein, e.g. the mobile terminal can recalculate the timing advance value based on the reference cell and a new measurement of the reception time difference (or propagation delay difference) or the user equipment could alternatively perform a RACH procedure to reestablish time alignment.

Thus an uplink—in practice—can be considered to be timing aligned as long as the user equipment maintains a reference timing alignment on another radio cell's uplink.

Figure 16:
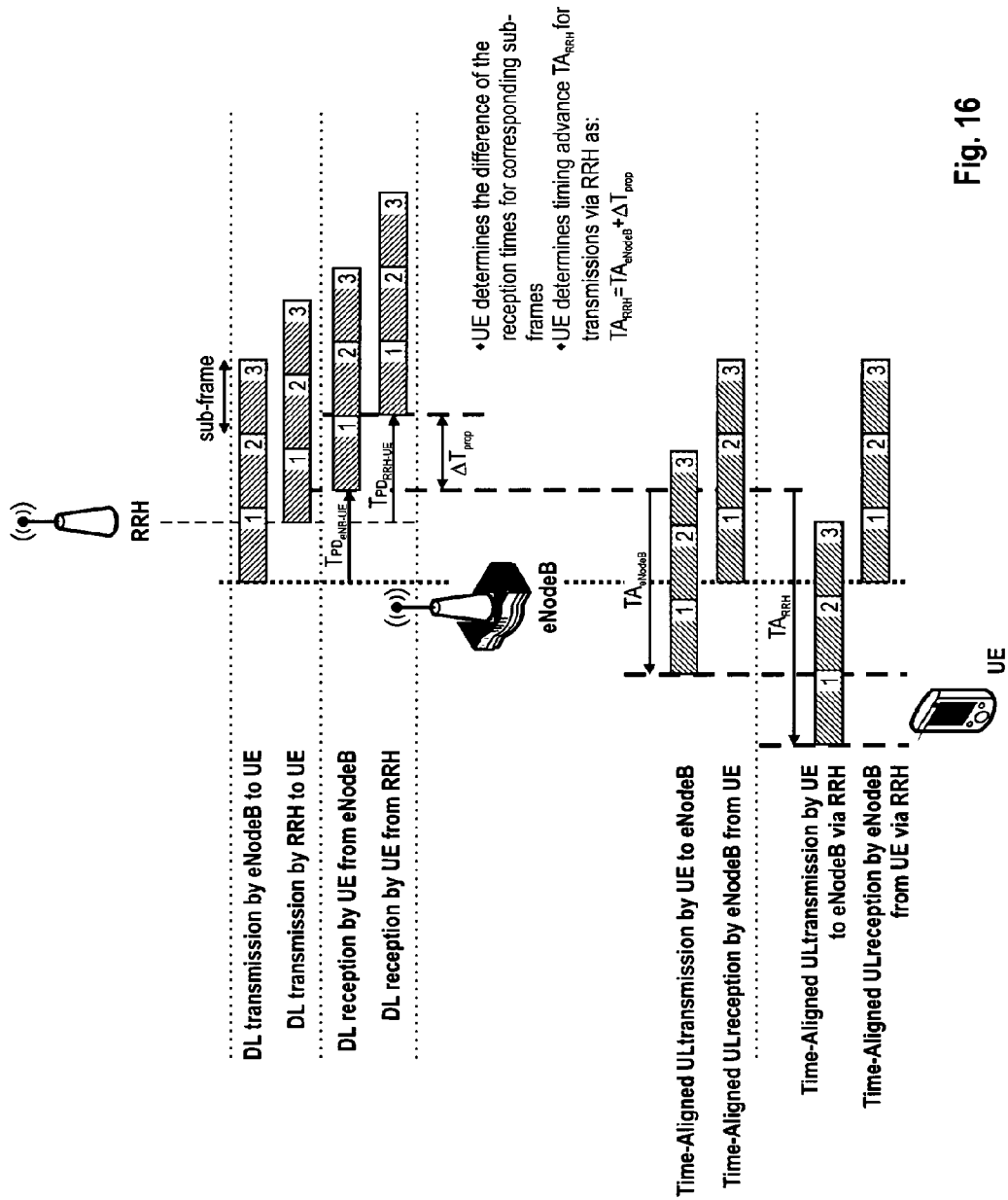

As exemplified in FIG. 16, the timing advance value $TA_{RRH}$ may also be calculated relative to the reception timing of the downlink sub-frame boundaries on a downlink component carrier with the reference cell, i.e. downlink component carrier DL CoCa 1 of the primary radio cell as shown in FIG. 13. Accordingly, the equation for calculating the timing advance value $TA_{RRH}$ for the uplink component carrier UL CoCa 2 in the secondary radio cell would be changed to:

$$TA_{RRH} = TA_{eNodeB} + \Delta T_{prop} \qquad \text{(Equation 6)}$$

where the values $TA_{eNodeB}$ and $\Delta T_{prop}$ remain unchanged in comparison to Equation 5.

Furthermore, in the examples of FIG. 15 and FIG. 16, the timing advance values $TA_{RRH}$ and $TA_{eNodeB}$ have been chosen to not only align the uplink transmissions on the uplink component carriers with respect to the sub-frame boundaries, but also to aligned the sub-frame boundaries in the uplink and downlink component carriers. However, this is not mandatory.

Figure 17:
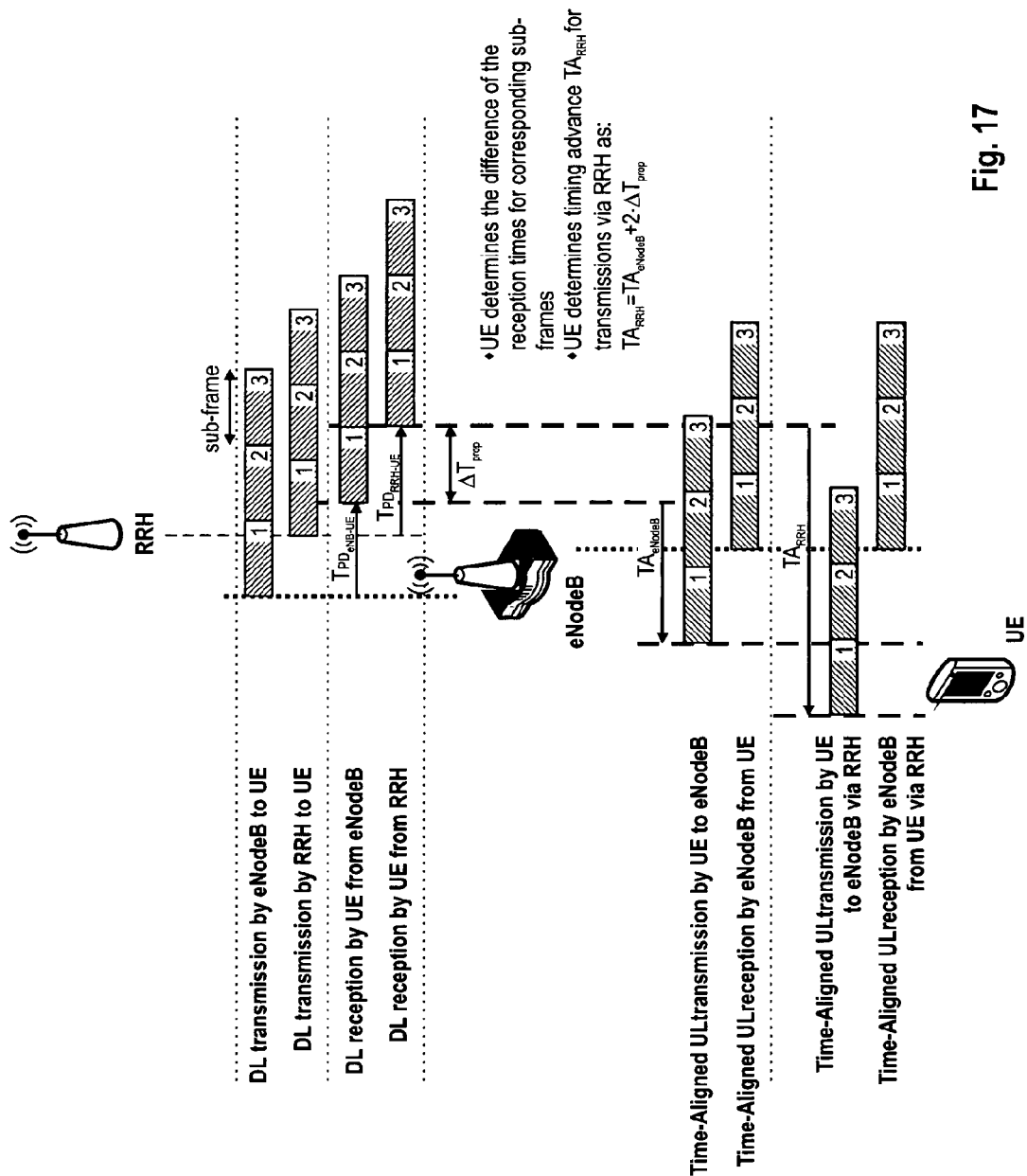

As exemplified in FIG. 17, the timing advance values for the uplink component carriers may be also chosen so that the sub-frame boundaries in the uplink and downlink component carriers are not aligned. This may be for example achieved in case the reference timing advance value (denoted $TA_{AP1}$ or $TA_{eNodeB}$ in the examples above) is configured by the aggregation access point (e.g. eNodeB) so as to not correspond to two times the propagation delay between the aggregation access point and the mobile terminal, as for example shown in FIG. 9. The timing advance values for non-aligned uplink component carrier(s) may be then still determined as outlined above with respect to FIGS. 15 and 16 based on this reference timing advance value. However, the timing advance value(s) calculated on such reference timing advance value will then still align the sub-frame boundaries on the uplink component carriers, but not the sub-frame boundaries of uplink and downlink component carriers.

The same assumptions and calculations that are described above may also be used in scenarios where the over-the-air signal between mobile terminal and aggregation access point, and vice versa, is passing through a Frequency Selective Repeater (FSR). A FSR may also be referred to as a bi-directional amplifier (BDA). The FSR is an apparatus that used for boosting the radio signals of a wireless system in a local area by receiving the radio signal by means of a reception antenna, amplifying the received radio signal with a signal amplifier and broadcasting the amplified radio signal via an internal antenna. The operation of the FSR is commonly transparent to the other network nodes, i.e. the access points and mobile terminals. The FSR may be assumed to boost the radio signals of one or more component carriers in the downlink and uplink. In case only a subset of the configured component carriers is amplified by a FSR, the radio signals of the different component carriers may experience different propagation delays, similar to the situation discussed previously herein with respect to FIG. 13.

One difference between the usage of a RRH or a FSR is the location of reception of the physical layer. Physical layer reception of the uplink transmissions for the radio cells that originate at the location of the aggregation access point (e.g. eNodeB) takes place at the aggregation access point, while for the radio cells originating from the location of the RRH for physical layer reception takes place at the RRH. Inherently, the method of time alignment described above for the scenario shown in FIG. 13 adjusts the uplink timing for the radio cells being received at the RRH in manner that all uplink transmissions of all mobile terminal arrive at the same time at the RRH, which is important for interference-free reception of all uplink radio signals arriving from all mobile terminals at the RRH. Furthermore, since processing delay in the RRH and propagation delay from RRH to aggregation access point (e.g. eNodeB) can be assumed to be the same for all uplink radio signals received at the RRH, all uplink data forwarded by the RRH arrive at the aggregation access point at the same time as well, which is beneficial for further processing in higher layers.

For the case that a Frequency Selective Repeater is used, all uplink radio signals are received at the location of the aggregation access point (e.g. the eNodeB). Hence, the physical radio signals of all uplink transmissions for all radio cells should advantageously arrive at the same time instance, in order to ensure interference-free physical layer processing.

Figure 14:
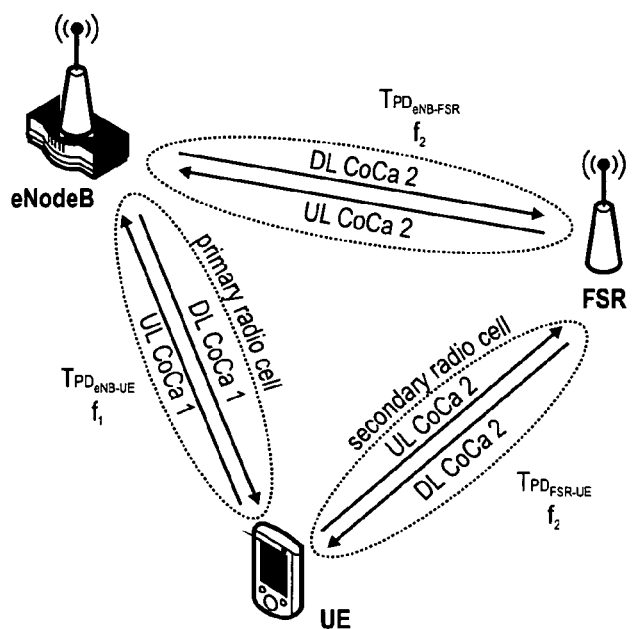
FIG. 14 shows an exemplary scenario in which a user equipments aggregates two radio cells, one radio cell originating from an eNodeB, and the other radio cell originating from a Frequency Selective Repeater (FSR)

FIG. 14 exemplifies a scenario, where a FSR is used to boost the downlink and uplink component carriers (DL/UL CoCa 2) of a secondary radio cell, while the radio signals of the downlink and uplink component carriers (DL/UL CoCa 1) of a primary radio cell are not amplified by the FSR. In this scenario it is assumed that the uplink and downlink component carriers of the secondary radio cell are boosted by the FSR and that the user equipment is not receiving the uplink and downlink carriers of the secondary radio cell from the directly eNodeB. Hence, in this scenario it can be again assumed that the propagation delay of uplink and downlink component carriers within the secondary radio cell is different from the propagation delay of uplink and downlink component carriers within the primary radio cell. Furthermore, there is no propagation delay difference between the uplink and downlink component carriers within the secondary radio cell.

In case it is further assumed that the timing advance value $TA_{eNodeB}$ for the uplink component carrier UL CoCa 1 in the primary radio cell is known, the user equipment can time align the transmissions on the uplink component carrier UL CoCa 2 in the secondary radio cell based on this reference time alignment $TA_{eNodeB}$ and the reception time difference (or propagation delay difference) between the downlink component carrier transmissions in the primary and secondary radio cells in a manner described above. Basically the same equations above can be reused, where replacing the term $TA_{RRH}$ with the term $TA_{FSR}$ denoting the timing advance value for the uplink component carrier UL CoCa 2 in the secondary radio cell.

Since the utilization of a FSR may not be known to the mobile terminal—as it is operating in a transparent fashion— the aggregation access point (e.g. eNodeB) may inform the mobile terminal(s) whether it (they) are allowed to calculate timing advance values based on a reference cell or not. The aggregation access point (e.g. eNodeB) may be aware of the network configuration and thus also about the use and configuration of FSR(s) in its vicinity.

Configuration of Timing Advance method by Aggregation Access Point

As already indicated above the mobile terminal (e.g. user equipment) may be unaware of the location the different radio cells it is aggregating are stemming from. Hence, in this case, the mobile terminal is also unaware of the actual propagation delay it's uplink transmissions experience. Since mobile terminal may also not know whether both uplink and downlink of a radio cell are transmitted from the same location, in one further embodiment of the invention the methods for time aligning the uplink component carriers depending on a reference cell may for example be applied only in case the aggregation access point is authorizing this procedure. For example, in a 3GPP based mobile communications system, only the eNodeB knows if the user equipment's uplink transmissions experience the same propagation delay as the downlink signals received by the user equipment, since network topology and exact location of nodes (access points) and location of transmission and reception antennas is known to eNodeB.

Taking the above into account for each cell that is configured in the mobile terminal (e.g. user equipment), the aggregation access point (e.g. eNodeB) for example signal the uplink time alignment configuration mode, i.e. whether the calculation of timing advance as discussed previously herein can be applied for an uplink component carrier or uplink component carrier group, or whether initial timing advance for an uplink component carrier or uplink component carrier group is to be set through the RACH procedure.

The signalling can be for example achieved by introducing a flag indicating whether the RACH procedure is to be used for to get time aligned or whether the mobile terminal can calculate the timing advance based on the reference timing advance. The flag may be signalled for each individual radio cell or for a group of radio cells the component carriers of which experience an equal propagation delay.

The information on how to time align an uplink component carrier of a given radio cell should be available to the mobile terminal before transmission and reception on the radio cell can start. Therefore, in one exemplary implementation, the flag to signal the time alignment configuration mode may be conveyed to the mobile terminal via RRC signalling when the radio cells are configured. For example, the signalling information of the flag (e.g. one bit) to indicate the time alignment configuration mode may be for example included in a Radioresource Configuration Message of the RRC protocol.

Synchronized and Non-Synchronized Handover

The methods described above are also usable in a handover scenario, where the mobile terminal is to aggregate new uplink component carriers in one or more target cells. Instead of performing RACH procedure for a target radio cell, the mobile terminal can determine the uplink time alignment of the uplink component carriers relative to a reference cell controlled by the target aggregation node (or base station/eNodeB).

Once reference timing advance has been established in a target radio cell, further radio cells that are configured from the target aggregation access point (e.g. eNodeB) for the mobile terminal (e.g. user equipment) can be time aligned without using further RACH procedures. Hence, a handover where mobile terminal shall retain several aggregated radio cells under control of the target aggregation access point will commence by using only a single RACH procedure for the case of a non-synchronized handover instead of using one RACH procedure for every timing advance to be set for the radio cells in the new target aggregation access point.

The time alignment of the new reference cell under control of the target aggregation access point can be either obtained trough a RACH procedure (for non-synchronized handover), as mentioned above, or by configuring the timing advance value for one of the target radio cells through the source aggregation access point (i.e. the access point, e.g. eNodeB, from which the mobile terminal is handed over to the new/target access point) when using a synchronized handover. In the latter case no RACH procedure may be required at all in the target cells.

In one exemplary embodiment of the invention referring to a 3GPP based mobile communications network, such as 3GPP LTE-A, the source eNodeB (serving as an aggregation access point) is initiating the handover by sending a RRC connection reconfiguration message to the user equipment, which is instructing the user equipment to perform a handover. The RRC connection reconfiguration message informs the user equipment on the new eNodeB (serving as the new aggregation access point) controlling the target radio cells which are to be configured by the user equipment. Furthermore, the RRC connection reconfiguration message indicates the radio cells to be configured by the user equipment. Optionally, i.e. in case of a synchronized handover, the RRC connection reconfiguration message also comprises a timing advance value for setting the timing advance for an uplink component carrier (or uplink component carrier group) under control of the target eNodeB.

In case of a non-synchronized handover, the user equipment establishes downlink synchronization in the target radio cells and performs a RACH procedure on one of the uplink component carriers to establish time alignment for this the uplink component carrier (or the uplink component carrier group to which the uplink component carrier belongs). Once the time alignment is established, i.e. a timing advance value is set, the other uplink component carriers configured by the user equipment may be time aligned by the methods outlined herein above. Hence, in case of a non-synchronized handover, the user equipment only needs to perform one single RACH procedure, but can time align all uplink component carriers.

In case the eNodeB does not allow for calculating the timing advance values based on a reference cell (e.g. by means of RRC control signaling), the user equipment may need to perform more than one RACH procedure to time align uplink component carriers for which the timing advance value may not be configured based on the timing advance in a reference cell. For example, the RRC connection reconfiguration message could indicate for which target radio cells the user equipment may calculate the timing advance based on a reference cell.

Figure 12:
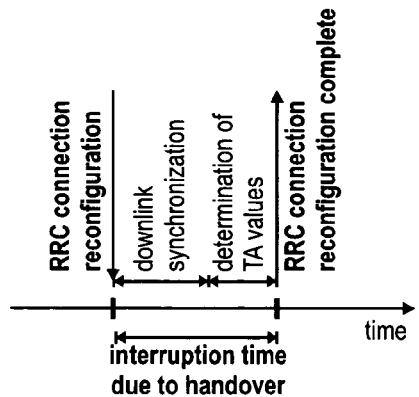

In case of a synchronized handover no RACH procedure at all is needed. An initial reference timing advance for a target radio cell serving as the reference is provided to the user equipment by the source eNodeB. All remaining radio cells controlled by the target eNodeB can then be time aligned using the methods described above (e.g. in case the eNodeB allow the time align the respective radio cell based on a reference timing advance). As shown in FIG. 12, the handover delay is minimized. The user equipment establishes downlink synchronization in one of the target cells (which will service as the reference cell) and configures the timing advance as provided by the eNodeB in the RRC connection reconfiguration message. Then the user equipment only needs calculate the timing advance values for the other uplink component carrier(s) or component carrier groups, and can then send the RRC connection reconfiguration complete message back to the new eNodeB to finish the handover.

Hence, the calculation of the timing advance(s) for the time alignment of uplink component carriers relative to a reference cell may significantly reduce the handover delay and thus reducing the latency and delay associated with this procedure when compared to the prior art methods for both, synchronized and non-synchronized handover.

Another aspect of the invention is to time-align a non-time-aligned uplink of a serving cell and to transmit timing information used for time-aligning the non-time-aligned uplink of the serving cell to the aggregation access point.

The following specific scenario is assumed, however should not be understood as limiting the invention, but as an example for describing the invention's principles. It is assumed that the reference cell is the PCell, and the target cell is the SCell. The aggregation access point is assumed to be the eNodeB.

Figure 23:
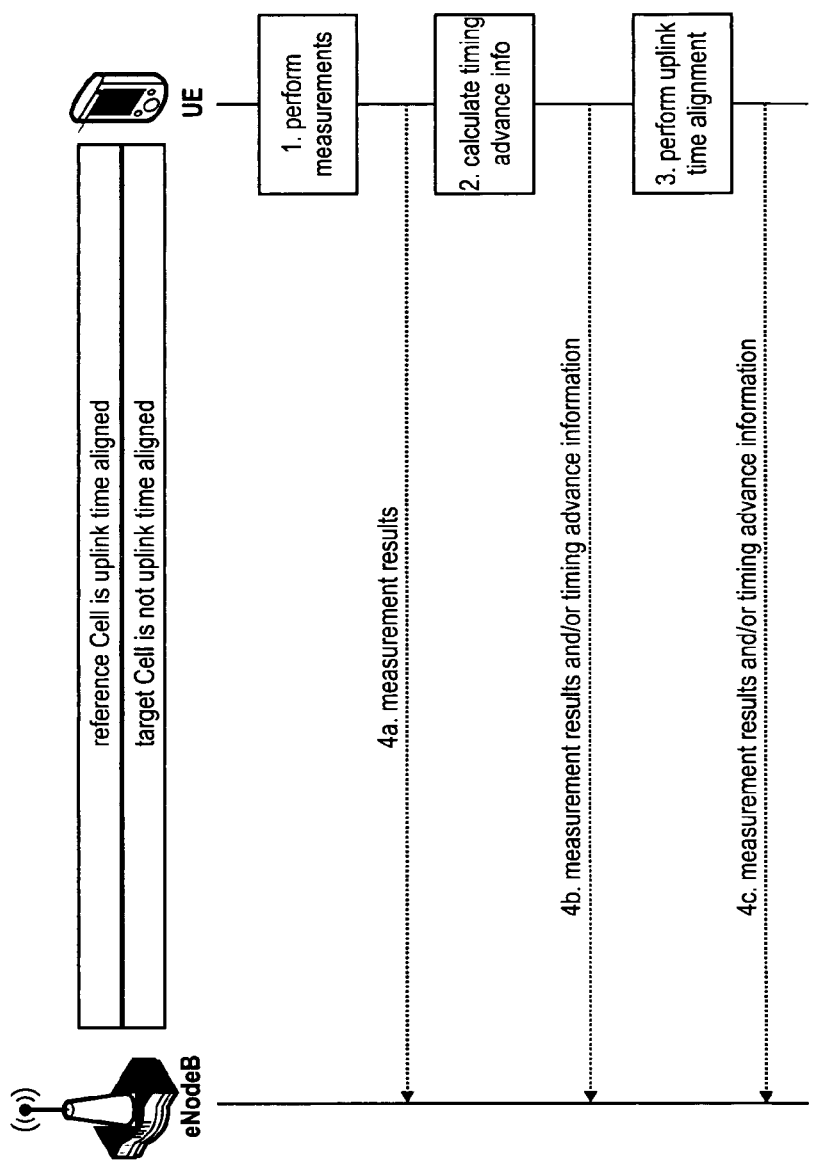
FIG. 23 is a signaling diagram illustrating an uplink-time-alignment procedure according to one embodiment of the invention.

FIG. 23 discloses a signaling diagram illustrating the various steps performed by the mobile terminal UE and the eNodeB, and the messages exchanged between them to allow the time-alignment procedure according to one embodiment of the invention.

The mobile terminal UE has configured a PCell over which it exchanges data with the eNodeB. The PCell of the mobile terminal UE is already time-aligned in the uplink, i.e. the uplink transmissions made by the mobile terminal UE over the PCell are performed by the mobile terminal UE at a timing such that their reception at the eNodeB is synchronized with the receptions of uplink transmissions of other mobile terminals UE on this cell. The PCell was uplink-time-aligned initially by performing a RACH procedure as explained in the background section, be it contention based or non-contention based (see FIGS. 7 and 8).

Though it seems less advantageous, it would be theoretically possible to initially synchronize the PCell using the principles of the present invention, assuming that the reference is an uplink-time-aligned SCell. The following description, however, assumes that the PCell is initially synchronized in the uplink using the RACH procedure, since the PCell will always be uplink synchronized for the case that the UE aggregates multiple serving cells, e.g. PUCCH is transmitted on PCell, and will have the "best" uplink-time-alignment (due to the RACH procedure being more accurate).

The mobile terminal UE is now configured with a Secondary Cell, SCell, which however is not yet time-aligned in the uplink. For instance, the SCell has just been configured, or the SCell, having been previously uplink-time-aligned, has lost its uplink synchronization (e.g. timing advance timer expires). In any case, the mobile terminal UE has now to achieve uplink time alignment in order to be able to transmit uplink data to the eNodeB through the SCell. The following steps are performed as exemplified by FIG. 23.

1. The mobile terminal UE performs measurements to determine specific timing information of transmissions/receptions in the PCell and/or SCell. There is various timing information which can be determined at the mobile terminal UE, as will be explained in detail further below. The timing information which the terminal measures is such that it allows the terminal to determine the timing advance for the SCell by considering the uplink time alignment of the PCell, which is already time-aligned and thus serves as a reference for the time-alignment of the SCell.

With regard to steps 4a, 4b or 4c, it is important to note that the information of the measurements, which may be transmitted to the eNodeB, is such that it isn't already known in the eNodeB, thus, relating to timings which are unknown in the eNodeB, such as to transmission and/or reception timing information of signal exchange performed on the PCell and/or SCell between the mobile terminal UE and the eNodeB.

2. The mobile terminal UE uses the information of the measurement to determine a timing advance for the SCell. The determination is based on the information of the measurement and on information referring to the uplink time alignment of the PCell. There are various possibilities how to achieve this, and the following description will discuss them in more detail.

This timing advance for the SCell will be preferably determined by the mobile terminal UE as an absolute value, i.e. similar to the initial timing advance value known from the standard, which is applied by the mobile terminal UE with respect to the time of arrival of a downlink transmission from the eNodeB on the SCell. Alternatively, the determined timing advance may also be relative to the timing advance used for the PCell, thus allowing the mobile terminal UE to apply the value with respect to the time of transmission of an uplink transmission by the mobile terminal UE to the eNodeB on the time-aligned PCell, or with respect to the time of arrival of a downlink transmission from the eNodeB on the PCell.

With regard to steps 4a, 4b or 4c, the timing advance determined by the mobile terminal UE for uplink transmissions on the SCell is also not known by the eNodeB except for the case when the mobile terminal UE performs a RACH procedure on the SCell or receives a TA command to be applied for uplink transmissions on the SCell.

In theory, the eNodeB could determine a timing advance by measuring a relative time difference between of uplink transmissions on the PCell and on the SCell, once uplink transmission are performed on the PCell and SCell. However, such measurements would require that UE is transmitting with the wrong timing advance on the SCell creating interference with other uplink transmissions on the same SCell. Such interference shall, in general, be avoided. Apart from the unbearable interference, the measurement would not be very precise. In other words, even though there exists a theoretical possibility for the eNodeB to measure a timing advance for use by the mobile terminal UE, the time difference measurements, in practice, do not allow for an exact determination of the timing advance on the SCell.

In contrast thereto, a time alignment based on a random access procedure avoid the interference with other uplink transmissions on the SCell. It should be noted that the RACH preamble has some specific characteristics as explained in the background section in order to allow some good detection at the eNodeB side.

In other words, even though there exists a theoretical possibility for the eNodeB to measure a timing advance for use by the mobile terminal UE, the time difference measurements, in practice, do not allow for an exact determination of the timing advance on the SCell.

However, with the mobile terminal providing the information of the measurements to the eNodeB (as in step 1), the eNodeB can calculate a timing advance for the SCell similar to that determined by the mobile terminal UE in step 2. It will be later explained that the transmitted information of the measurements and/or the timing advance for the SCell enable the eNodeB to controlling the time-aligning process in the SCell. For now it is important to note that the eNodeB can also determine a timing advance for the SCell similarly to the mobile terminal UE, namely based on the information of the measurement and on information referring to the uplink time alignment of the PCell.

3. Using the determined timing advance for the SCell, the mobile terminal UE can time-align the uplink transmission timing of the SCell. How exactly the uplink transmission timing is adjusted depends on the particular type of the determined timing advance. In case the determined timing advance information is an absolute value of the timing advance to be applied, the mobile terminal UE sets its uplink transmission timing relative to the beginning of the downlink subframes received over the SCell by the amount of time indicated in the timing advance information Alternatively, in case the timing advance is determined by the mobile terminal UE relative to the timing advance of the PCell, the mobile terminal UE sets its uplink transmission timing relative to the beginning of the uplink subframes transmitted over the time-aligned PCell by the amount of time indicated in the time advance information, or relative to a downlink transmission on the PCell.

Thus, the mobile terminal UE time-aligns its uplink of the SCell, and can then start transmitting scheduled uplink transmissions based on received uplink grant.

4a, 4b or 4c. The mobile terminal UE transmits the information on the measurement of step 1 and/or the timing advance of step 2 to the eNodeB to enable the eNodeB to better control the timing alignment of the SCell.

Transmitting information of the measurements and/or the determined timing advance is not necessarily performed after the mobile terminal UE applying the determined timing advance for time-aligning uplink transmission on the SCell (i.e. as step 4c). Alternatively, the mobile terminal UE may transmit the information on the measurement of step 1 to the eNodeB directly after the measurement thereof in step 1 (i.e. step 4a in FIG. 23) or after the determination step 2 (i.e. step 4b) or after time-alignment of the uplink transmissions on the SCell in step 3 (i.e. step 4c). According to another alternative, the mobile terminal may transmit the determined timing advance of step 2 to the eNodeB directly after the determination thereof in step 2 (i.e. step 4b in FIG. 23) or after time-aligning the uplink transmission on the SCell of step 3 (i.e. step 4c). In general the timing of the reporting of the timing measurements performed by the mobile terminal can be manifold as explained later: either periodically or event-triggered or requested by eNodeB.

As explained earlier, the eNodeB can also determine, based on the transmitted information of the measurement in step 4a, a similar timing advance for the SCell to that determined by the mobile terminal UE in step 2. With the eNodeB capable of converting between both transmitted information, the above described alternative may be considered equal alternatives with respect to the transmitted information.

There are various advantages provided by the present invention as explained above. First, a procedure is implemented to apply different timing advances on different component carriers, i.e. cells. Therefore, in situations where the propagation of the SCell is different to the PCell, the uplink timing can be adjusted for each cell separately when possible. Further, performing a random access procedure in the SCell may be avoided. Further, the prevention of RACH procedures circumvents several problems, such as complicated prioritization rules for the power limitation, or problems with the power amplifier.

Additionally, the uplink synchronization process for the present invention is faster compared to where a RACH procedure is performed. As will be shown later in detail this is, in particular, important for the activation of an uplink non time-aligned SCell. Furthermore, the transmission, to the eNodeB, of the information of the measurement and/or of a timing advance value for the SCell enables the eNodeB to track changes in the timing advance of the SCell and the eNodeB to control time aligning uplink transmissions on the SCell in the mobile communication system.

In the following a more specific embodiment of the invention will be explained with reference to FIGS. 24 and 25.

Figure 24:
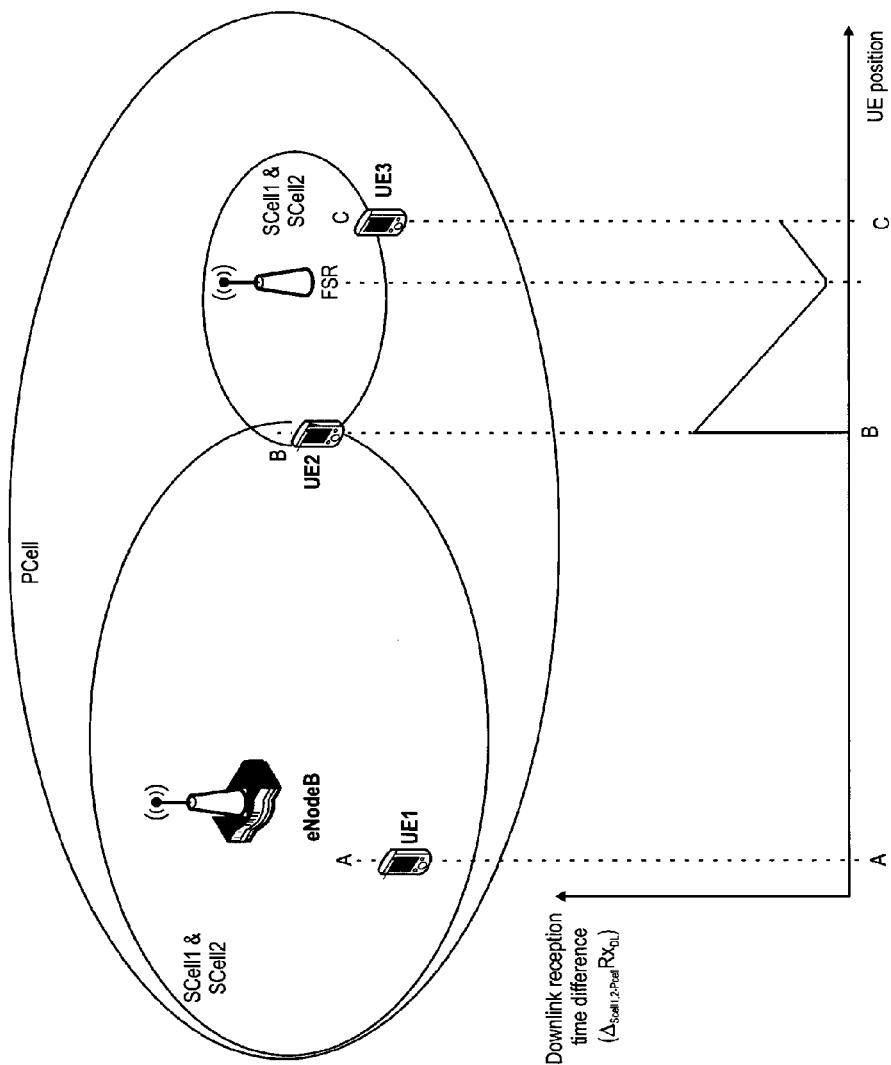
FIG. 24 presents the network scenario assumed for one particular embodiment of the invention.

FIG. 24 shows a scenario in which a PCell, SCell1 and SCell2 are served by the eNodeB to different UEs, namely UE1, UE2, UE3. A Frequency Selective Repeater (FSR) is provided, being configured for the frequencies used by SCell1 and SCell2, such that it amplifies signals transmitted/received on the secondary serving cells SCell1 and SCell2, however not those signals transmitted/received on the PCell. As illustrated by FIG. 24, the coverage of the PCell is greater than the one of the SCells.

In the lower part of FIG. 24 the downlink reception time difference at the mobile terminal between the SCells1 or 2 and the PCell ($\Delta_{SCell-PCell}Rx_{DL}$) is plotted against the position of a UE in the cell. The downlink reception time difference is the difference between the point in time when the UE receives a downlink subframe from the eNodeB over the SCell and a point in time when the UE receives a downlink subframe from the eNodeB over the PCell.

In this particular scenario, the need for different uplink timing advances for PCell, SCell1 and SCell2 changes depending on the location of the UE. In more detail, three UEs are depicted in FIG. 24; UE1 is located at A, within the coverage of PCell, SCell1 and SCell2; UE2 is located at B, at the overlapping area of the coverage for SCell1/SCell2 provided by the eNodeB and the coverage for SCell1/SCell2 provided by the FSR; UE3 is located at C, outside coverage for SCell1/SCell2 provided by eNodeB, but inside the coverage for SCell1/SCell2 provided by the FSR.

From location A to location B, the PCell, SCell1 and SCell2 are provided by the same transmission node, e.g. eNodeB to the UEs. Therefore, the propagation delays for the three cells should be substantially the same, and thus the downlink reception time difference should be negligible. As a result, the same timing advance can be used for the PCell, SCell1 and SCell2. On the other hand, at location B it is assumed that the signal for SCell1/SCell2 from FSR is stronger than the one for SCell1/SCell2 from eNodeB, and correspondingly, the UE2 at location B receives signals over PCell from the eNodeB and signals over SCell1/SCell2 from the FSR. Consequently, the propagation between PCell signals and SCell1/SCell2 signals is different, which results in different downlink reception timings between PCell and SCell1/SCell2. As apparent from the lower part of FIG. 24, the plotted downlink reception time difference measured by the UE2 between PCell and SCell1/SCell2 suddenly jumps to a particular value, at the moment when UE2 switches from one reception path (from eNodeB) to another (from FSR).

At location B the downlink reception time difference is at its maximum since the path length difference between the PCell path and the SCell1/SCell2 path is at its maximum too in this exemplary scenario. The downlink reception time difference decreases as the UE moves further towards the FSR, and is minimum directly at the FSR, the downlink reception time difference mainly being the time of the FSR for receiving, processing and transmitting the amplified signal for SCell1/SCell2. When moving away again from the FSR, the downlink reception time difference increases again.

Accordingly, UE2 and UE3 cannot use the same timing advance for SCell1/SCell2 as used for the PCell, but would have to configure separate uplink timing advances for them. However, the same timing advance could be used for SCell1 and SCell2, since in the present scenario the propagation delays for SCell1 and SCell2 are the same.

One of the main ideas of the invention is to determine the timing advance for the SCell relative to the uplink timing of the uplink-time-aligned PCell. In particular, the timing advance used by UE3 to synchronize the uplink transmissions in the SCell is defined in relation to the uplink timing of the uplink-time-aligned PCell. The following timing relations apply for a timing advance for the SCell, $TA_{SCell}$, in relation to the timing advance of the PCell, $TA_{PCell}$, and other parameters.

$$TA_{PCell} = PD_{UL\_PCell} + PD_{DL\_PCell} \quad \text{(equation 7)}$$

$$\begin{aligned}TA_{SCell} &= PD_{UL\_SCell} + PD_{DL\_SCell} \\ &= PD_{UL\_PCell} + PD_{DL\_PCell} + (\Delta_{SCell-PCell}PD_{DL} + \Delta_{SCell-PCell}PD_{UL}) \\ &= TA_{PCell} + (\Delta_{SCell-PCell}PD_{DL} + \Delta_{SCell-PCell}PD_{UL})\end{aligned}$$

wherein $\Delta_{SCell-PCell}PD_{DL}$ is the difference between the propagation delays in the downlink of the PCell and the SCell; and wherein $\Delta_{SCell-PCell}PD_{UL}$ is the difference between the propagation delays in the uplink of the PCell and the SCell.

The following substitution:

$$\Delta_{SCell-PCell}PD_{UL} = \Delta_{SCell-PCell}PD_{DL} + \Delta_{SCell}PD_{UL-DL} \quad \text{(equation 8)}$$

where $\Delta_{SCell}PD_{UL-DL}$ is the difference between the propagation delays of the uplink and downlink for the SCell, leads to the equation:

$$TA_{SCell} = TA_{PCell} + 2 \cdot \Delta_{SCell-PCell}PD_{DL} - \Delta_{SCell}PD_{UL-DL} \quad \text{(equation 9)}$$

The following substitution:

$$\Delta_{SCell-PCell}PD_{DL} = \Delta_{SCell-PCell}Rx_{DL} - \Delta_{SCell-PCell}Tx_{DL} \quad \text{(equation 10)}$$

where $\Delta_{SCell-PCell}Tx_{DL}$ is the downlink reception time difference between the PCell and the SCell, i.e. the difference in time between the reception in the UE3 of a downlink transmission from the eNodeB on the PCell and the reception in the UE3 of a downlink transmission from the eNodeB on the SCell, and where $\Delta_{SCell-PCell}Tx_{DL}$ is the downlink transmission time difference between the PCell and the SCell, i.e. the difference in time between the transmission in the eNodeB of a downlink transmission to UE3 on the PCell and the transmission in the eNodeB of a downlink transmission to UE3 on the SCell, leads to the equation:

$$\begin{aligned}TA_{SCell} &= TA_{PCell} + 2 \cdot (\Delta_{SCell-PCell}Rx_{DL} - \Delta_{SCell-PCell}Tx_{DL}) - \Delta_{SCell}PD_{UL-DL} &\text{(equation 11)} \\ &= TA_{PCell} + 2 \cdot \Delta_{SCell-PCell}Rx_{DL} - 2 \cdot \Delta_{SCell-PCell}Tx_{DL} - \Delta_{SCell}PD_{UL-DL} &\text{(equation 12)}\end{aligned}$$

Put differently, the timing advance of the SCell can be calculated based on:
- the timing advance of the PCell
- the downlink reception time difference between the PCell and the SCell
- the downlink transmission time difference between the PCell and the SCell
- the propagation delay difference between the uplink and the downlink on the SCell The timing advance of the PCell is basically both known to the eNodeB and UE3.

The downlink reception time difference between the PCell and the SCell ($\Delta_{SCell-PCell}Rx_{DL}$) is not known in the eNodeB, but can be measured at UE side.

Figure 26:
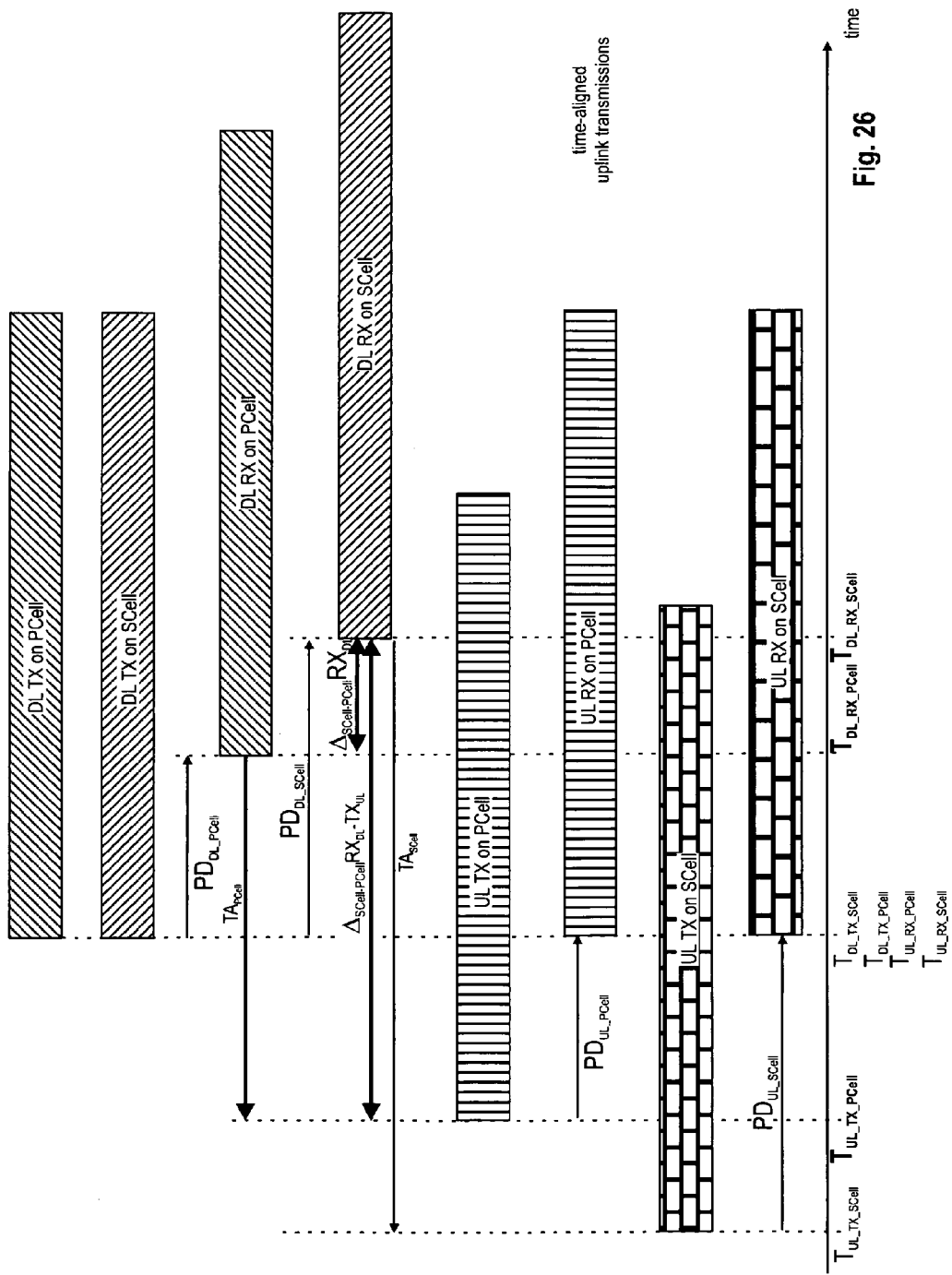
FIG. 26 shows a timing diagram of transmissions exchanged between the UE and the eNodeB, including uplink-time-aligned uplink transmission according to one embodiment of the invention.
Figure 27:
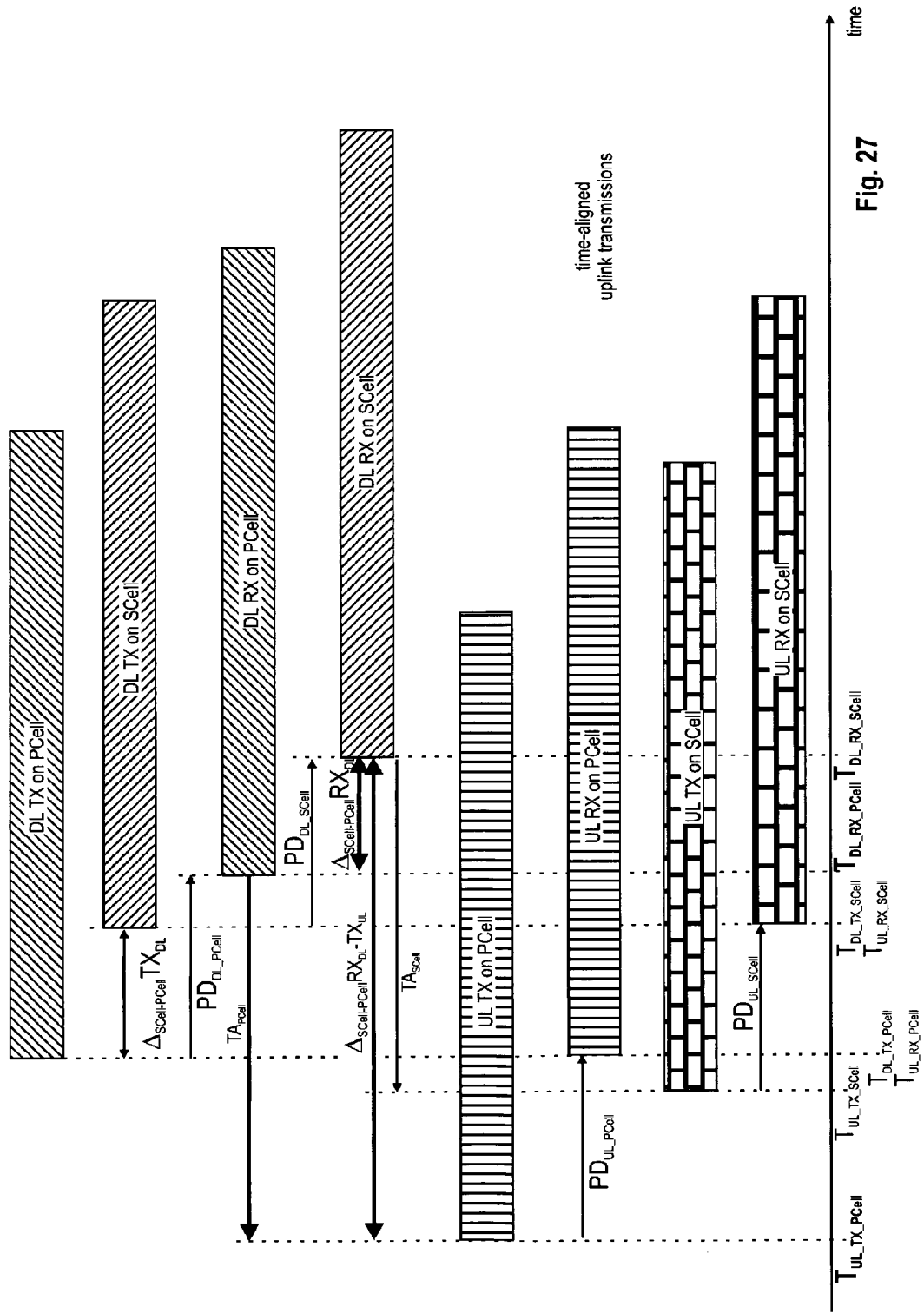
FIG. 27 shows a timing diagram of transmissions exchanged between the UE and the eNodeB, including uplink-time-aligned uplink transmissions according to another embodiment of the invention, wherein the PCell and SCell downlink transmission are time-delayed.

The downlink transmission time difference between the PCell and the SCell $\Delta_{SCell-PCell}Tx_{DL}$ is known only by the eNodeB, however not to UE3, as will become more clear in connection with FIG. 27. In the particular embodiment of FIG. 26, the downlink transmission time difference between the PCell and the SCell ($\Delta_{SCell-PCell}Tx_{DL}$) is zero; for the embodiment of FIG. 27 explained later the downlink transmission time difference between the PCell and the SCell ($\Delta_{SCell-PCell}Tx_{DL}$) is not zero.

In relation to the examples of FIGS. 15, 16 and 17, the definition of the timing advance $TA_{SCell}$ of equation 11 and equation 12 additionally considers the downlink transmission time difference between the PCell and the SCell ($\Delta_{SCell-PCell}Tx_{DL}$) and the propagation delay difference between the uplink and the downlink on the SCell ($\Delta_{SCell}PD_{UL-DL}$) and is, hence, more precise. In other words, in a mobile communication system configured to operate without a transmission time difference between the PCell and the SCell ($\Delta_{SCell-PCell}Tx_{DL}=0$) and without a propagation delay difference between the uplink and the downlink on the SCell ($\Delta_{SCell}PD_{UL-DL}=0$), as considered with respect to FIG. 26, the equation 12 corresponds to that of the examples of FIGS. 15, 16 and 17.

The propagation delay difference between the uplink and the downlink of a serving cell, SCell, is assumed to be negligible for the purposes of the invention. More specifically, it is assumed that the propagation delay for the uplink and downlink direction is the same for each carrier. Simulation done by 3GPP WG RAN4 provided results of the simulated propagation delay differences for inter-band carrier aggregation case which show that for the same reception node (i.e. the eNodeB), propagation timing difference will be less than one TA step (~0.5 us) in 97~98% case and less than five TA steps in 100% case. Following this for the SIB-2 linked DL and UL carrier pairs, where the frequency gap between uplink and downlink will be even smaller than that between different frequency bands, resulting in that the propagation timing difference between the UL direction and the DL direction for a given cell will be even less and, hence, negligible for the present invention.

Assuming the above and considering that the mobile terminal UE shall calculate a timing advance of the SCell, the mobile terminal UE may approximate the timing advance for uplink transmissions on the SCell, as defined by equation 13 below, namely based on the timing advance of the PCell ($TA_{PCell}$) and the downlink reception time difference between the PCell and the SCell ($\Delta_{SCell-PCell}Rx_{DL}$). In case of a mobile communication system as exemplified in FIG. 27 having different uplink timing advances for PCell and SCell1/SCell2, it has to be noted that the, by the mobile terminal, determined timing advance only approximates an accurate timing advance for the SCell1/SCell2.

In future releases, a mobile terminal UE may perform uplink transmissions to plural different eNodeBs at a same time i.e. cooperative multi-point (COMP) transmissions in the uplink. Since two different eNodeBs are not required to use a same downlink timing, the transmission time difference between a first eNodeB1 providing a PCell and a second eNodeB2 providing a SCell ($\Delta_{SCell-PCell}Tx_{DL}$) needs to be considered when time aligning uplink transmissions on an SCell. Without this value, a mobile terminal can also only approximate the timing advance for uplink transmissions on the SCell Consequently, based on the information of measurements performed by the mobile terminal and/or the uplink time alignment for the SCell determined by the mobile terminal, only the eNodeB can ensure an accurate time alignment of uplink transmissions performed by the mobile terminal on the SCell. In other words, transmitting this timing information by the mobile terminal to the eNodeB enables the eNodeB to accurately control the time alignment process for an SCell at the mobile terminal, e.g. in case of cooperative multi-point (COMP) transmissions.

Resulting from the above considerations, a more detailed embodiment of the invention for uplink-time-alignment of SCell for UE3 will be presented below with reference to FIG. 25.

Figure 25:
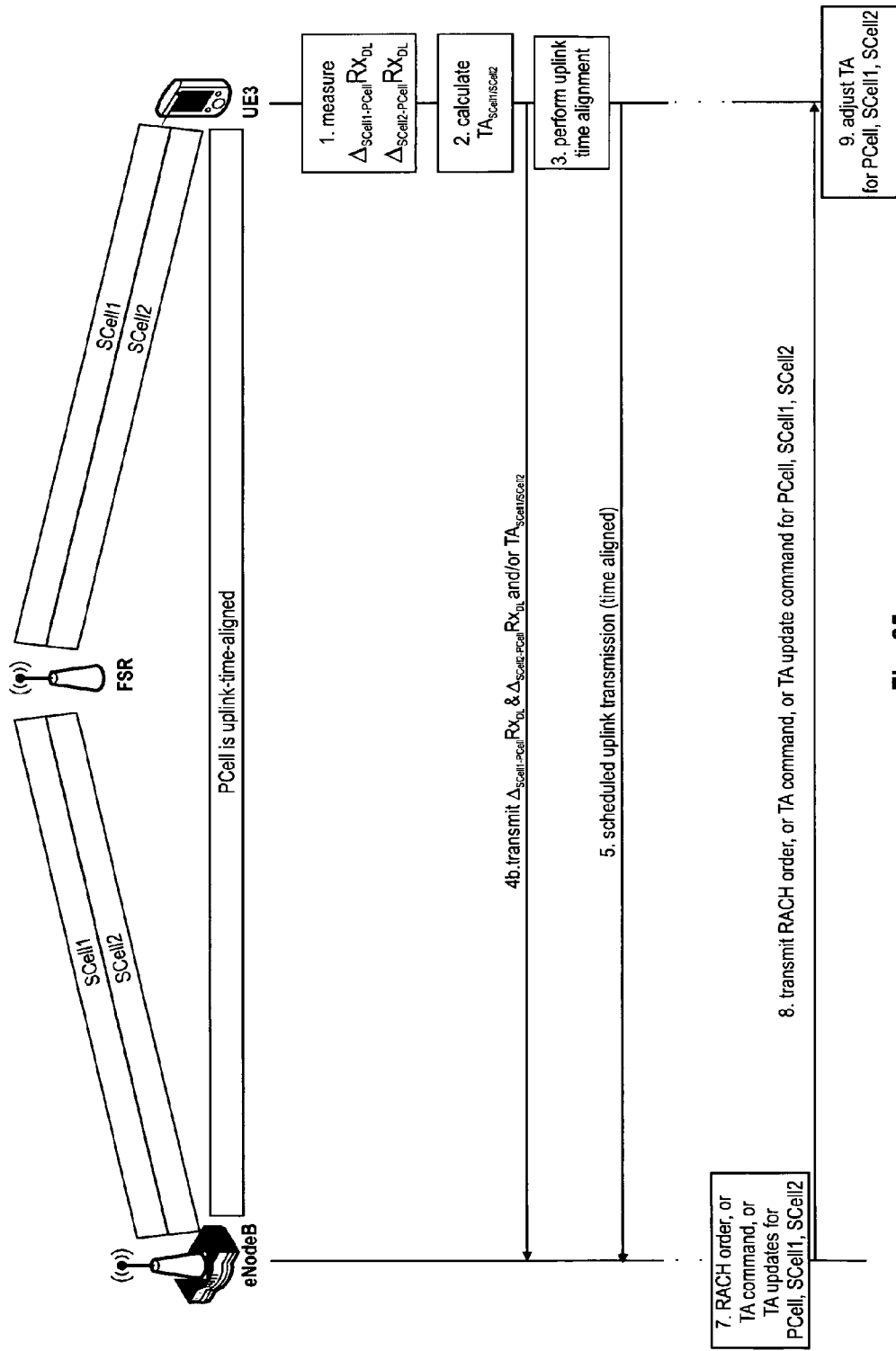
FIG. 25 shows a signaling diagram illustrating an uplink-time-alignment procedure according to another embodiment of the invention.

In step 1 of FIG. 25, the UE3 measures the downlink reception time difference $\Delta_{SCell\text{-}PCell}Rx_{DL}$ and in particular the time difference between the time when the UE3 receives the start of one subframe from the PCell and the time when the UE3 receives the corresponding start of one subframe from the SCell that is closest in time to the subframe received from the PCell. Correspondingly, UE3 performs the measurements for each of the two SCells, resulting in $\Delta_{SCell\text{-}PCell}Rx_{DL}$ and $\Delta_{SCell2\text{-}PCell}Rx_{DL}$. In the present scenario the downlink reception time difference will be substantially the same for SCell1 and SCell2. The downlink reception time difference for one SCell can be seen in FIG. 26.

In step 2, the UE3 uses the measurements results to calculate the timing advance for the SCells. Since the downlink reception time difference is the same for both SCells, the UE3 will only calculate one timing advance that may be used by the UE3 to uplink-time-align both SCells. Considering the assumptions of the present embodiment, equation 12 discussed above can be written in a simplified manner as:

$$TA_{SCell} = TA_{PCell} + 2 \cdot \Delta_{SCell\text{-}PCell}Rx_{DL} \quad \text{(equation 13)}$$

since both $\Delta_{SCell\text{-}PCell}Tx_{DL}$ and $\Delta_{SCell}PD_{UL\text{-}Dl}$ may be considered zero.

The mobile terminal thus uses the received downlink reception time difference(s) $\Delta_{SCell1\text{-}PCell}Rx_{DL}/\Delta_{SCell}Rx_{DL}$ and the known time advance for the PCell to calculate the time advance for the SCell1 and SCell2 $TA_{SCell1/SCell2}$ according to equation 13.

In step 4b of FIG. 25, the UE3 transmits the results of the measurements, i.e. the downlink reception time difference $\Delta_{SCell1\text{-}PCell}Rx_{DL}$ and/or $\Delta_{SCell2\text{-}PCell}Rx_{DL}$ and/or the calculated timing advances for the SCells $TA_{SCell1/SCell2}$ to the eNodeB, preferably by using the PUSCH of the PCell. Alternatively, since both downlink reception time differences are the same, the UE3 may transmit only one of the two measurements and/or one of the calculated timing advances.

In step 3, the UE3 applies the calculated timing advance $TA_{SCell1/SCell2}$ relative to the beginning of the downlink radio frame of the SCell1 and SCell2, similar to the way in which a standard initial timing advance is applied by a UE.

In this way, the UE3 can uplink-time-align the SCell1 and SCell2, and start uplink transmissions thereon according to received uplink scheduling grants. The first uplink grant is usually part of the RAR message within the standard RACH procedure. Since in the invention no RACH procedure is performed on an SCell, the first uplink grant for the SCells can be transmitted at any time in any way to the UE3 via the PDCCH.

The UE3 uses an uplink grant on SCell1 and SCell2 to transmit an uplink transmission to the eNodeB. This is illustrated in FIG. 25 for one SCell. The UE3 sets the time of transmission of an uplink radio frame for the SCell $T_{UL\_TX\_SCell}$ relative to the time of reception of a downlink radio frame for the SCell $T_{DL\_RX\_SCell}$, by "shifting" by the timing advance value $T_{SCell1/SCell2}$.

Such a time-aligned uplink transmission on the SCell is received at $T_{UL\_RX\_SCell}$ in the eNodeB, after the propagation delay $PD_{UL\_SCell}$.

Having received in step 4b from the UE3 information on the downlink reception time difference $\Delta_{SCell1\text{-}PCell}Rx_{DL}$ and/or $\Delta_{SCell2\text{-}PCell1}Rx_{DL}$ and/or the calculated timing advances for the SCells $TA_{SCell1/SCell2}$, the eNodeB is enabled to control time alignment of uplink transmissions on the SCells (step 7).

In particular, as described before, the UE3 transmits the downlink reception time difference and/or the calculated timing advance to the eNodeB and provides the eNodeB with information it cannot measure or derive by itself. Based on the received information on the downlink reception time difference $\Delta_{SCell1\text{-}PCell}Rx_{DL}$ and/or $\Delta_{SCell2\text{-}PCell}Rx_{DL}$ and/or the calculated timing advances for the SCells $TA_{SCell1/SCell2}$, the eNodeB can determine if the time advance to be used with the SCells allows for accurately time aligned uplink transmissions by the UE3 on the SCells.

Exemplary, for determining if the received timing advances for the SCells $TA_{SCell1/SCell2}$ (which is calculated by the UE3 in step 2) allows for a sufficient time alignment of uplink transmission on the SCells, the eNodeB can compare the received value with a timing advance value for the SCells it determines based on the three values: the timing advance of the PCell, the downlink reception time difference between the PCell and the SCell and the downlink transmission time difference between the PCell and the SCell according to equation 12. In case the difference between the received and the determined timing advance for an SCell is larger than a threshold, the eNodeB determines that the timing advance to be used with the SCells does not allow for accurately time aligned uplink transmissions by the UE3 on the SCells.

This exemplary determination of whether the timing advance calculated by the UE3 is sufficient for time aligning uplink transmissions on the SCell can be made before actual uplink transmissions are performed by the UE3 on the SCell.

Alternatively, for determining if the received timing advances for the SCells $TA_{SCell1/SCell2}$ (which is calculated by the UE3 in step 2) allows for an accurate time alignment of uplink transmission on the SCells, the eNodeB can determine, based on its knowledge of the deployment of the radio cells of the mobile communication system, if the by the UE3 measured downlink reception time difference between the PCell and the SCell appears correct or not, and based on a threshold distinguish if the received timing advance is sufficient for time aligning uplink transmissions by the UE3 on the SCells. This determination of whether the timing advance calculated by the UE3 is sufficient for time aligning uplink transmissions on the SCell can also in this case be made before actual uplink transmissions are performed by the UE3 on the SCell.

Furthermore, other exemplary implementations for the eNodeB to determine whether the timing advance calculated by the UE3 is sufficient for time aligning uplink transmissions on the SCells depend on the mobile terminal performing actual uplink transmission on the SCells having applied the calculated timing advance for the SCells $TA_{SCell1/SCell2}$ (of step 2). In case of uplink transmissions by the mobile terminal on the SCells, the eNodeB may compare a reception time of uplink transmissions on the uplink of the SCells with a predefined reference time for uplink transmission on the uplink of the SCells, or compare a reception time of uplink transmissions on the uplink of the SCells with a transmission time of downlink transmissions on the corresponding downlink of the SCells.

In case the eNodeB determines in step 7, that the calculated timing advance for the SCells $TA_{SCell/SCell2}$ does not allow for accurately time-aligned uplink transmissions by the UE3, the eNodeB transmits in step 8 information, instructing the UE3, that the calculated and transmitted timing advance $TA_{SCell1/SCell2}$ cannot be used by the UE3 for time aligning the uplink transmissions on the SCells i.e. that it does not allow for accurately time-aligned uplink transmissions on the SCells.

According to one example, the information may include a RACH order triggering the mobile terminal, upon reception of the RACH order message, to perform a random access procedure on at least one of the SCells (step 9). As part of the random access procedure, the UE3 receives an accurate timing advance for the SCell(s) and time-aligns the SCell(s) by adjusting a timing for uplink transmissions on the uplink target cell based on the received timing advance within the random access procedure.

According to another example, the information may include a timing advance command with a timing advance for use with the SCell triggering the mobile terminal, upon reception of the timing advance, to time-align the uplink SCell(s) by adjusting a timing for uplink transmissions on the uplink target cell based on the received timing advance (step 9).

According to further example, the information may include a timing advance update command triggering the mobile terminal, upon reception of the timing advance update command, to determine a timing advance for use with the uplink of the SCell(s) based on the included target timing advance update value and on the timing advance used for uplink transmissions on the uplink of the SCell(s), and the SCell(s) by adjusting a timing for uplink transmissions on the uplink target cell based on the determined timing advance (step 9).

FIG. 27 illustrates a timing diagram according to another embodiment of the invention. Compared to the timing diagram of FIG. 26, the difference is that the PCell and the SCell perform a downlink transmission at different times, i.e. the downlink subframe timing is not synchronized between Pcell and SCell. Furthermore, it is assumed that the SCell1 and SCell2 have the same downlink transmission timing. In other words, there is a downlink transmission time difference between the PCell and the SCell $\Delta_{SCell\text{-}PCell}Tx_{DL}$ which is not zero but is the same for SCell1 and SCell2.

The uplink-time-alignment procedure, explained before in connection with FIG. 25, can be similarly applied to the scenario exemplified in FIG. 27, considering the following changes in procedure.

The UE3 can measure the downlink reception time differences $\Delta_{SCell1\text{-}PCell}Rx_{DL}$ and/or $\Delta_{SCell2\text{-}PCell}Rx_{DL}$, which are the same for SCell1 and SCell2 (step 1 in FIG. 25). It should be noted that the downlink reception time difference not only considers the propagation delay differences between PCell and SCell (as in FIG. 26), but in this case also the downlink transmission time difference $\Delta_{SCell\text{-}PCell}Tx_{DL}$.

In this particular embodiment of the invention, the measured downlink reception time difference $\Delta_{SCell\text{-}PCell}Rx_{DL}$ is longer than the difference of the propagation delays between PCell and SCell, i.e. longer by the downlink transmission time difference between the PCell and the SCell $\Delta_{SCell\text{-}PCell}Tx_{DL}$.

However, since the downlink transmission time difference between the PCell and the SCell $\Delta_{SCell\text{-}PCell}Tx_{DL}$ is unknown, i.e. transparent, to the UE3, it will calculate timing advance for uplink transmissions on the SCell based on equation 13 (step 2 in FIG. 25). In particular, the UE3 will assume that the timing advance can be determined based on the timing advance of the PCell ($TA_{PCell}$) and the downlink reception time difference between the PCell and the SCell ($\Delta_{SCell\text{-}PCell}Rx_{DL}$).

Exemplary, the UE3 then transmits the results of the measurements, i.e. the downlink reception time difference $\Delta_{SCell\text{-}PCell}Rx_{DL}$ and/or the calculated timing advances for the SCell $TA_{SCell}$ to the eNodeB, preferably by using the PUSCH of the PCell (step 4a in FIG. 25).

Receiving this value, the eNodeB can compare by subtraction the value with a timing advance value for the SCell it determines based on the three values: the timing advance of the PCell, the downlink reception time difference between the PCell and the SCell and the downlink transmission time difference between the PCell and the SCell. Since the, from the UE3 received value does not account for the downlink transmission time difference between the PCell and the SCell ($\Delta_{SCell\text{-}PCell}Tx_{DL}$), the difference is larger than a threshold.

Hence, the eNodeB can determine that the by the UE3 calculated timing advance for use with the SCells does not allow for accurately time-aligned uplink transmissions on the SCells (step 7 in FIG. 25) and then uses the following equation 14 for alignment of uplink transmissions by the UE3 on the SCells. Namely, only $\Delta_{SCell}PD_{UL\text{-}DL}$ is set to zero for the reasons explained before.

$$TA_{SCell} = TA_{PCell} + 2 \cdot \Delta_{SCell\text{-}PCell}Rx_{DL} - 2 \cdot \Delta_{SCell\text{-}PCell}Tx_{DL} \qquad \text{(equation 14)}$$

Exemplary, the eNodeB transmits the determined timing advance $TA_{SCell}$ to the UE3 according to step 8, illustrated in FIG. 25. Accordingly, the UE3 uses the received timing advance value $TA_{SCell}$ for time aligning the uplink transmissions on the SCell1 and SCell2 with respect to the beginning of the downlink radio frames on the respective SCell1 and SCell2 (step 9 in FIG. 25). Alternatively, the eNodeB transmits a RACH order or a timing advance update command as explained earlier.

It should be noted that even though the eNodeB knows the timing advance used by the UE for uplink transmission on PCell, the UE autonomous change of the uplink timing according to TS36.133 section 7.1.2 causes some deviation from the timing advance value of the PCell signalled by the eNodeB to the UE, except only just after the PRACH transmission took place. Therefore, according to another alternative embodiment the UE also reports the used difference between DL radio frames received on the PCell and UL radio frames transmitted on the PCell to the eNodeB in addition to the downlink reception time difference measurements.

Figure 28:
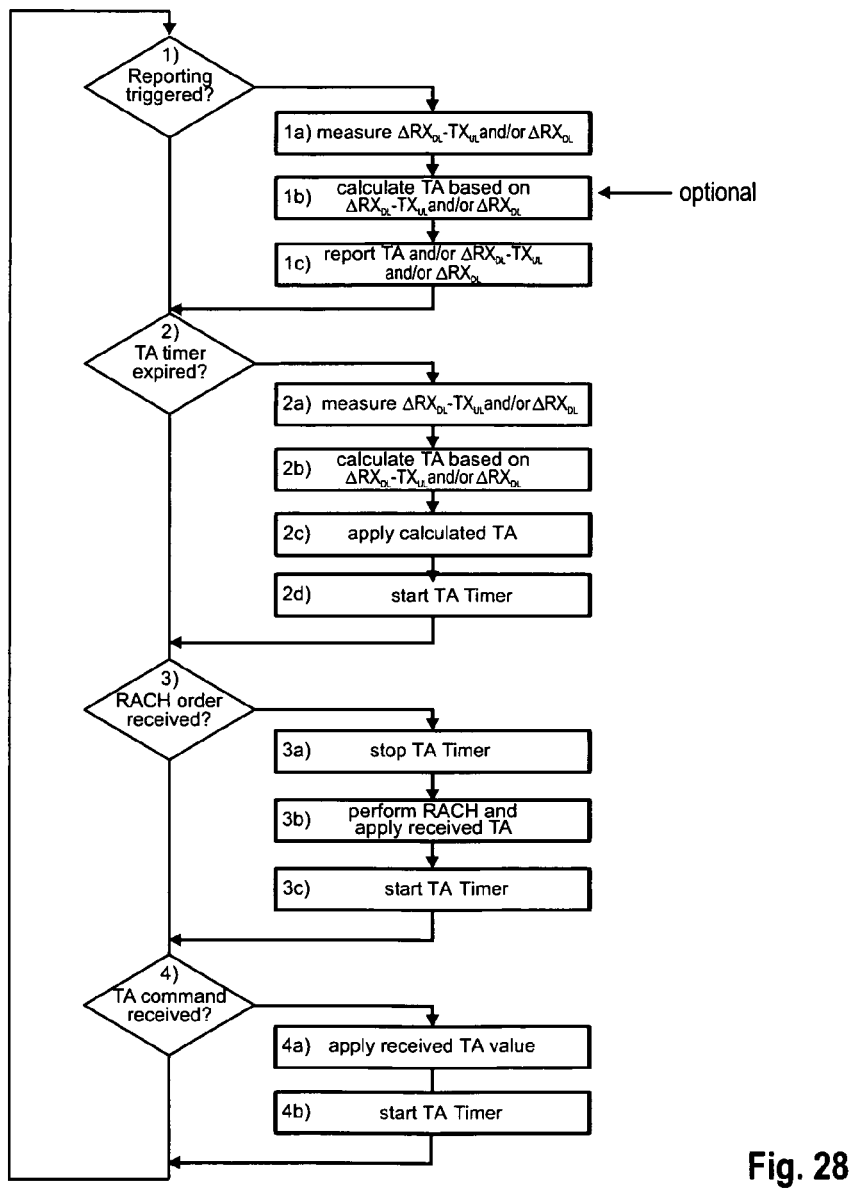
FIG. 28 is a flowchart diagram illustrating an uplink-time-alignment procedure according to a further embodiment of the invention.

FIG. 28 discloses a flowchart diagram illustrating the various steps performed by the mobile terminal UE to allow for time-aligned uplink transmissions in line with the time-alignment procedure according to an exemplary embodiment of the invention.

It should be noted that in the time-alignment procedure according to this exemplary embodiment of the invention, the eNodeB respectively aggregation access point is the node that controls the uplink timing used by the mobile terminal for transmission on the uplink of the cells. Even though the mobile terminal may calculate autonomously the timing advance for a target cell (e.g. SCell or group of SCells), the aggregation access point can at any time override this self-calculated timing advance and direct the mobile terminal to use another timing advance that has been determined and signalled by the aggregation access point. The mobile terminal will in this case use the timing advance signalled from the aggregation access point. Put in other words, the timing advance signalled by the aggregation access point takes precedence over the timing advance calculated autonomously by the mobile terminal.

In the following, variants and additional steps for the above-described embodiments will be presented with reference to FIG. 28.

Triggering of the Step of Reporting by the UE

In the previous embodiments it has been left open when the UE starts the measurements (step 1a) and the reporting of the measurement results and/or of the calculated timing advance (step 1c). Measurements may be for example performed periodically.

The reporting/signalling can be performed either periodically or event-triggered.

For instance, in step 1) in FIG. 28 the periodical triggering of the reporting may be similar to mobility or power headroom or buffer status report reporting. The advantage of periodical reports is that the eNodeB gets with a certain frequency up-to-date information on the measurement results and/or the calculated timing advance. The eNodeB is thus enabled at periodical intervals to determine if the, by the UE calculated timing advance is sufficient for time alignment of uplink transmissions on the SCell, and thus can continuously control the timing advance of the UE when necessary.

Event-triggered reporting is in step 1) in FIG. 28, however, beneficial too and may be necessary in order to allow the eNodeB to react quickly so as to prevent from e.g. interference due to wrong uplink time alignment. Some events are described in the following.

The configuration of an SCell can be used as a trigger for the UE to start reporting (step 1c) of the measurement results and/or of the calculated timing advance to the eNodeB (step 1b is optional). The measurement and reporting is done according to one exemplary embodiment for configured and deactivated Scell(s). Providing the measurement results and/or of the calculated timing advance to the eNodeB everytime a new SCell is configured, has additional benefits (step 1c).

In more detail, the eNodeB is given the opportunity to check whether a different timing advance (multi-TA) is required for the newly configured SCell. Furthermore and in response thereto, the eNodeB can optionally calculate an accurate timing advance for the UE to be used with the SCell and optionally signal it to the UE (step 4 in FIG. 28). In other words, even though the SCell is deactivated (i.e. not used for transmission), the UE already knows which timing advance to use for this SCell.

Thus, when the SCell is activated, the UE can immediately apply the previously-received timing advance for the SCell, and already transmit with the correct uplink time alignment (step 4a). Therefore, the activation of an SCell would be faster, for example, when compared to the approach where RACH needs to be performed on a newly activated SCell so as to achieve uplink synchronization. Essentially, the activation delay for an SCell, when using the present invention, would be the same as for Rel-10, where SCells have the same timing advance as the PCell.

Alternatively, the activation of an SCell can be used as a trigger by the UE to start measurements (step 1a) and reporting (step 1c) of the measurement results and/or of the calculated timing advance (step 1b is optional). The advantage of using the activation as a trigger is that, when the eNodeB activates an SCell it also intends to schedule transmissions on the SCell. In order to determine the correct timing advance used for the uplink transmissions on the activated SCell, it is beneficial to provide the eNodeB with up-to-date measurement results and/or of the calculated timing advance.

Another option to be used as trigger is that the mobile terminal receives from the eNodeB a specific request to report the measurement results and/or of the calculated timing advance to the eNodeB. This would allow the eNodeB to decide case-by-case whether the reporting of the measurement results and/or of the calculated timing advance is necessary or not.

There are several possibilities how to transmit this request from the eNodeB to the mobile terminal. For instance, a flag within the RRC messages which configure the SCell, e.g. RRC connection reconfiguration message, could explicitly request for measurement result reporting.

Or, the activation/deactivation command (MAC CE) as illustrated in FIG. 29 could contain a flag which explicitly indicates the need for timing info reporting, i.e. the eNodeB explicitly request the mobile terminal to report the measurement results and/or of the calculated timing advance.

The flag could be signalled by using the free "reserved bit" in the activation/deactivation MAC control element. Since the activation of an already activated SCell is supported (also referred to as reactivation), the activation/deactivation MAC control element could be sent by the eNodeB at any time for requesting reporting of measurement results, without the need to actually activate or deactivate any of the SCells.

Another possibility would be to re-use the so-called "RACH order" message corresponding to the message 801 in FIG. 8, which is a physical layer signalling (PDCCH with DCI format 1A). Some predefined codepoints or combination of field codepoints within a RACH order for an SCell could be used as a request for reporting. For example, a RACH order for an SCell with ra-PreambelIndex set to "000000" (i.e. normally indicating that the UE should make a contention-based RACH) could be redefined to request the reporting. Or, a predefined carrier indicator (CI) codepoint for the case of cross-scheduling can be used as request. The advantage would be that the uplink resource allocation where the mobile terminal shall transmit the measurement results and/or of the calculated timing advance can be sent together with the request for measuring and/or reporting, hence reducing the reporting delay.

Another trigger event for reporting (step 1c) the measurement results and/or of the calculated timing advance (step 1b optional) could be that the measurement results performed in connection with the uplink-time-alignment of the SCell exceed a certain preconfigured threshold.

Such a reporting by the UE is especially beneficial in cases where the eNodeB is not aware of the necessity of using a timing advance for the SCell different to the one of the PCell. The eNodeB may not always have sufficient knowledge from e.g. an OAM (Operation, Administration and Maintenance usually providing cell deployment info like presence of repeaters or RRHs).

Also, the need for multi-timing-advance depends on the position of the UE (see FIG. 26 and corresponding description). Thus, e.g. a frequency-selective repeater may be transparent to the eNodeB, and is only made visible to the eNodeB by the UE reporting on a high downlink reception time difference. Or even if the eNodeB is aware of the FSR, it does not know when exactly the UE will receive the SCell not anymore from the eNodeB but via the FSR.

Triggering of the Step of Time-Aligning by the UE

Similarly to the previous embodiments, the mobile terminal UE as illustrated in FIG. 28 measures (step 2a) the downlink reception time difference $\Delta_{SCell\text{-}PCell}Rx_{DL}$ between the SCell and PCell and calculates (step 2b) a timing advance $TA_{SCell}$ for uplink transmissions on the SCell based on the reception time difference $\Delta_{SCell\text{-}PCell}Rx_{DL}$ between the SCell and PCell and the timing advance used for uplink transmissions on the PCell. Then, the mobile terminal UE time-aligns (step 2c) uplink transmissions on the SCell based on the calculated timing advance for the uplink SCell.

However, in the previous embodiments, it has always been left open when the UE time-aligns uplink transmission on the SCell and how the timing-alignment is updated for the SCell over time.

The time-alignment for the SCell can be performed either periodically or event-triggered. In particular, an event-triggered time-alignment procedure is advantageous with respect to an initial time-alignment of uplink transmissions of an SCell. Periodically triggered time-alignment ensures that the uplink-transmissions performed by the mobile terminal UE remain time-aligned even at times when the timing advance of the SCell is not controlled by the eNodeB.

For an event-triggered timing-alignment of uplink-transmissions on the SCell, the same trigger mechanisms as described with respect to event-triggered reporting can be used. In particular, the UE may be configured to use the configuration of an SCell as a trigger for starting the timing-alignment procedure of the SCell. Alternatively, the activation of an SCell can be used as a trigger by the UE for starting the timing-alignment procedure of the SCell. Another alternative for triggering the timing-alignment procedure of the SCell is when the mobile terminal UE receives from the eNodeB a specific message requesting the start of the time-alignment procedure of the SCell.

Due to the similarities between the measurements for reporting (step 1a) and the measurements for time-alignment (step 2a) and the similarities between the calculation of the timing advance for reporting (step 1b) and the calculation of the timing advance for time-alignment (step 2b), the mobile terminal may, according to another exemplary implementation, simultaneously perform the steps for reporting of the measurements results and/or the calculated timing advance for the SCell (step 1c) and the steps for time-aligning uplink transmissions on the SCell (step 2c) and, hence, would only require one event-trigger.

A periodically performed time-alignment procedure is exemplified in FIG. 28.

In FIG. 28, the mobile terminal UE ensures that uplink transmissions remain time-aligned by means of a timer. A separated timer may be maintained by the mobile terminal for each timing advance value (each associated to either an individual uplink cell or a group of uplink cells).

The mobile terminal resets and starts the timer each time it (i) applies a calculated timing advance (step 2d) or (ii) performs a RACH procedure (step 3c) or (iii) applies a received timing advance value for uplink transmissions on the respective PCell or SCell for which the timer is maintained. In this respect, as long as the timer is running, the mobile terminal UE considers itself as being uplink synchronized.

Whenever the timer expires (step 2), i.e. timing alignment is considered to be lost, the mobile terminal uses the mechanisms described herein to reestablish a time alignment for uplink transmissions on an SCell.

For example, the mobile terminal may use a newly determined timing advance for the SCell to time-align the uplink transmission timing of the SCell (step 2c).

Upon having reestablished timing alignment for the SCell, the mobile terminal resets and starts the timer (step 2d) since the mobile terminal UE considers itself as being uplink synchronized.

Determining the Timing Advance for the SCell

As described with reference to FIGS. 26 and 27, the mobile terminal may (re-)establish a time alignment on an SCell by calculating a timing advance value based on the measured downlink reception time difference $\Delta_{SCell\text{-}PCell}Rx_{DL}$ and the timing advance used for uplink transmissions on the PCell.

Alternatively or in addition, the mobile terminal can measure and report a reception transmission time difference between the PCell and the SCell $\Delta_{SCell\text{-}PCell}Rx_{DL}\text{-}Tx_{UL}$ and/or a timing advance calculated based thereon and on the timing advance used for uplink transmissions on the PCell.

$$\Delta_{SCell\text{-}PCell}Rx_{DL}\text{-}Tx_{UL} = T_{DL\_RX\_SCell} - T_{UL\_TX\_PCell}$$

as is also depicted in FIG. 26 or 27.

Put into words, the reception transmission time difference between the PCell and SCell is the time difference between the time when the mobile terminal transmits an uplink radio frame on the PCell and the time when the mobile terminal receives a downlink radio frame on the SCell. The uplink radio frame and downlink radio frame shall refer to the same radio frame number.

As can be seen from either FIG. 26 or 27, the downlink reception time difference $\Delta_{SCell\text{-}PCell}Rx_{DL}$ can be calculated based on the reception transmission time difference $\Delta_{SCell\text{-}PCell}Rx_{DL}\text{-}Tx_{UL}$ and the timing advance of the PCell $TA_{PCell}$, in particular by:

$$\Delta_{SCell\text{-}PCell}Rx_{DL} = \Delta_{SCell\text{-}PCell}Rx_{DL}\text{-}Tx_{UL} - TA_{PCell} \quad \text{(equation 15)}$$

where $TA_{PCell}$ could also be substituted by the time measured between $T_{UL\_TX\_PCell}$ and $T_{DL\_RX\_PCell}$. The measured time between $T_{UL\_TX\_PCell}$ and $T_{DL\_RX\_PCell}$ could also be reported to the eNodeB along with the reception transmission time difference.

Measuring and reporting the reception transmission time difference instead of or additionally to the downlink reception time difference is beneficial, since for future techniques like cooperative multi-point (COMP) transmissions in the uplink, the reception transmission time difference could be used to control the uplink transmission timing. Furthermore, it might be more preferably from the implementation point of view.

The reception transmission time difference $\Delta_{SCell\text{-}PCell}Rx_{DL}\text{-}Tx_{UL}$ is then used to calculate the timing advance for the SCell by the mobile terminal UE and/or reported to the eNodeB, which then also uses equation 15 to calculate the downlink reception time difference $\Delta_{SCell\text{-}PCell}Rx_{DL}$. Based on the calculated downlink reception time difference, the mobile terminal and/or eNodeB can calculate the timing advance for the SCell as explained before and in more detail later.

It should be noted that the mobile terminal may for example count the number of samples as a way of determining the time difference. For example, in order to determine the downlink reception time difference, the mobile terminal would count the number of samples between the reception time of a downlink subframe in the PCell and the reception time of a downlink subframe in the SCell. For instance, the downlink subframes may refer to common reference signals (CRS).

Reporting of the Measurement Results

The mobile terminal, after performing the measurements (step 1a), transmits the results to the eNodeB. As explained before, the measurements may refer to the downlink reception time difference $\Delta_{SCell\text{-}PCell}Rx_{DL}$ and/or to the reception transmission time difference $\Delta_{SCell\text{-}PCell}Rx_{DL}\text{-}Tx_{UL}$ between the PCell and SCell. (step 1c)

The reporting itself could be implemented in principle on several layers, e.g. RRC layer or MAC layer. Other measurements like mobility or positioning measurements are signaled on the RRC layer too. Since the timing advance commands are generated by the MAC layer, it could be beneficial from an implementation point of view, to also implement the reporting of the measurement results on the MAC layer.

FIGS. 29 and 30 illustrate the format of a MAC control element which can be used to transmit the measurement results from the mobile terminal to the eNodeB. As apparent, the structure of the MAC CEs is similar to the extended power headroom MAC CE. The size depends on the number of configured or configured and activated SCells, i.e. on the number of SCells for which measuring and reporting is to be performed.

In more detail, FIG. 29 shows a MAC control element to transmit the downlink reception time difference between the PCell and all the available SCells 1-$n$.

On the other hand, FIG. 30 illustrates the MAC control element to transmit the reception transmission time difference between the PCell and all the available SCells 1-$n$. Since the time between $T_{UL\_TX\_PCell}$ and $T_{DL\_RX\_PCell}$ corresponds to $TA_{PCell}$, and hence should be actually known by the eNodeB, in an alternative embodiment this information must not be reported to the eNodeB.

Instead of reporting the downlink reception time difference and/or the reception transmission time difference for all SCells, the mobile terminal may only report them for the particular SCell which is to be time-aligned.

Further, instead of reporting the downlink reception time difference and/or the reception transmission time difference for all SCells, the mobile terminal may report the calculated timing advance for the SCell to be time-aligned based on the calculated timing advance value as described earlier.

Furthermore, the time differences could be encoded and indicated in the number of samples, i.e. the mobile reports a particular number of samples, and the eNodeB can then use the number of samples and a sample time to derive the actual time differences.

As already mentioned previously, the measurement results are preferably transmitted on the physical uplink shared channel, PUSCH, of the PCell.

Determining the Timing Advance for the SCell

In the previous embodiments of the invention, it was assumed that the mobile terminal and/or the eNodeB calculates a timing advance value as known from the standard RACH procedure, i.e. a timing advance that is applied by the mobile terminal relative to the beginning of downlink radio frames received via the downlink SCell, as exemplified in FIGS. 26 and 27 (see arrow $TA_{SCell}$).

This may be termed as an absolute value, since the timing advance value is of the same type as the timing advance defined by the standard, not to be defined relative to the PCell but relative to the downlink reception of radio frames in the SCell.

There are however other alternatives too. The timing advance calculated by the mobile terminal and/or the eNodeB and applied by the mobile terminal UE does not need to be relative to the beginning of downlink radio frames received via the downlink SCell; other references can be chosen.

For example, the calculated and applied timing advance can be relative to the beginning of downlink radio frames received via the PCell $T_{DL\_RX\_PCell}$, or relative to the beginning of uplink radio frames transmitted via the PCell $T_{UL\_TX\_PCell}$.

In case the timing advance is calculated relative to the beginning of uplink radio frames transmitted via the PCell, it basically refers to the difference of the timing advance between the PCell and SCell $\Delta TA_{PCell-SCell}$.
where considering equation 12:

$$\Delta TA_{PCell} = +2 \cdot \Delta_{SCell-PCell} Rx_{DL} - 2 \cdot \Delta_{SCell-PCell} Tx_{DL} - \Delta_{SCell} PD_{UL-DL}$$

Thus, the timing advance determined by the mobile terminal UE and/or eNodeB is $\Delta TA_{PCell-SCell}$.

As described with reference to FIGS. 26 and 27, the mobile terminal does not know about the downlink transmission time difference between the PCell and the SCell ($\Delta_{SCell-PCell} Tx_{DL}$) and the propagation delay difference between the uplink and the downlink on the SCell ($\Delta_{SCell} PD_{UL-DL}$) and, hence, determines the timing advance $\Delta TA_{PCell-SCell}$ assuming both values $\Delta_{SCell-PCell} Tx_{DL}$ and $\Delta_{SCell} PD_{UL-DL}$ to be zero.

In contrast, in case the eNodeB determine a timing advance $\Delta TA_{PCell-SCell}$, e.g. for checking if the measurement performed by the mobile terminal UE allows for a sufficient time alignment of uplink transmission on the SCell, the eNodeB may determine the timing advance $\Delta TA_{PCell-SCell}$ based on its additional knowledge of the downlink transmission time difference between the PCell and the SCell ($\Delta_{SCell-PCell} Tx_{DL}$) and the propagation delay difference between the uplink and the downlink on the SCell ($\Delta_{SCell} PD_{UL-DL}$).

The mobile terminal in turn applies this value relative to the beginning of uplink radio frames received via the PCell, to determine the uplink timing for uplink transmissions performed on the SCell. This is exemplified in FIG. 31, where the timing advance is indicated by the number of samples $N_{TA}$, and is then multiplied with the sample time $T_S$ to acquire the actual difference in time to apply for uplink transmissions in the SCell compared to the uplink transmissions in the PCell.

In case the timing advance is calculated relative to the beginning of downlink radio frames received via the downlink PCell, the timing advance value is $$TA_{SCell} + \Delta_{SCell-PCell} Rx_{DL}$$

as can be deduced from FIG. 26 and FIG. 27.

Thus, the mobile terminal first derives the current timing advance value $TA_{SCell}$ and subtracts therefrom the downlink reception time difference $\Delta_{SCell-PCell} Rx_{DL}$.

The calculation result is used to set the timing of uplink transmissions on the SCell based on the received timing advance relative to the beginning of the downlink radio frame received by the mobile terminal in the PCell.

This is exemplified in FIG. 32, where the timing advance is indicated by the number of samples $N_{TA}$, and is then multiplied with the sample time $T_S$ to acquire the actual difference in time to apply for uplink transmissions in the SCell.

Reception of a Random Access Channel, RACH, Order

As described with respect to the previous embodiments, the mobile terminal transmits timing information to the eNodeB, enabling the eNodeB to control the time-aligning process for the uplink of an SCell or group of SCells.

In connection with FIG. 25, it has been described that the eNodeB may determine, upon reception of measurement results and/or a calculated timing advance from the mobile terminal, if the transmitted information allows for an accurate time alignment of uplink transmissions on the SCell (e.g. in case of a non-zero downlink transmission time difference between the PCell and the SCell).

Alternatively, the eNodeB may also determine (i.e. without reference to the received timing information) that the time-alignment of the PCell used by the mobile terminal UE does not allow for an accurate time alignment of uplink transmissions on the SCell.

For example, when the eNodeB detects that the time-alignment of uplink transmission by the mobile terminal on the PCell is not accurate, the eNodeB may according to an example, immediately transmit a random access channel, RACH, order message to the mobile terminal UE. In other words, in case the mobile terminal would use a timing advance for the SCell which was, for example, based on a borderline timing advance of the uplink of the PCell, the eNodeB can prevent from interference between uplink transmissions on the SCell by immediately transmitting a RACH order message to the mobile terminal. Errors in a timing advance of uplink transmissions on the PCell (i.e. reference cell) propagate to the calculated timing advance for uplink transmissions on the SCell to-be time-aligned.

As another example, the configuration of the PCell and the SCell may also trigger the eNodeB to immediately transmit a random access channel, RACH, order message to the mobile terminal UE. Based on particular configurations of the PCell and the SCell, the eNodeB may assume that the calculation of a timing advance for an SCell by the mobile terminal does not allow for an accurate time alignment of uplink transmissions on the SCell. For instance, if the PCell and the SCell are configured on widely separated frequency bands, the eNodeB may determine that the mobile terminal cannot calculate an accurate timing advance for the SCell.

Should the eNodeB determines that the mobile terminal UE is not able to calculate a timing advance which would accurately time-align uplink transmission on the SCell, the eNodeB may, in one example, immediately transmit a random access channel, RACH, order message to the mobile terminal. In other words with the RACH order message the eNodeB ensures a robust time-alignment of uplink transmissions on the SCell and avoids an un-controllable uplink timing advance drift.

The RACH order message preferably corresponds to message 801 in FIG. 8, which is a physical layer signalling (PDCCH with DCI format 1A).

In step 3 in FIG. 28, when the mobile terminal receives a RACH order message, the mobile terminal performs a random access procedure as described with reference to FIG. 8.

As part of the random access procedure (i.e. step 802), the mobile terminal receives an accurate timing advance for the SCell. The mobile terminal then time-aligns the SCell by setting a time advance for uplink transmissions on the uplink target cell based on the timing advance received within the random access procedure (step 3b in FIG. 28).

Thereafter, the mobile terminal resets and restarts the respective timing advance timer for the SCell or group of SCells on which the random access procedure has been performed (step 3c in FIG. 28).

Reception of a Timing Advance Command

Another alternative for the eNodeB to control the time-aligning process uplink for the uplink of an SCell or group of SCells is the transmission of a timing advance command.

As described with respect to the previous embodiments, the mobile terminal UE transmit timing information to the eNodeB, enabling the eNodeB to calculate a timing advance for uplink transmissions on a particular SCell or group of SCells in a similar manner to the calculation of the timing advance by the mobile terminal.

In some situations, as described earlier, only the eNodeB is able to calculate a timing advance which allows for an accurate time alignment of uplink transmissions on the particular SCell or group of SCells (e.g. in case of a non-zero downlink transmission time difference between the PCell and the SCell).

In such a situation, the calculated timing advance can be transmitted to the mobile terminal e.g. using the downlink shared channel of the SCell to which the timing advance shall be applied.

FIG. 33 shows the format of a timing advance command to be used for transmitting the calculated timing advance from the eNodeB to the mobile terminal, according to one particular embodiment of the invention. If the timing advance information calculated and transmitted to the mobile terminal is the $TA_{SCell}$ (and not some of the relative values mentioned above in connection with FIGS. 31 and 32), 11 bits are preferably used to transmit the timing advance for the SCell to achieve the necessary granularity (same as for the initial TA command known from the standard).

On the other hand, less bits suffice if the timing advance is smaller, due to being relative to another timing.

One example is using a new MAC control element to convey the timing advance information with e.g. 8 bits. Alternatively, the timing advance update command, known from Release 8 of LTE, can be used, having a format as shown in FIG. 33. One of the free R-bits could be used to distinguish between an actual timing advance update command as known from the standard, and the timing advance information according to one of the various embodiments of the invention.

Since some embodiments use a relative timing advance (see description in connection with FIGS. 31 and 32), the six bits provided by the timing advance update command may provide sufficient granularity.

Another alternative would be that the eNodeB sends timing advance information not only for one SCell but for all configured respectively configured and activated SCells. In case the UE reports timing information for all configured respectively configured and activated SCells according to a previous embodiment, it could make sense to also report all the calculated TA in response.

In step 4 in FIG. 28, when the mobile terminal UE receives a timing advance command from the eNodeB using the downlink shared channel of a SCell or of one of group of SCells to which the timing advance shall be applied, the mobile terminal UE time aligns uplink transmissions using the conveyed timing advance value on the SCell or group of SCells (step 4a of FIG. 28).

Thereafter, the mobile terminal resets and restarts the respective timing advance timer for the SCell or group of SCells on which the time advance has been applied (step 4b in FIG. 28).

Grouping of SCells

In the scenario assumed for FIGS. 24, 25 and 26, SCell1 and SCell2 have the same timing advance in the uplink since the propagation delay for SCell1 and SCell2 is the same. In said case, the SCell1 and SCell2 can be said to form a timing advance group.

Further to this scenario, there may be several respectively configured and activated SCells, forming different timing advance groups, depending on whether the SCells can be uplink-time-aligned using the same timing advance value. As already explained, there are several reasons leading to the need for different timing advances between various SCells of a same mobile terminal. An example is one or more frequency-selective repeater, amplifying the signals of only some of the SCells.

In any case, if the mobile terminal stores a mapping of SCells to specific timing advance groups, when having to time-align an SCell1, belonging to a timing advance group with a time-aligned SCell2, the mobile terminal can immediately apply the timing advance previously used for the time-aligned SCell2, to time-align the uplink transmissions of SCell1 too. Thus, there would be no need to perform all the steps of the invention.

The mapping of SCells to timing advance groups can be configured and updated by the eNodeB only.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein. Furthermore, the eNodeB comprises means that enable the eNodeB to determine the power status of respective user equipments from the power status information received from the user equipments and to consider the power status of the different user equipments in the scheduling of the different user equipments by its scheduler.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for time aligning uplink transmissions by a mobile terminal in a mobile communication system, the mobile terminal being in communication with an aggregation access point, the method comprising the steps of:
    configuring the mobile terminal simultaneously with a time-aligned uplink reference cell and with a non-time-aligned uplink target cell, both cells being controlled by the aggregation access point,
    measuring, by the mobile terminal, transmission and/or reception time difference information relating to transmissions on the target cell and/or reference cell,
    determining, by the mobile terminal, a first target timing advance based on at least the measured transmission and/or reception time difference information and on a reference timing advance used for uplink transmissions on the time-aligned reference cell,
    time-aligning, by the mobile terminal, the uplink target cell by adjusting a timing for uplink transmissions on the uplink target cell based on the determined first target timing advance, and
    transmitting the measurement results and/or the first target timing advance from the mobile terminal to the aggregation access point.

2. The method according to claim 1, wherein, based on a timer included in the mobile terminal, the steps of (i) measuring the transmission and/or reception time difference information, (ii) determining the first target timing advance, (iii) time-aligning the uplink target cell, and (iv) transmitting the measurement results and/or the first target timing advance, are repeated by the mobile terminal, unless otherwise instructed by the aggregation access point.

3. The method according to claim 1, wherein the step of measuring by the mobile terminal comprises:
    determining by the mobile terminal a downlink reception time difference (delta Scell-PCellRX.sub.DL) between the target and reference cell, by measuring the time between the beginning of a first downlink subframe on the target cell (T.sub.DL_RX_SCell) and the beginning of the corresponding downlink subframe on the reference cell (T.sub.DL_RX_PCell),
    wherein downlink subframes on the reference and target cell refer to the same subframe number, and optionally wherein the measurement results, transmitted to the aggregation access point, comprise the downlink reception time difference between the target and reference cell.

4. The method according to claim 1, wherein the step of measuring by the mobile terminal further comprises: determining by the mobile terminal a reception transmission time difference between the target and reference cell (delta Scell-PCellRX.sub.DL-Tx.sub.UL), by measuring the time difference between the time when the mobile terminal transmits an uplink radio frame on the reference cell (T.sub.UL_TX_PCell) and the time when the mobile terminal receives a downlink radio frame on the target cell (T.sub.DL_RX_SCell), wherein the uplink radio frame and the downlink radio frame relate to the same radio frame, and optionally wherein the measurement results, transmitted to the aggregation access point, comprise the reception transmission time difference between the target and reference cell.

5. The method according to claim 4, wherein the step of determining the first target timing advance at the mobile terminal further comprises the step of: determining a downlink reception time difference between the target cell and the reference cell (delta.sub.Scell-PcellRx.subDL) by subtracting the reception transmission time difference from the timing advance of the reference cell.

6. The method according to claim 1, wherein the step of time-aligning the target cell comprises setting the transmission of uplink radio frames on the uplink target cell relative to the beginning of downlink radio frames received via the downlink target cell, using the first target timing advance determined considering that the setting of the transmission of the uplink radio frames on the uplink target cell will be relative to the beginning of downlink radio frames received via the downlink target cell, respectively, or
    setting the transmission of uplink radio frames on the uplink target cell relative to the beginning of downlink radio frames received via the downlink reference cell, using the first target timing advance determined considering that the setting of the transmission of the uplink radio frames on the uplink target cell will be relative to the beginning of downlink radio frames received via the downlink reference cell, or
    setting the transmission of uplink radio frames on the uplink target cell relative to the beginning of uplink radio frames transmitted via the uplink reference cell, using the first target timing advance determined considering that the setting of the transmission of the uplink radio frames on the uplink target cell will be relative to the beginning of uplink radio frames transmitted via the uplink reference cell.

7. The method according to claim 1, wherein the measurement results are transmitted to the aggregation access point on the physical uplink shared channel, PUSCH, of the reference cell, and/or
    wherein the step of transmitting the measurement results is part of the radio resource control layer, RRC, or of the medium access control layer, MAC, and in case it is part of the MAC layer, the measurement results are preferably transmitted within a MAC control element.

8. The method according to claim 1, wherein the step of measuring the time difference information and the step of determining a first target timing advance by the mobile terminal and of transmitting the measurement results and/or the first target timing advance to the aggregation access point is:
performed periodically, and/or
triggered by predetermined events, such as:
  i. configuration and/or activation of the target cell
  ii. the measurement results exceeding a predetermined threshold
  iii. expiration of a timer
  iv. reception of a measurement reporting request from the aggregation access point.

9. A mobile terminal for timing-aligning uplink transmissions in a mobile communication system, the mobile terminal being in communication with an aggregation access point, the mobile terminal comprising:
a processor adapted to measure transmission and/or reception time difference information relating to transmissions on the target cell and/or reference cell,
the mobile terminal being simultaneously configured with a time-aligned uplink reference cell and with a non-time-aligned uplink target cell, both cells being controlled by the aggregation access point the mobile terminal,
the processor adapted to determine a first target timing advance based on at least the measured transmission and/or reception time difference information and on a reference timing advance used for uplink transmissions on the time-aligned reference cell,
the processor and a transmitter adapted to time-align the uplink target cell by adjusting a timing for uplink transmissions on the uplink target cell based on the determined first target timing advance, and
the transmitter adapted to transmit the measurement results and/or the first target timing advance from the mobile terminal to the aggregation access point.

10. The mobile terminal according to claim 9, further comprising a timer and a receiver, and wherein based on the timer, the processor and transmitter are adapted to repeat measuring the transmission and/or reception time difference information, determining the first target timing advance, time-aligning the uplink target cell, and transmitting the measurement results and/or the first target timing advance, unless the mobile terminal receives via the receiver an instruction from the aggregation access point instructing the mobile terminal otherwise.

11. The mobile terminal according to claim 9, further comprising a receiver, wherein the processor and transmitter are adapted to measure the transmission and/or reception time difference information and the processor is adapted to determining the first target timing advance in case of the receiver:
receiving, from the aggregation access point, information, preferably as a RRC message configuring the target cell, indicating that uplink transmissions on the uplink target cell require a different time alignment than that used for the reference cell, or
receiving, from the aggregation access point, information indicating a timing advance group for the target cell which is different from the timing advance group of the reference cell.

12. The mobile terminal according to claim 9, wherein the processor is adapted to determine a downlink reception time difference (delta.sub.Scell-.sub.PCellRx.sub.DL) between the target and reference cell, by measuring the time between the beginning of a first downlink subframe on the target cell (T.sub.DL_RX_SCell) and the beginning of the corresponding downlink subframe on the reference cell (T.sub.DL_RX_PCell), wherein downlink subframes on the reference and target cell refer to the same subframe number, and optionally the transmitter is adapted to transmit downlink reception time difference between the target and reference cell as the measurement results to the aggregation access point.

13. The mobile terminal according to claim 9, wherein the processor is adapted to determine a reception transmission time difference between the target and reference cell (delta.sub.Scell-PCellRx.sub.DL-Tx.sub.UL) by measuring the time difference between the time when the mobile terminal transmits an uplink radio frame on the reference cell (T.sub.UL_TX_PCell) and the time when the mobile terminal receives a downlink radio frame on the target cell (T.sub.DL_RX_SCell), wherein the uplink radio frame and the downlink radio frame relate to the same radio frame, and optionally the transmitter is adapted to transmit the reception transmission time difference between the target and reference cell as the measurement results to the aggregation access point.

14. The mobile terminal according to claim 9, wherein the processor is adapted to determine a downlink reception time difference between the target cell and the reference cell (delta.sub.Scell-PCellRx.sub.DL) by subtracting the reception transmission time difference from the timing advance of the reference cell.

15. The mobile terminal according to claim 9, wherein the processor and transmitter are adapted, for time-aligning the target cell, to set the transmission of uplink radio frames on the uplink target cell relative to the beginning of downlink radio frames received via the downlink target cell, using the first target timing advance determined considering that the setting of the transmission of the uplink radio frames on the uplink target cell will be relative to the beginning of downlink radio frames received via the downlink target cell, respectively, or wherein the processor and transmitter are adapted, for time-aligning the target cell, to set the transmission of uplink radio frames on the uplink target cell relative to the beginning of downlink radio frames received via the downlink reference cell, using the first target timing advance determined considering that the setting of the transmission of the uplink radio frames on the uplink target cell will be relative to the beginning of downlink radio frames received via the downlink reference cell, or wherein the processor and transmitter are adapted, for time-aligning the target cell, to set the transmission of uplink radio frames on the uplink target cell relative to the beginning of uplink radio frames transmitted via the uplink reference cell, using the first target timing advance determined considering that the setting of the transmission of the uplink radio frames on the uplink target cell will be relative to the beginning of uplink radio frames transmitted via the uplink reference cell.

16. The mobile terminal according to claim 9, wherein the transmitter is adapted to transmit the measurement results to the aggregation access point on the physical uplink shared channel, PUSCH, of the reference cell, and/or wherein the transmitter is adapted to transmit measurement results as part of the radio resource control layer, RRC, or of the medium access control layer, MAC, and in case it is part of the MAC layer, the measurement results are preferably transmitted within a MAC control element.

17. The mobile terminal according to claim 9, wherein the processor and the transmitter are adapted to measure the time difference information, to determine a first target timing advance and to transmit the measurement results and/or the first target timing advance to the aggregation access point:
   periodically, and/or
   upon being triggered by predetermined events, such as:
      i. configuration and/or activation of the target cell
      ii. the measurement results exceeding a predetermined threshold
      iii. expiration of a timer
      iv. reception of a measurement reporting request from the aggregation access point.

18. The mobile terminal according to claim 9, wherein the receiver is adapted to receive:
   a deactivation/activation command as the measurement reporting request from the aggregation access point for deactivating/activating a configured cell, including a flag indicating the request for measurement reporting, the flag preferably being set in one of the reserved bits of the deactivation/activation command, or
   a radio resource control connection reconfiguration message as the measurement reporting request from the aggregation access point, including a flag indicating the request for measurement reporting, or
   a random access channel, RACH, order message as the measurement reporting request from the aggregation access point, or
   a random access channel, RACH, order message as the measurement reporting request from the aggregation access point, with a predetermined codepoint or a predetermined combination of codepoints indicating the request for measurement reporting.

19. A non-transitory computer readable medium storing instructions that, when executed by a processor of a mobile terminal, cause the mobile terminal to time align uplink transmissions in a mobile communication system, wherein the mobile terminal:
   is in communication with an aggregation access point and simultaneously configured with a time-aligned uplink reference cell and with a non-time-aligned uplink target cell, both cells being controlled by the aggregation access point,
   measures transmission and/or reception time difference information relating to transmissions on the target cell and/or reference cell,
   determines a first target timing advance based on at least the measured transmission and/or reception time difference information and on a reference timing advance used for uplink transmissions on the time-aligned reference cell,
   time-aligns the uplink target cell by adjusting a timing for uplink transmissions on the uplink target cell based on the determined first target timing advance, and
   transmits the measurement results and/or the first target timing advance from the mobile terminal to the aggregation access point.

* * * * *